(12) United States Patent
Nishikino et al.

(10) Patent No.: US 11,674,933 B2
(45) Date of Patent: Jun. 13, 2023

(54) MEASURING DEVICE, MEASURING SYSTEM, MOVING BODY, AND MEASURING METHOD

(71) Applicant: National Institutes for Quantum and Radiological Science and Technology, Chiba (JP)

(72) Inventors: Masaharu Nishikino, Kyoto (JP); Noboru Hasegawa, Kyoto (JP); Katsuhiro Mikami, Kyoto (JP); Toshiyuki Kitamura, Kyoto (JP); Shuji Kondo, Kyoto (JP); Hajime Okada, Kyoto (JP); Tetsuya Kawachi, Kyoto (JP); Yoshinori Shimada, Osaka (JP); Shinri Kurahashi, Osaka (JP)

(73) Assignee: National Institutes for Quantum and Radiological Science and Technology, Chiba (JP)

( * ) Notice: Subject to any disclaimer, the term of this patent is extended or adjusted under 35 U.S.C. 154(b) by 52 days.

(21) Appl. No.: 16/981,717

(22) PCT Filed: Mar. 27, 2019

(86) PCT No.: PCT/JP2019/013302
§ 371 (c)(1),
(2) Date: Sep. 17, 2020

(87) PCT Pub. No.: WO2019/189429
PCT Pub. Date: Oct. 3, 2019

(65) Prior Publication Data
US 2021/0247366 A1    Aug. 12, 2021

(30) Foreign Application Priority Data
Mar. 27, 2018    (JP) .............................. JP2018-060867

(51) Int. Cl.
*G01N 29/34*    (2006.01)
*G01N 29/24*    (2006.01)

(52) U.S. Cl.
CPC ....... *G01N 29/348* (2013.01); *G01N 29/2418* (2013.01)

(58) Field of Classification Search
CPC ............ G01N 29/348; G01N 29/2418; G01N 29/954; G01N 29/34; G01N 2291/0232; G01H 9/00
See application file for complete search history.

(56) References Cited

U.S. PATENT DOCUMENTS 5,844,149 A * 12/1998 Akiyoshi ............. G01N 21/718
                                                              73/864.81
6,694,173 B1 * 2/2004 Bende ................... A61B 5/0095
                                                              601/3
(Continued)

FOREIGN PATENT DOCUMENTS

CN    102147237 A    8/2011
CN    102706958 A    10/2012
(Continued)

OTHER PUBLICATIONS

European Patent Office, Search Report issued in EP 19776123.2 dated Nov. 5, 2021.
(Continued)

*Primary Examiner* — Tarun Sinha
(74) *Attorney, Agent, or Firm* — Wood Herron & Evans LLP

(57) ABSTRACT

A measuring device for measuring an inspection target on the basis of vibration generated when the inspection target has been irradiated with laser light includes a condensing position deriving portion configured to derive an amount of adjustment of a distance between condensing lenses of a laser condensing unit configured to condense the laser light
(Continued)

on the basis of a distance between a laser device configured to radiate the laser light and an irradiation location of the laser light and a communicating portion configured to transmit control information including information representing the amount of adjustment to the laser condensing unit.

18 Claims, 28 Drawing Sheets

(56) References Cited

U.S. PATENT DOCUMENTS

| | | | |
|---|---|---|---|
| 2005/0027288 A1* | 2/2005 | Oyagi | A61B 18/22 606/2 |
| 2006/0084957 A1 | 4/2006 | Delfyett et al. | |
| 2007/0157730 A1* | 7/2007 | Ochiai | G21C 17/003 73/627 |
| 2011/0127697 A1 | 6/2011 | Milne | |
| 2011/0286005 A1* | 11/2011 | Yamamoto | B23K 31/125 356/511 |
| 2012/0320368 A1* | 12/2012 | Jiao | G01B 9/02091 356/72 |
| 2015/0119680 A1* | 4/2015 | Tanaka | A61B 8/0825 600/407 |
| 2015/0160168 A1* | 6/2015 | Irisawa | A61B 5/0095 73/645 |

FOREIGN PATENT DOCUMENTS

| | | |
|---|---|---|
| CN | 104960546 A | 10/2015 |
| CN | 207066466 U | 3/2018 |
| FR | 3031183 A1 | 7/2016 |
| JP | H04085161 U | 7/1992 |
| JP | 2001264302 A | 9/2001 |
| JP | 2001318081 A | 11/2001 |
| JP | 2002296244 A | 10/2002 |
| JP | 2003185639 A | 7/2003 |
| JP | 2003185639 A * | 7/2003 |
| JP | 2005147813 A | 6/2005 |
| JP | 2006200970 A | 8/2006 |
| JP | 2007017297 A | 1/2007 |
| JP | 4386709 B | 12/2009 |
| JP | 2013029399 A | 2/2013 |
| JP | 2013061180 A | 4/2013 |
| JP | 2013061180 A * | 4/2013 |
| JP | 2015203592 A | 11/2015 |
| JP | 2017058157 A | 3/2017 |
| JP | 2018013348 A | 1/2018 |
| JP | 2018013348 A * | 1/2018 |

OTHER PUBLICATIONS

Nov. 2013 issue of "Inspection Technology" by Japan Industrial Publishing Co., Ltd., issued on Nov. 1, 2013, including "Improvement in Concrete Defect Detection Using Laser" p. 31 to 35.
Japanese Patent Office, Notification (Information Statement) issued in JP 2019-552647 dated Dec. 15, 2020.
Misaki, Norikazu et al., New technique development against vibration and sound noise for non destructive testing of concrete linings by laser remote sensing system, Journal of Japan Society of Civil Engineers, Ser. F3 (Civil Engineering Informatics), 2016, vol. 72, No. 1, pp. 11-23.
Nishikino, Masaharu et al., Laser tapping sound high-speed inspection system, Construction Machinery and Equipment, May 1, 2017, vol. 53, No. 5, pp. 20-24.
PCT Office, International Search Report issued in PCT/JP2019/013302 dated May 14, 2019.
Ma Zhimin et al., "Methods of Promoting Small Signal in Ultrasonic Testing", Journal of Wuhan University of Water Conservancy and Electric Power, vol. 31, No. 6, pp. 76-79, 1998-12-31.
Shi Yusheng et al., Hubei Science and Technology Press, An Introduction to 3D Printing Technology, 1st Edition, pp. 42-44, Feb. 29, 2016. See English translation of Office Action.
Chinese Patent Office, Office Action issued in CN 201980021570.X dated Mar. 30, 2023.

\* cited by examiner

MEASURING DEVICE, MEASURING SYSTEM, MOVING BODY, AND MEASURING METHOD

TECHNICAL FIELD

Embodiments of the present invention relate to a measuring device, a measuring system, a moving body, and a measuring method.

Priority is claimed on Japanese Patent Application No. 2018-060867, filed Mar. 27, 2018, the content of which is incorporated herein by reference.

BACKGROUND ART

Maintenance work on infrastructure such as tunnels is performed by visual checking and manual work (palpation, tapping, or knocking) by technicians. Thus, the maintenance work is significantly time-consuming and involves a great risk. Therefore, it is necessary to automate and improve the maintenance work of infrastructure such as tunnels.

Regarding technology for inspecting for internal defects of concrete structures such as inner walls of a tunnel, a diagnostic method using laser-induced vibration waves has been proposed (for example, see Patent Document 1).

According to the diagnostic method using laser-induced vibration waves, laser ablation is the most basic technique to impart vibration to a sample and the sample irradiated with laser light is diagnosed on the basis of vibration generated when the sample is irradiated with the laser light. The laser ablation is a spraying or transpiration phenomenon when there is rapid heating of a sample or formation of plasma by irradiation with a high-power laser pulse. The vibration generated in the sample is measured by a device using laser measurement technology such as a laser Doppler vibrometer and a laser interferometer. The vibration generated in the sample measured by the device using the laser measurement technology is represented by an amplitude waveform with respect to time. The amplitude waveform with respect to time is transformed into a frequency spectrum of vibration according to a Fourier transform. Because the number of vibrations of a defective location increases on the basis of a change in the frequency spectrum of the vibration, it is possible to inspect a state of the inspection target such as whether an internal defect such as a cavity has occurred.

CITATION LIST

Patent Literature

[Patent Document 1]
Japanese Unexamined Patent Application, First Publication No. 2013-29399

SUMMARY OF INVENTION

Technical Problem

In outdoor measurement using laser-induced vibration waves, it is difficult to implement high-speed and high-accuracy measurement because the measurement is strongly affected by a measurement environment. For example, environmental noise (ambient noise or an echo) causes noise in the vibration spectrum, which may make appropriate laser irradiation difficult due to irregularities at an irradiation location or the presence or absence of an appendage.

The present invention has been made to solve the above problems and an objective of the present invention is to provide a measuring device, a measuring system, a moving device, and a measuring method capable of improving the accuracy of measurement if an inspection target is measured on the basis of vibration generated when the inspection target was irradiated with laser light.

Solution to Problem (1) According to an aspect of the present invention, a measuring device for measuring an inspection target on the basis of vibration generated when the inspection target has been irradiated with laser light, the measuring device includes: a condensing position deriving portion configured to derive an amount of adjustment of a condensing position of a laser condensing unit configured to condense the laser light on the basis of the distance between a laser device configured to radiate the laser light and an irradiation location of the laser light; and a communicating portion configured to transmit control information including information representing the amount of adjustment to the laser condensing unit.

(2) According to an aspect of the present invention, the measuring device according to the above-described aspect (1) further includes an irradiation location analyzing portion configured to select a location to be irradiated with the laser light on the basis of information representing an image of a location of the inspection target scheduled to be irradiated with the laser light, wherein the communicating portion is configured to transmit control information including information representing the location to be irradiated with the laser light selected by the irradiation location analyzing portion to a sweep device configured to sweep the laser light.

(3) According to an aspect of the present invention, the measuring device according to the above-described aspect (1) or (2) further includes a reverberation sound data acquiring portion configured to acquire time-series data of a reverberation sound generated when the inspection target has been irradiated with the laser light; and a reverberation sound analyzing portion configured to acquire a timing at which the inspection target is irradiated with the laser light on the basis of an intensity of the reverberation sound of the time-series data of the reverberation sound acquired by the reverberation sound data acquiring portion, wherein the communicating portion is configured to transmit control information including the information representing the timing acquired by the reverberation sound analyzing portion to the laser device configured to radiate the laser light.

(4) According to an aspect of the present invention, the measuring device according to any one of the above-described aspects (1) to (3) further includes a data removing portion configured to remove data during a predetermined time period from a time at which the inspection target has been irradiated with the laser light from measurement data of vibration generated in the inspection target.

(5) According to an aspect of the present invention, the measuring device according to any one of the above-described aspects (1) to (4) further includes a noise removing portion configured to remove noise from measurement data on the basis of the correlation coefficient between the measurement data of vibration generated in the inspection target and an evaluation function of the measurement data.

(6) According to an aspect of the present invention, the measuring device according to any one of the above-described aspects (1) to (5) further includes a noise removing portion configured to remove noise from measurement data of vibration on the basis of the measurement data of the vibration generated in the inspection target and data obtained by shifting a phase of time-series data of the measurement data.

(7) According to an aspect of the present invention, the measuring device according to any one of the above-described aspects (1) to (6) further includes a determining portion configured to determine faultlessness of a location of the inspection target irradiated with the laser light on the basis of measurement data acquired when vibration has been induced in the inspection target by irradiating the inspection target with the laser light and measurement data acquired when the inspection target has not been irradiated with the laser light that induces the vibration.

(8) According to an aspect of the present invention, in the measuring device according to any one of the above-described aspects (1) to (7), at least the laser condensing unit is stored in a housing having soundproofing performance.

(9) According to an aspect of the present invention, there is provided a measuring system for measuring an inspection target on the basis of vibration generated when the inspection target has been irradiated with laser light, the measuring system including: an excitation laser device configured to radiate excitation laser light, which is the laser light that causes the inspection target to vibrate; an excitation laser condensing unit configured to condense the excitation laser light radiated by the excitation laser device; and a measuring device including a condensing position deriving portion configured to derive a first amount of adjustment of a condensing position of the excitation laser condensing unit on the basis of a distance between the excitation laser device and an irradiation location of the excitation laser light radiated by the excitation laser device; and a communicating portion configured to transmit control information including information representing the first amount of adjustment to the excitation laser condensing unit.

(10) According to an aspect of the present invention, the measuring system according to the above-described aspect (9) includes a measurement laser device configured to irradiate the inspection target with measurement laser light that is laser light for detecting vibration induced in the inspection target; and a measurement laser condensing unit configured to condense the measurement laser light radiated by the measurement laser device, wherein the condensing position deriving portion derives a second amount of adjustment of a condensing position of the measurement laser condensing unit on the basis of a distance between the measurement laser device and an irradiation location of the measurement laser light radiated by the measurement laser device and wherein the communicating portion is configured to transmit control information including information representing the second amount of adjustment to the measurement laser condensing unit.

(11) According to an aspect of the present invention, the measuring system according to the above-described aspect (10) includes a sweep device configured to sweep the excitation laser light output by the excitation laser device and the measurement laser light output by the measurement laser light device.

(12) According to an aspect of the present invention, in the measuring system according to any one of the above-described aspects (9) to (11), at least the excitation laser condensing unit is stored in a housing having soundproofing performance.

(13) According to an aspect of the present invention, there is provided a moving body equipped with the measuring system according to any one of the above-described aspects (9) to (11).

(14) According to an aspect of the present invention, there is provided a measuring method to be executed by a measuring device for measuring an inspection target on the basis of vibration generated when the inspection target has been irradiated with laser light, the measuring method including steps of: deriving an amount of adjustment of a condensing position of a laser condensing unit configured to condense the laser light on the basis of a distance between a laser device configured to radiate the laser light and an irradiation location of the laser light; and transmitting control information including information representing the amount of adjustment to the laser condensing unit.

(15) According to an aspect of the present invention, the measuring method according to the above-described aspect (14) further includes steps of: selecting a location to be irradiated with the laser light on the basis of information representing an image of a location of the inspection target scheduled to be irradiated with the laser light; and transmitting control information including information representing the location to be irradiated with the laser light to a sweep device configured to sweep the laser light.

(16) According to an aspect of the present invention, the measuring method according to the above-described aspect (14) or (15) further includes steps of: acquiring time-series data of a reverberation sound generated when the inspection target has been irradiated with the laser light at a certain timing; acquiring a timing at which the inspection target is irradiated with the laser light on the basis of an intensity of the reverberation sound of the time-series data of the reverberation sound; and transmitting control information including the information representing the timing to the laser device configured to radiate the laser light.

(17) According to an aspect of the present invention, the measuring method according to any one of the above-described aspects (14) to (16) further includes a step of removing data during a predetermined time period from a time at which the inspection target has been irradiated with the laser light from measurement data of vibration generated in the inspection target.

(18) According to an aspect of the present invention, the measuring method according to any one of the above-described aspects (14) to (17) further includes a step of removing noise from measurement data on the basis of a correlation coefficient between the measurement data of vibration generated in the inspection target and an evaluation function of the measurement data.

(19) According to an aspect of the present invention, the measuring method according to any one of the above-described aspects (14) to (18) further includes a step of removing noise from measurement data of vibration on the basis of the measurement data of the vibration generated in the inspection target and data obtained by shifting a phase of time-series data of the measurement data.

(20) According to an aspect of the present invention, the measuring method according to any one of the above-described aspects (14) to (19) further includes a step of determining faultlessness of a location of the inspection target irradiated with the laser light on the basis of measurement data acquired when vibration has been induced in the inspection target by irradiating the inspection target with the laser light and measurement data acquired when the inspection target has not been irradiated with the laser light that induces the vibration.

Advantageous Effects of Invention

According to embodiments of the present invention, the accuracy of measurement can be improved if an inspection target is measured on the basis of vibration generated when the inspection target has been irradiated with laser light.

DESCRIPTION OF EMBODIMENTS

Next, a measuring device, a measuring system, a moving body, and a measuring method of the present embodiment will be described with reference to the drawings.

The embodiments to be described below are merely examples and the embodiments to which the present invention is applied are not limited to the following embodiments.

Also, in all the drawings showing the embodiments, the same reference signs are used for components having the same functions and a redundant description will be omitted.

Also, the term "based on XX" mentioned in the present application means "based on at least XX" and also includes a case based on another element in addition to XX. Also, the term "based on XX" is not limited to a case in which XX is directly used and includes a case based on calculation or processing performed on XX. "XX" is any element (for example, any information).

According to the present embodiment, when high-speed measurement is performed in an outdoor space (where an environment is not constant), a measuring device performs the measurement while excluding a cause of deterioration in the accuracy of measurement such as a "change in a distance between a laser irradiation portion and a measurement target," a "change in a measurement target surface," or "unexpected noise," which causes a measurement error, in real time. The measuring device can measure an inspection target M using the fact that vibration induced by an excitation laser changes according to a state of a laser irradiation location. Here, the inspection target is a sample prepared on the basis of a standard for various types of performance tests such as strength and resistance. It is possible to measure a structure (an internal cavity or a crack propagation direction) that is not easily ascertained from the exterior of the inspection target M. For example, the measuring device is suitable for measuring an infrastructure structure mainly composed of concrete. Also, because it is possible to perform quick measurement, the measuring device is suitable for performing detailed measurement or wide-range measurement with respect to measurement of, for example, tunnels, bridges, and the like.

First Embodiment (Laser-Induced Vibration Wave Measuring System)

Figure 1:
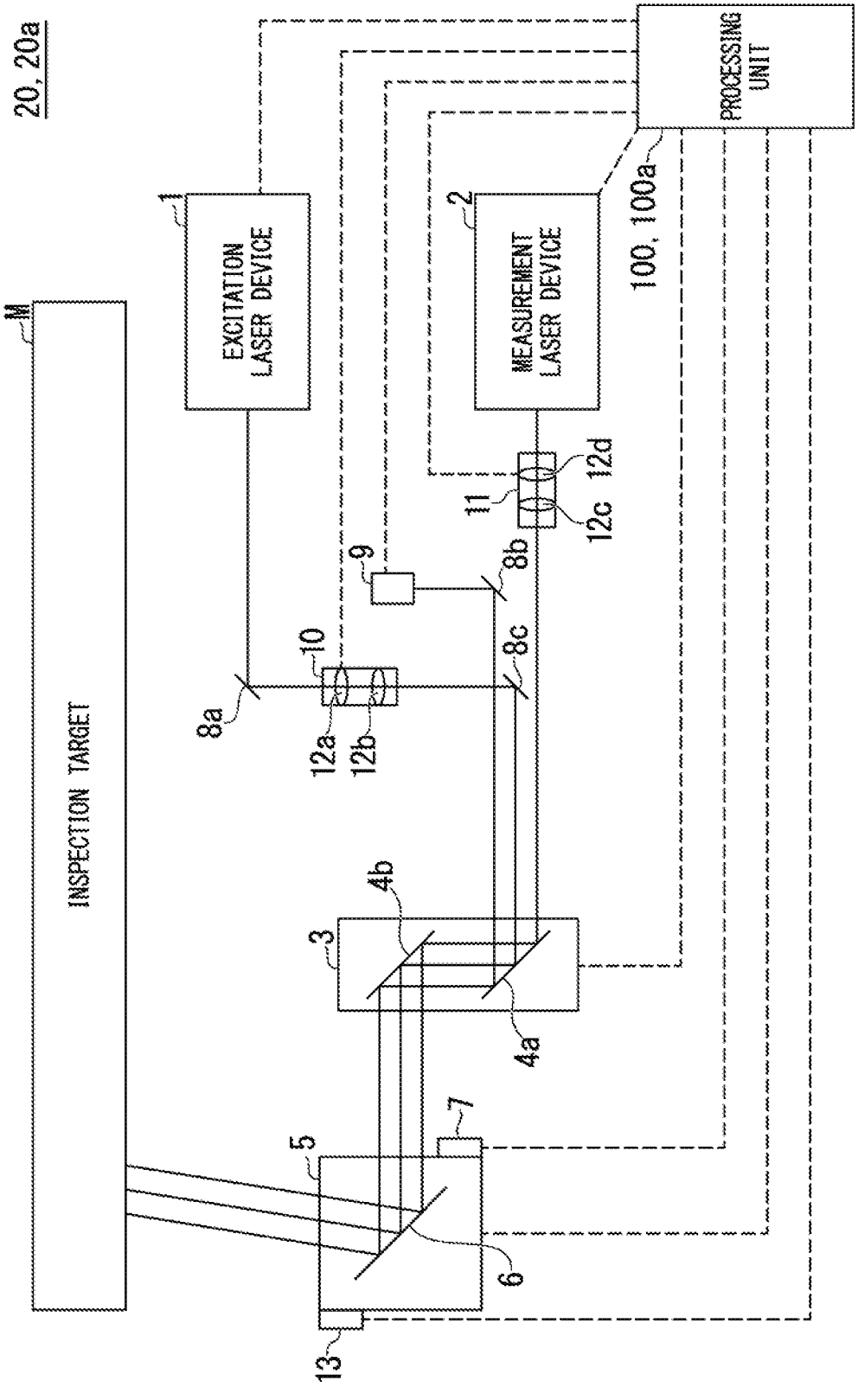
FIG. 1 is a diagram showing an example of a laser-induced vibration wave measuring system of a first embodiment.

FIG. 1 is a diagram showing an example of a laser-induced vibration wave measuring system of the first embodiment. In FIG. 1, a solid line represents an optical path and a broken line represents a signal line.

A laser-induced vibration wave measuring system 20 measures an inspection target M on the basis of vibration generated when the inspection target M has been irradiated with laser light. The laser-induced vibration wave measuring system 20 includes an excitation laser device 1, a measurement laser device 2, a galvano scanner unit 3, a biaxial mirror unit 5, a reverberation sound monitor 7, a mirror 8a, a mirror 8b, and a mirror 8c, a distance measurement laser device 9, an excitation laser condensing unit 10, a measurement laser condensing unit 11, an imaging device 13, and a processing unit 100.

The excitation laser device 1 outputs a high-power laser pulse and the inspection target M is irradiated with the output high-power laser pulse. Thereby, vibration is generated (induced) in the inspection target M. Exemplary examples of the excitation laser device 1 are a high-power pulse laser and a Q-switch Nd:YAG laser.

The measurement laser device 2 detects vibration induced in the inspection target M. The measurement laser device 2 generates laser light (hereinafter referred to as "measurement laser light") for detecting vibration induced in the inspection target M and outputs the generated measurement laser light. The measurement laser device 2 acquires the laser light reflected or scattered by the inspection target M and converts the acquired laser light into the number of vibrations such as an amount of displacement or a variation speed. The measurement laser device 2 outputs information representing the number of vibrations obtained by converting the laser light to the processing unit 100. An example of the measurement laser device 2 is a laser interferometer, a laser Doppler vibrometer, or the like. Here, because information is obtained as an amount of displacement if the measurement laser device 2 is a laser interferometer and is obtained as a velocity if the measurement laser device 2 is a laser Doppler vibration, such information is converted into the number of vibrations. Also, although a measuring device using a laser will be described as an example, the present invention is not limited thereto as long as the vibration induced in the inspection target M can be detected.

The distance measurement laser device 9 measures a distance between the distance measurement laser device 9 and the inspection target M (hereinafter referred to as an "irradiation distance") and outputs information representing the irradiation distance obtained through the measurement to the processing unit 100. A conventionally well-known device can be used as the distance measurement laser device 9 without particular limitation. Although a distance measuring device using laser light will be described below as an example, the distance measuring device is not limited thereto as long as the irradiation distance can be measured.

The galvano scanner unit 3 and the biaxial mirror unit 5 sweep laser light output by the excitation laser device 1 (hereinafter referred to as "excitation laser light"), measurement laser light output by the measurement laser device 2, and laser light output from the distance measurement laser device 9 (hereinafter referred to as "distance measurement laser light"). Also, although a combination of the galvano scanner unit 3 and the biaxial mirror unit 5 will be described as an example of a mechanism for sweeping the excitation laser light, the measurement laser light, and the distance measurement laser light, such a laser light sweep mechanism is not limited to the combination of the galvano scanner unit 3 and the biaxial mirror unit 5 as long as at least one of the excitation laser light, the measurement laser light, and the distance measurement laser light can be swept.

The reverberation sound monitor 7 acquires time-series data of a sound (hereinafter referred to as a "reverberation sound") in which an explosion sound generated by ablation of the surface of the inspection target M enters the reverberation sound monitor 7 and is superimposed on a signal waveform as noise. Specifically, the reverberation sound monitor 7 measures an intensity of the sound generated by irradiating the inspection target M with either or both of the excitation laser light and the measurement laser light and outputs sound information obtained by measuring the intensity of the sound to the processing unit 100.

For example, the reverberation sound monitor 7 is implemented by converting a sound measured using a so-called acoustic measuring device such as a microphone into an electrical signal. Alternatively, vibration of the measuring device (typically a part of the measuring device) caused by the reverberation sound may be measured by an acceleration sensor and sound information of the reverberation sound may be acquired. Also, the reverberation sound measured by the reverberation sound monitor 7 is not limited to a sound of an audible frequency (for example, 20 Hz to 20 kHz) and includes so-called ultrasonic waves having a frequency of 20 kHz or higher. It is only necessary to measure a frequency having an influence on the measurement of the vibration of the inspection target M induced by the excitation laser as the reverberation sound.

An installation place of the reverberation sound monitor 7 is not particularly limited as long as the reverberation sound can be measured. In FIG. 1, the reverberation sound monitor 7 is attached to a biaxial mirror unit 5. In the present embodiment, a description will continue with a case in which the reverberation sound monitor 7 acquires a sound generated by irradiating the inspection target M with the excitation laser light. By attaching the reverberation sound monitor 7 to the biaxial mirror unit 5, the sound can be measured at the closest position where the inspection target M is irradiated with the excitation laser light.

The mirror 8a bends an optical path of the excitation laser light output from the excitation laser device 1 at a 90-degree angle. The mirror 8b bends an optical path of the distance measurement laser light output from the distance measurement laser device 9 at a 90-degree angle.

The excitation laser condensing unit 10 condenses the excitation laser light output by the excitation laser device 1. The excitation laser condensing unit 10 includes a lens 12a and a lens 12b for condensing the excitation laser light.

The mirror 8c bends an optical path of the excitation laser light condensed by the excitation laser condensing unit 10 at a 90-degree angle.

The measurement laser condensing unit 11 condenses the measurement laser light output by the measurement laser device 2. The measurement laser condensing unit 11 includes a lens 12c and a lens 12d for condensing the measurement laser light.

The imaging device 13 is attached to the biaxial mirror unit 5 and images a location of the inspection target M scheduled to be irradiated with the laser light. The imaging device 13 outputs information representing an image of the location of the inspection target M scheduled to be irradiated with the laser light obtained through imaging to the processing unit 100. By attaching the imaging device 13 to the biaxial mirror unit 5, it is possible to acquire an image of the location scheduled to be irradiated with the laser light in accordance with the movement of the biaxial mirror unit 5.

The optical path of the excitation laser device 1 is bent by the mirror 8a at a 90-degree angle and introduced into the excitation laser condensing unit 10. That is, the excitation laser light output by the excitation laser device 1 is bent by the mirror 8a at a 90-degree angle and moves to the excitation laser condensing unit 10. The excitation laser light output by the excitation laser condensing unit 10 for outputting excitation laser light is bent by the mirror 8c at a 90-degree angle and moves to the galvano scanner unit 3 so that the excitation laser condensing unit 10 condenses the laser light on the surface of the inspection target M.

The optical path of the measurement laser device 2 is introduced into the measurement laser condensing unit 11. That is, the measurement laser light output by the measurement laser device 2 moves to the measurement laser condensing unit 11. The measurement laser condensing unit 11 condenses the measurement laser light and outputs the condensed measurement laser light to the galvano scanner unit 3.

The galvano scanner unit 3 adjusts optical paths of either or both of the excitation laser light and the measurement laser light in any direction and angle by rotating the galvano scanner mirror 4a and the galvano scanner mirror 4b to an appropriate angle using a motor. The excitation laser light and the measurement laser light whose optical paths are adjusted in any direction and angle by the galvano scanner unit 3 are output to the biaxial mirror unit 5.

The biaxial mirror unit 5 adjusts the biaxial mirror 6 to set a coarse movement irradiation position whose setting is difficult in the galvano scanner unit 3. The excitation laser light and the measurement laser light output to the biaxial mirror unit 5 are radiated to a scheduled irradiation position of the inspection target M set by the biaxial mirror unit 5.

Figure 2:
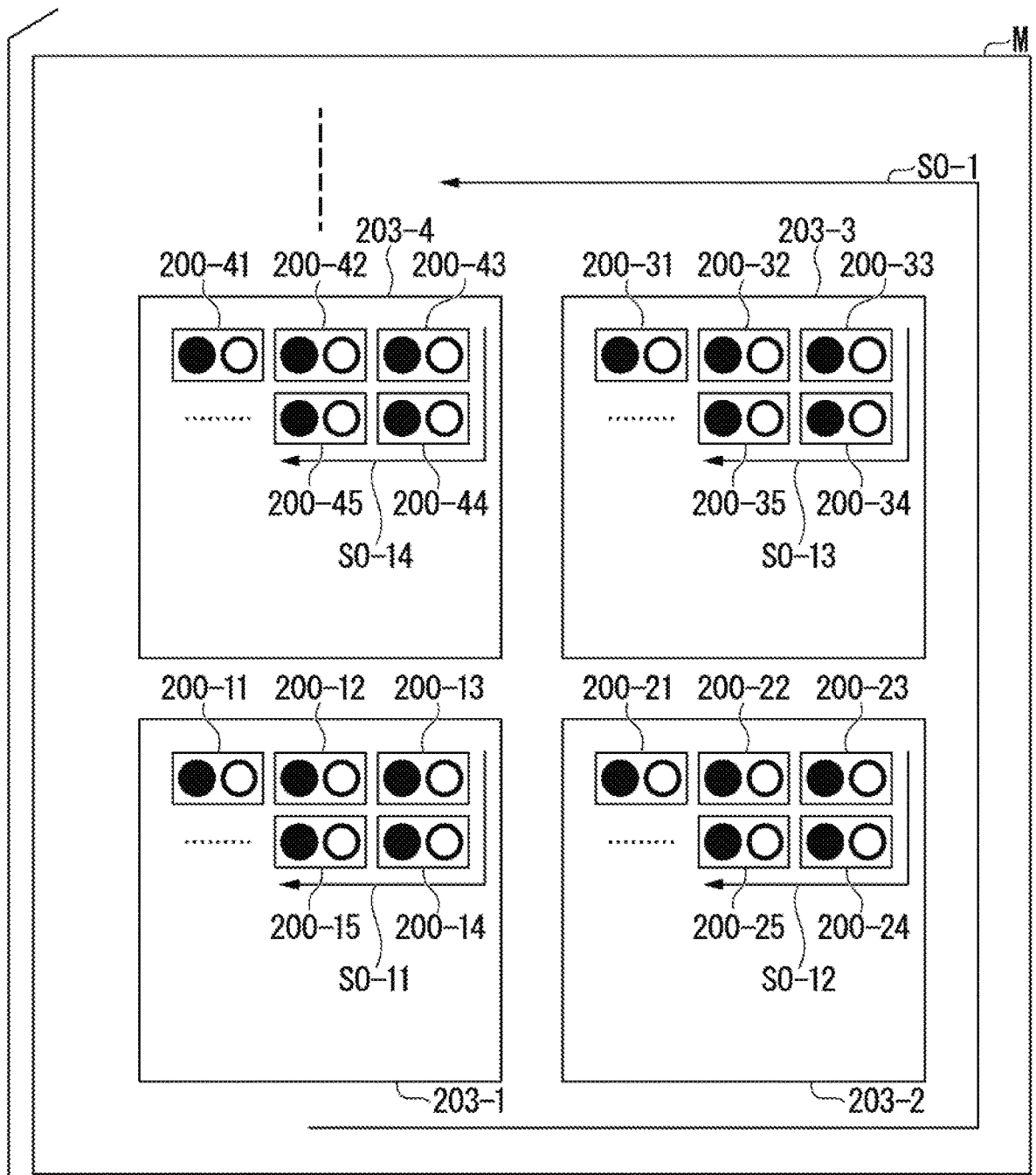
FIG. 2 is a conceptual diagram of sweeping of the laser-induced vibration wave measuring system of the first embodiment.

FIG. 2 is a conceptual diagram of sweeping of the laser-induced vibration wave measuring system of the first embodiment.

When the inspection target M is irradiated with the excitation laser light and the measurement laser light, the biaxial mirror unit 5 performs a sweep operation in the order of a biaxial mirror irradiation area 203-1, a biaxial mirror irradiation area 203-2, a biaxial mirror irradiation area 203-3, and a biaxial mirror irradiation area 203-4 according to a preset sweep order SO-1.

When the biaxial mirror unit 5 performs a sweep operation in the biaxial mirror irradiation area 203-1, the galvano scanner unit 3 performs a sweep operation in the order of an irradiation area 200-11, an irradiation area 200-12, an irradiation area 200-13, an irradiation area 200-14, and an irradiation area 200-15 according to a preset sweep order SO-11. When the galvano scanner unit 3 performs a sweep operation in the irradiation area 200-11, an excitation laser light irradiation location and a measurement laser light irradiation location are irradiated with the excitation laser light and the measurement laser light by rotating the galvano scanner mirror 4a and the galvano scanner mirror 4b to the appropriate angle using the motor.

Even if the galvano scanner unit 3 performs a sweep operation in the irradiation areas 200-12 to 200-15, it is possible to apply a process of performing a sweep operation in the irradiation area 200-11. Even if the biaxial mirror unit 5 performs a sweep operation in the biaxial mirror irradiation areas 203-2 to 203-4, it is possible to apply a process of performing a sweep operation in the biaxial mirror irradiation area 203-1.

In this manner, it is possible to sweep the laser light at any location of the inspection target M at a high speed by combining the galvano scanner unit 3 and the biaxial mirror unit 5. As a specific example, in the case of a tunnel having a radius of 5 m to 10 m, an interval between hitting points 200 becomes a preferable range of 10 mm to 300 mm within an area 203 of 0.1 m×0.1 m to 1 m×1 m, which is a range of one measurement operation. Returning to FIG. 1, the description will be continued.

The laser-induced vibration wave measuring system 20 adjusts a condensing position of the excitation laser condensing unit 10. Specifically, the laser-induced vibration wave measuring system 20 adjusts the condensing position by adjusting a distance between the lens 12a and the lens 12b mounted on the excitation laser condensing unit 10. The laser-induced vibration wave measuring system 20 adjusts a distance between the lens 12c and the lens 12d mounted on the measurement laser condensing unit 11.

Also, the laser-induced vibration wave measuring system 20 sets a location of the inspection target M to be irradiated with the excitation laser light and the measurement laser light.

Also, in the laser-induced vibration wave measuring system 20, a sound is generated by irradiating the inspection target M with either or both of the excitation laser light and the measurement laser light and an influence of direct arrival of the generated sound and an influence of an echo of the sound are reduced.

A process of adjusting the distance between the lens 12a and the lens 12b mounted on the excitation laser condensing unit 10 and the distance between the lens 12c and the lens 12d mounted on the measurement laser condensing unit 11 will be described. Because it is possible to compensate for a "change in a distance between a laser irradiation portion and a measurement target" according to adjustment of the laser condensing position by adjusting the distance between the lens 12a and the lens 12b mounted on the excitation laser condensing unit 10 and the distance between the lens 12c and the lens 12d mounted on the measurement laser condensing unit 11, the accuracy of measurement at the time of high-speed measurement can be improved.

The distance measurement laser light output by the distance measurement laser device 9 is bent by the mirror 8b at a 90-degree angle and moves to the galvano scanner unit 3. The galvano scanner unit 3 includes a galvano scanner mirror 4a and a galvano scanner mirror 4b. The galvano scanner unit 3 adjusts the optical path of the distance measurement laser light in any direction and angle by rotating the galvano scanner mirror 4a and the galvano scanner mirror 4b to an appropriate angle using the motor. The distance measurement laser light whose optical path has been adjusted in any direction and angle by the galvano scanner unit 3 is output to the biaxial mirror unit 5.

The biaxial mirror unit 5 includes the biaxial mirror 6 and sets a coarse movement irradiation position whose setting is difficult in the galvano scanner unit 3 by adjusting the biaxial mirror 6. The distance measurement laser light output to the biaxial mirror unit 5 is radiated to the irradiation position of the inspection target M set by the biaxial mirror unit 5.

Reflected light obtained by reflecting the distance measurement laser light radiated to the irradiation position of the inspection target M moves to the distance measurement laser device 9 via the biaxial mirror unit 5, the galvano scanner unit 3 and the mirror 8b and is detected by a light receiving element of the distance measurement laser device 9. The distance measurement laser device 9 derives an irradiation distance between the distance measurement laser device 9 and the inspection target M on the basis of the reflected light detected by the light receiving element and outputs information representing the derived irradiation distance (irradiation distance information) to the processing unit 100.

The processing unit 100 acquires information representing the irradiation distance output by the distance measurement laser device 9 and derives an amount of adjustment of the distance between the lens 12a and the lens 12b of the excitation laser condensing unit 10 and a time period required for the adjustment on the basis of the acquired information representing the irradiation distance. The processing unit 100 adjusts the distance between the lens 12a and the lens 12b on the basis of the derived amount of adjustment. Specifically, the processing unit 100 outputs information representing the derived amount of adjustment of the distance between the lens 12a and the lens 12b to the excitation laser condensing unit 10. The excitation laser condensing unit 10 acquires information representing the amount of adjustment of the distance between the lens 12a and the lens 12b output by the processing unit 100 and adjusts the distance between the lens 12a and the lens 12b on the basis of the acquired information representing the amount of adjustment of the distance between the lens 12a and the lens 12b. The adjustment of the distance between the lens 12a and the lens 12b is performed by moving either or both of the lens 12a and the lens 12b. By adjusting the distance between the lens 12a and the lens 12b, the excitation laser light can be condensed and radiated to the inspection target M.

Figure 3A:
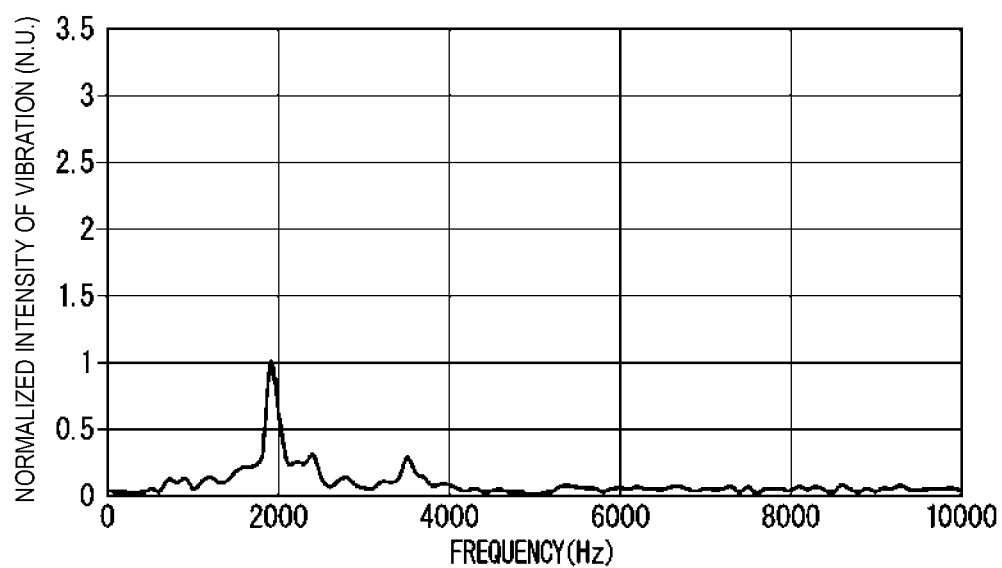
FIG. 3A is a diagram showing an example of a frequency spectrum of induced vibration obtained by a processing unit of the laser-induced vibration wave measuring system of the first embodiment.
Figure 3B:
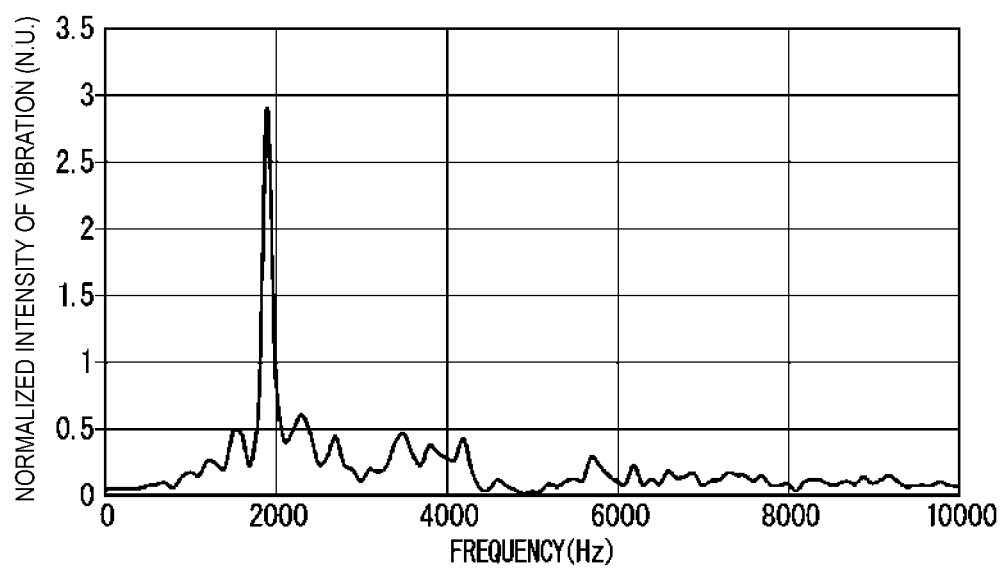
FIG. 3B is a diagram showing an example of a frequency spectrum of induced vibration obtained by the processing unit of the laser-induced vibration wave measuring system of the first embodiment.

FIGS. 3A and 3B are diagrams showing an example of a frequency spectrum of induced vibration obtained by the processing unit of the laser-induced vibration wave measuring system of the first embodiment. In FIGS. 3A and 3B, the horizontal axis represents a frequency of the induced vibration and the vertical axis represents a normalized intensity of vibration. The normalized intensity of vibration is an intensity when a peak value before adjustment is 1. FIG. 3A is a frequency spectrum obtained when the distance between the lens 12a and the lens 12b is not adjusted. Also, FIG. 3B is a frequency spectrum obtained when the distance between the lens 12a and the lens 12b is adjusted. For example, in FIGS. 3A and 3B, a condensing diameter (FIG. 3A) of the excitation laser light in a state in which the distance between the lenses 12a and 12b is not adjusted is 7.9 mm and a condensing diameter (FIG. 3B) of the excitation laser light in a state in which the distance between the lenses 12a and 12b is adjusted is 4.4 mm.

According to FIG. 3A, because the condensing diameter of the excitation laser light is widened when the distance between the lens 12a and the lens 12b is not adjusted, an intensity of irradiation per unit area of the excitation laser light for exciting the surface vibration of the inspection target M decreases. Thus, the intensity of a signal in the frequency spectrum decreases.

Frequency spectra of induced vibrations shown in FIGS. 3A and 3B are obtained when excitation is performed in an ablation mode. Also, although the intensity of a signal is reduced by widening the condensing diameter, it is possible to perform switching to a thermal mode in which measurement is performed only by thermal expansion without damaging the surface in ablation. In the case of the thermal mode, the condensing diameter of the excitation laser light becomes about 100 mm. Thus, it is preferable that the condensing diameter of the excitation laser light be 100 μm to 100 mm.

According to FIG. 3B, because the condensing diameter of the excitation laser light is narrowed when the distance between the lens 12a and the lens 12b is adjusted, an intensity of irradiation per unit area of the excitation laser light for exciting the surface vibration of the inspection target M increases. Thus, the intensity of a signal in the frequency spectrum is improved. The intensity of irradiation per unit area is in a preferable range of 10 mJ/cm$^2$ to 10 kJ/cm$^2$. Returning to FIG. 1, the description will be continued.

The processing unit 100 acquires information representing the irradiation distance output by the distance measurement laser device 9 and derives an amount of adjustment of the distance between the lens 12c and the lens 12d of the measurement laser condensing unit 11 and a time period required for the adjustment on the basis of the acquired information representing the irradiation distance. The processing unit 100 adjusts the distance between the lens 12c and the lens 12d on the basis of the derived amount of adjustment. Specifically, the processing unit 100 outputs information representing the derived amount of adjustment of the distance between the lens 12c and the lens 12d to the excitation laser condensing unit 10. The excitation laser condensing unit 10 acquires the information representing the amount of adjustment of the distance between the lens 12c and the lens 12d output by the processing unit 100 and adjusts the distance between the lens 12c and the lens 12d on the basis of information representing the acquired amount of adjustment of the distance between the lens 12c and the lens 12d. The adjustment of the distance between the lens 12c and the lens 12d is performed by moving either or both of the lens 12c and the lens 12d. By adjusting the distance between the lens 12c and the lens 12d, the measurement laser light can be condensed and radiated to the inspection target M.

When the distance between the lens 12*c* and the lens 12*d* is not adjusted, the measurement laser system that detects the vibration of the condensing position will not be able to perform measurement because the condensing position is not set on the inspection target.

Next, a process of setting a location of the inspection target M to be irradiated with at least one of the excitation laser light, the measurement laser light, and the distance measurement laser light will be described. Because it is possible to exclude a "change in a measurement target surface" by setting the location of the inspection target M to be irradiated with at least one of the excitation laser light, the measurement laser light, and the distance measurement laser light, it is possible to exclude one of the causes of the measurement error when high-speed measurement is performed.

The imaging device 13 images a location of the inspection target M scheduled to be irradiated with the laser light. The imaging device 13 transmits information representing an image of the location of the inspection target M scheduled to be irradiated with at least one of the excitation laser light, the measurement laser light, and the distance measurement laser light obtained through the imaging (hereinafter referred to as a "scheduled laser irradiation location image") to the processing unit 100. Specifically, the imaging device 13 images the irradiation areas 200-11, . . . , the irradiation area 200-15, and the like described with reference to FIG. 2.

The processing unit 100 acquires the information representing the scheduled laser irradiation location image transmitted by the imaging device 13 and performs image processing on the acquired information representing the scheduled laser irradiation location image. The processing unit 100 detects a state of the inspection target M such as wetness, a shape, or an appendage on the basis of the scheduled laser irradiation location image obtained through the image processing. The processing unit 100 selects a scheduled laser irradiation location to be irradiated with either or both of the excitation laser light and the measurement laser light from a plurality of scheduled laser irradiation locations on the basis of the state of the inspection target M.

For example, it is preferable to select a scheduled laser irradiation location that has no uneven shadow, is flat, has the same wetness as other scheduled laser irradiation locations, and has no appendage on the basis of the state of the inspection target M. It is preferable to avoid a location where there is an appendage, a cracked location (an inside of a crack), a repaired location, and a marked location as the scheduled laser irradiation location.

When all selected scheduled laser irradiation locations are connected by a line on the basis of the selected scheduled laser irradiation locations, the processing unit 100 selects a route having the shortest length from among routes for radiating laser light represented by the connected line. Also, when there is a route that passes over the appendage, the processing unit 100 may select the shortest route under the assumption that the laser light is blocked by a physical shutter so that the appendage is not irradiated with the laser light. The processing unit 100 sets the selected route as a sweep route and outputs a result of selecting an irradiation location including information representing the sweep route to the galvano scanner unit 3 and the biaxial mirror unit 5.

The galvano scanner unit 3 and the biaxial mirror unit 5 sweep at least one of the excitation laser light, the measurement laser light, and the distance measurement laser light on the basis of the result of selecting the irradiation location output by the processing unit 100.

A process of reducing an influence of a sound generated by irradiating the inspection target M with at least one of the excitation laser light, the measurement laser light, and the distance measurement laser light and an influence of an echo of the sound will be described. The sound generated by irradiating the inspection target M with the laser light and the echo of the sound are collectively referred to as reverberation sounds. Because "noise originating from an inspection environment" can be excluded by reducing the influence of a sound generated by irradiating the inspection target M with at least one of the excitation laser light, the measurement laser light, and the distance measurement laser light and the influence of an echo of the sound, it is possible to exclude one of the causes of the measurement error when high-speed measurement is performed.

When laser-induced vibration wave measurement is performed in a closed space such as a tunnel, a sound generated by irradiating the inspection target M with either or both of the excitation laser light and the measurement laser light may echo and an echo may become noise.

The inspection target M is irradiated with either or both of the excitation laser light and the measurement laser light at a first timing.

The reverberation sound monitor 7 measures an intensity of a sound generated when the inspection target M is irradiated with either or both of the excitation laser light and the measurement laser light at the first timing. Here, the sound includes a sound generated when the inspection target M is irradiated with either or both of the excitation laser light and the measurement laser light, an echo generated when the sound echoes by a tunnel wall or the like, and a reverberation sound. The reverberation sound monitor 7 converts the measured sound into an electrical signal and outputs an intensity of a sound (hereinafter referred to as "sound information") obtained through the conversion into the electrical signal to the processing unit 100.

The processing unit 100 generates time-series data of an intensity of a reverberation sound on the basis of the sound information output by the reverberation sound monitor 7.

The reverberation sound monitor 7 measures an intensity of a sound generated when the inspection target is irradiated with either or both of the excitation laser light and the measurement laser light. The reverberation sound monitor 7 converts the measured sound into an electrical signal and outputs sound information obtained through the conversion into the electrical signal to the processing unit 100. The processing unit 100 generates time-series data of an intensity of a reverberation sound on the basis of the sound information output by the reverberation sound monitor 7.

Time-series data of the reverberation sound will be described using FIG. 7A. S1 is time-series data of a reverberation sound measured when the inspection target is irradiated with either or both of the excitation laser light and the measuring laser light at a timing of 0 ms. For example, a signal observed at 20 ms, 50 ms, 75 ms, or the like in S1 is a reverberation sound. Because the time-series data of the reverberation sound changes according to a measurement environment (for example, the size and the shape of the tunnel, the distance to the inspection target, or the like), it is desirable to perform measurement each time the measurement environment changes and output a measurement result to the processing unit 100.

The processing unit 100 derives a laser irradiation timing at which the influence of the reverberation sound is small and a time period in which the vibration of the inspection target M can be measured is longest on the basis of the time-series data of the reverberation sound. For example, in FIG. 7A, laser irradiation and measurement are performed four times in total at intervals of 20 ms. The time-series data of the reverberation sound generated in $x^{th}$ irradiation is Sx and the measurement is performed in a time period of Mx immediately after the laser irradiation. Because the reverberation sound is generated for each irradiation operation, reverberation sounds (S1 to S(x−1)) of the laser irradiation operations up to $(x-1)^{th}$ irradiation are summed and remains in the measurement time period of Mx. If the peak of the reverberation sound is included in the measurement time period, the accuracy of measurement decreases. For example, peaks of S1 and S2 are included in a measurement time period of M3. The processing unit 100 derives a laser irradiation timing at which the influence of a reverberation sound of previous irradiation is minimized with respect to each measurement operation. Specifically, as shown in FIG. 7B, a laser irradiation timing (interval) at which the intensity of time-series data obtained by summing the reverberation sounds of S1 to S(x−1) is minimized in the measurement time period of Mx is derived. Also, because time-series data of a reverberation sound generated in one laser irradiation operation is the same every time when the measurement environment does not change, the same time-series data may be used for S1 to Sx if the measurement environment does not change. The processing unit 100 outputs information representing the derived timing to either or both of the excitation laser device 1 and the measurement laser device 2. Because it is not preferable to change a timing during a high-speed sweep operation by the galvano scanner unit 3, it is preferable that the processing unit 100 change the timing when a high-speed sweep range is changed by the biaxial mirror unit 5, i.e., while the high-speed sweep unit is stopped.

Either or both of the excitation laser device 1 and the measurement laser device 2 output either or both of the excitation laser light and the measurement laser light on the basis of the information representing the timing output by the processing unit 100.

The processing unit 100 constituting the laser-induced vibration wave measuring system 20 will be described in detail.

(Processing Unit 100)

Figure 4:
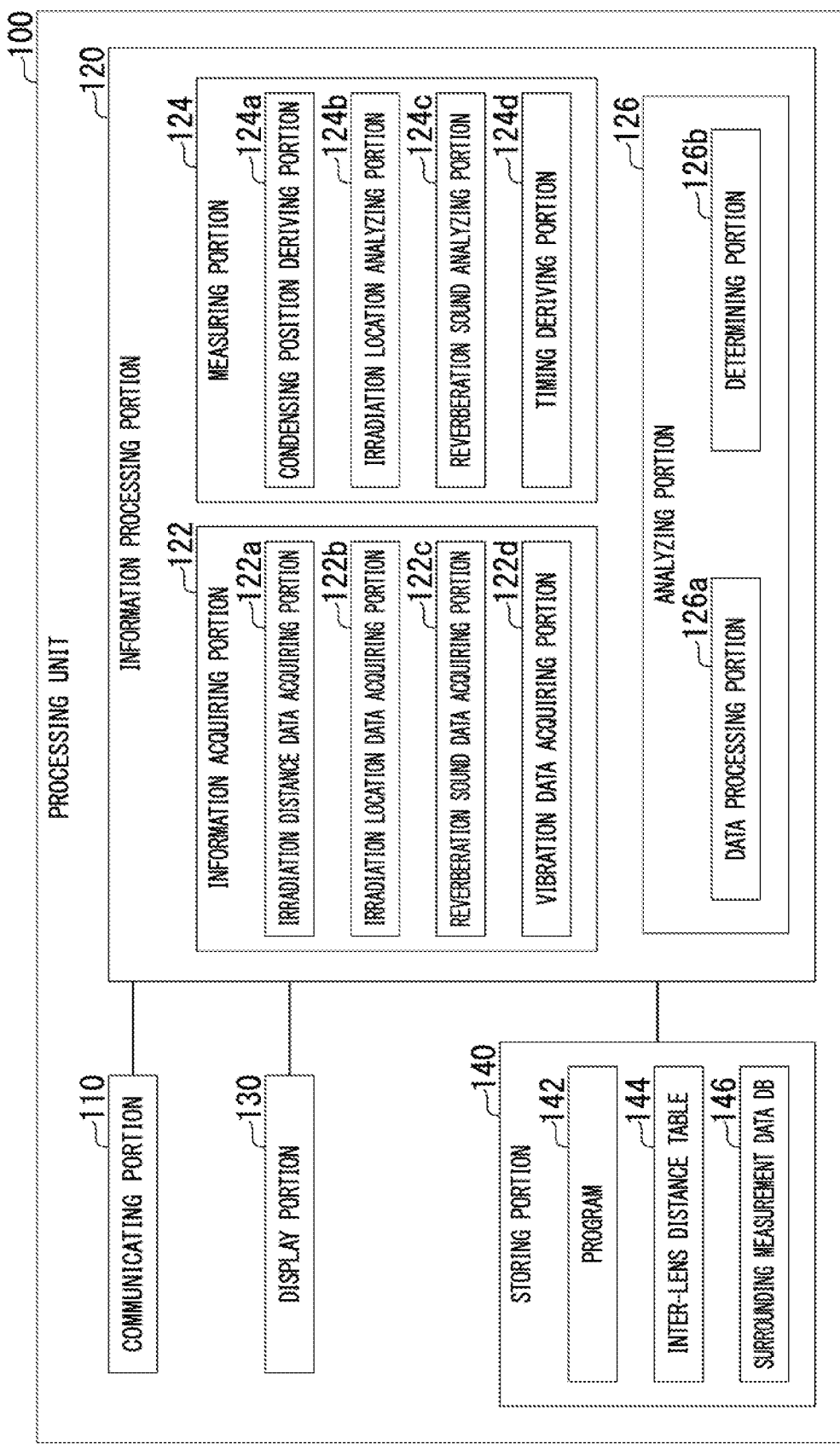
FIG. 4 is a block diagram showing an example of the processing unit of the laser-induced vibration wave measuring system of the first embodiment.

FIG. 4 is a block diagram showing an example of a processing unit of the laser induced vibration wave measuring system of the first embodiment.

The processing unit 100 is implemented by a device such as a personal computer, a server, a smartphone, a tablet computer, or an industrial computer.

The processing unit 100 includes, for example, a communicating portion 110, an information processing portion 120, a display portion 130, and a storing portion 140.

The communicating portion 110 is implemented by a communication module. The communicating portion 110 communicates with other external devices via a network. The communicating portion 110 may perform communication using a communication scheme of a wireless local area network (LAN), a wired LAN, Bluetooth (registered trademark), Long Term Evolution (LTE) (registered trademark), or the like.

The communicating portion 110 receives information representing an irradiation distance output by the distance measurement laser device 9 and outputs the received information representing the irradiation distance to the information processing portion 120. The communicating portion 110 acquires control information including information representing an amount of adjustment of a condensing position such as an amount of adjustment of a distance between the lens 12a and the lens 12b output by the information processing portion 120 with respect to the information representing the irradiation distance and outputs the acquired control information including the information representing the amount of adjustment of the condensing position to the excitation laser condensing unit 10.

Also, the communicating portion 110 acquires control information including information representing an amount of adjustment of a condensing position such as an amount of adjustment of a distance between the lens 12c and the lens 12d output by the information processing portion 120 with respect to information representing the irradiation distance and outputs the acquired control information to the measurement laser condensing unit 11.

The communicating portion 110 receives information representing the scheduled laser irradiation location image output by the imaging device 13 and outputs the received information representing the scheduled laser irradiation location image to the information processing portion 120. The communicating portion 110 acquires control information including a result of selecting the irradiation location output by the information processing portion 120 with respect to the information representing the laser irradiation location image and transmits the acquired control information to the galvano scanner unit 3 and the biaxial mirror unit 5.

The communicating portion 110 outputs sound information output by the reverberation sound monitor 7 to the information processing portion 120. The communicating portion 110 acquires control information including information representing a timing output by the information processing portion 120 with respect to sound information and outputs the acquired control information to either or both of the excitation laser device 1 and the measurement laser device 2.

The communicating portion 110 outputs vibration data output by the measurement laser device 2 to the information processing portion 120.

For example, the display portion 130 includes a liquid crystal display or the like, and displays a result of inspecting the faultlessness of a portion of the inspection target M irradiated with the excitation laser light.

For example, the storing portion 140 is implemented by a random access memory (RAM), a read only memory (ROM), a hard disk drive (HDD), a flash memory, a hybrid storage device in which the RAM, the ROM, and the HDD are combined, or the like. Instead of a case in which the storing portion 140 is provided as a part of the processing unit 100, a part or all of the storing portion 140 may be implemented by an external device capable of being accessed by a processor of the processing unit 100 via a network such as a network attached storage (NAS) or an external storage server. The storing portion 140 stores a program 142 to be executed by the information processing portion 120, an inter-lens distance table 144, and a surrounding measurement data database (DB) 146.

The inter-lens distance table 144 is information in the form of a table in which information representing an irradiation distance, a focal position adjusted by the excitation laser condensing unit 10 for aligning a focus at the irradiation distance, a focal position adjusted by the measurement laser condensing unit 11, and a time period required for adjusting the focal position are associated. In the present embodiment, description will continue with a case in which the focal position is adjusted in the measurement laser condensing unit 11 by adjusting an inter-lens distance between the lenses 12a and 12b and the focal position is adjusted in the measurement laser condensing unit 11 by adjusting an inter-lens distance between the lenses 12c and 12d.

The surrounding measurement data DB 146 stores vibration data measured in the past.

For example, the information processing portion 120 is a functional portion (hereinafter referred to as a software function portion) implemented by a processor such as a central processing unit (CPU) executing the program 142 stored in the storing portion 140. Also, all or a part of the information processing portion 120 may be implemented by hardware such as a large-scale integration (LSI) circuit, an application specific integrated circuit (ASIC), or a field-programmable gate array (FPGA) or may be implemented by a combination of the software function portion and the hardware.

The information processing portion 120 includes, for example, an information acquiring portion 122, a measuring portion 124, and an analyzing portion 126.

The information acquiring portion 122 includes an irradiation distance data acquiring portion 122a, an irradiation location data acquiring portion 122b, a reverberation sound data acquiring portion 122c, and a vibration data acquiring portion 122d.

The irradiation distance data acquiring portion 122a acquires information representing the irradiation distance output by the communicating portion 110 and outputs the acquired information representing the irradiation distance to the measuring portion 124.

The irradiation location data acquiring portion 122b acquires information representing a scheduled laser irradiation location image output by the communicating portion 110 and outputs the acquired information representing the scheduled laser irradiation location image to the measuring portion 124.

The reverberation sound data acquiring portion 122c acquires sound information output by the communicating portion 110 and outputs the acquired sound information to the measuring portion 124.

The vibration data acquiring portion 122d acquires vibration data output by the communicating portion 110 and outputs the acquired vibration data to the analyzing portion 126.

(Measuring Portion 124)

The measuring portion 124 includes a condensing position deriving portion 124a, an irradiation location analyzing portion 124b, a reverberation sound analyzing portion 124c, and a timing deriving portion 124d.

The condensing position deriving portion 124a acquires information representing the irradiation distance output by the irradiation distance data acquiring portion 122a and derives an amount of adjustment of the distance between the lens 12a and the lens 12b, an amount of adjustment of the distance between the lens 12c and the lens 12d, and a time period required for adjusting the distance between the lenses on the basis of the acquired information representing the irradiation distance.

Specifically, the condensing position deriving portion 124a acquires information representing a current distance between the lens 12a and the lens 12b from the excitation laser condensing unit 10 and stores the acquired information representing the current distance between the lens 12a and the lens 12b. It is preferable that the condensing position deriving portion 124a acquire the information representing the current distance between the lens 12a and the lens 12b during a high-speed sweep operation of the galvano scanner unit 3, in other words, at a timing when the galvano scanner unit 3 stops. Also, the condensing position deriving portion 124a acquires information representing the current distance between the lens 12c and the lens 12d from the measurement laser condensing unit 11 and stores the acquired information representing the current distance between the lens 12c and the lens 12d. It is preferable that the condensing position deriving portion 124a acquire information representing the current distance between the lens 12c and the lens 12d during a high-speed sweep operation of the galvano scanner unit 3, in other words, at the timing when the galvano scanner unit 3 stops.

When the information representing the irradiation distance has been acquired, the condensing position deriving portion 124a acquires an inter-lens distance between the lenses 12a and 12b and a time period required for adjusting the inter-lens distance stored in association with the acquired information representing the irradiation distance with reference to the inter-lens distance table 144. The condensing position deriving portion 124a derives a difference between the acquired inter-lens distance between the lens 12a and the lens 12b and the current distance between the lens 12a and the lens 12b, thereby deriving an amount of adjustment of the distance between the lens 12a and the lens 12b. The condensing position deriving portion 124a outputs information representing the derived amount of adjustment of the distance between the lenses 12a and 12b and time information required for adjusting the inter-lens distance to the timing deriving portion 124d.

Also, when the information representing the irradiation distance has been acquired, the condensing position deriving portion 124a acquires an inter-lens distance between the lens 12c and the lens 12d and a time period required for adjusting the inter-lens distance stored in association with the acquired information representing the irradiation distance with reference to the inter-lens distance table 144. The condensing position deriving portion 124a derives a difference between the acquired inter-lens distance between the lens 12c and the lens 12d and the current distance between the lens 12c and the lens 12d, thereby deriving an amount of adjustment of the distance between the lens 12c and the lens 12d. The condensing position deriving portion 124a outputs information representing the derived amount of adjustment of the distance between the lens 12c and the lens 12d and time information required for adjusting the inter-lens distance to the timing deriving portion 124d.

The irradiation location analyzing portion 124b acquires the information representing the scheduled laser irradiation location image output by the irradiation location data acquiring portion 122b and performs image processing on the acquired information representing the scheduled laser irradiation location image. The irradiation location analyzing portion 124b detects a state of the inspection target M such as wetness, a shape, or an appendage on the basis of the scheduled laser irradiation location image obtained through the image processing. The irradiation location analyzing portion 124b selects a scheduled laser irradiation location that has no uneven shadow, is flat, has the same wetness as other scheduled laser irradiation locations, and has no appendage on the basis of the state of the inspection target M.

For example, when all selected scheduled laser irradiation locations are connected by a line on the basis of the selected scheduled laser irradiation locations, the irradiation location analyzing portion 124b selects a route having the shortest length from among routes for radiating laser light represented by the connected line. Also, when there is a route that passes over the appendage, the irradiation location analyzing portion 124b may select the shortest route under the assumption that the laser light is blocked by the physical shutter so that the appendage is not irradiated with the laser light. The irradiation location analyzing portion 124b sets the selected route as a sweep route and outputs a result of selecting an irradiation location including information representing the sweep route to the timing deriving portion 124d. The sweep operation can be performed at the highest speed using a route having the shortest length among routes of all the selected scheduled laser irradiation locations connected by a line as the sweep route.

Figure 5:
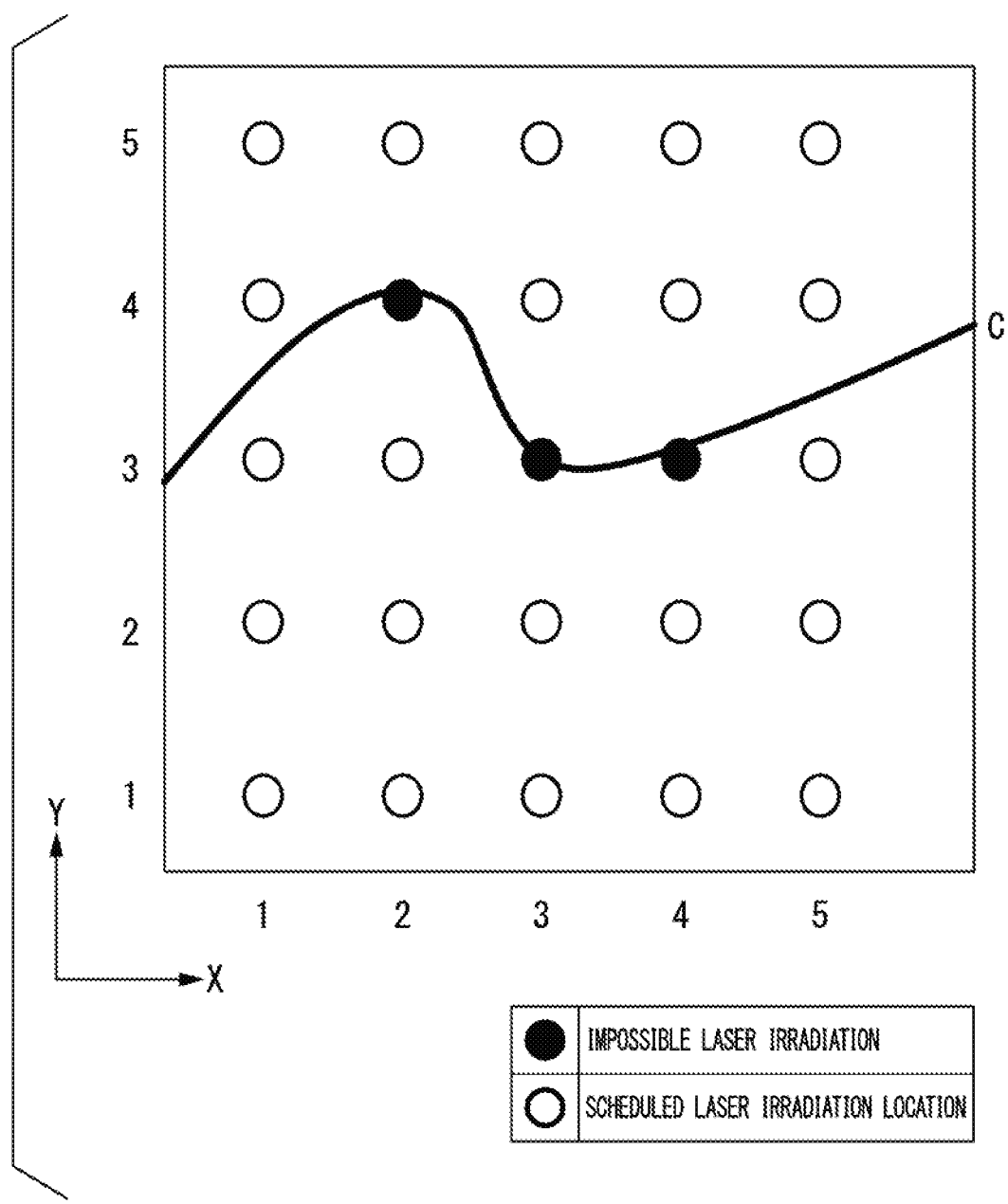
FIG. 5 is a diagram showing an example of a scheduled laser irradiation location image.

FIG. 5 is a diagram showing an example of a scheduled laser irradiation location image. In an example of the scheduled laser irradiation location image shown in FIG. 5, a total of 25 scheduled laser (excitation laser) irradiation locations formed by five vertical locations and five horizontal locations are shown. Further, a cable C is shown in an example of the scheduled laser irradiation location image.

The irradiation location analyzing portion 124b determines that laser irradiation is not possible because the cable C is present on each scheduled laser irradiation location with respect to scheduled laser irradiation locations where (X, Y) is (2, 4), (3, 3), and (4, 3) among the 25 scheduled laser irradiation locations on the basis of the scheduled laser irradiation location image. The irradiation location analyzing portion 124b selects scheduled laser irradiation locations other than the scheduled laser irradiation locations where (X, Y) is (2, 4), (3, 3), and (4, 3) and selects a route having the shortest length among routes indicated by a line connecting all the selected scheduled laser irradiation locations. The irradiation location analyzing portion 124b sets the selected route as the sweep route and outputs a result of selecting an irradiation location including information representing the sweep route to the timing deriving portion 124d. Returning to FIG. 4, the description will be continued.

The reverberation sound analyzing portion 124c derives a measurement condition on the basis of sound information output by the reverberation sound data acquiring portion 122c.

Figure 6:
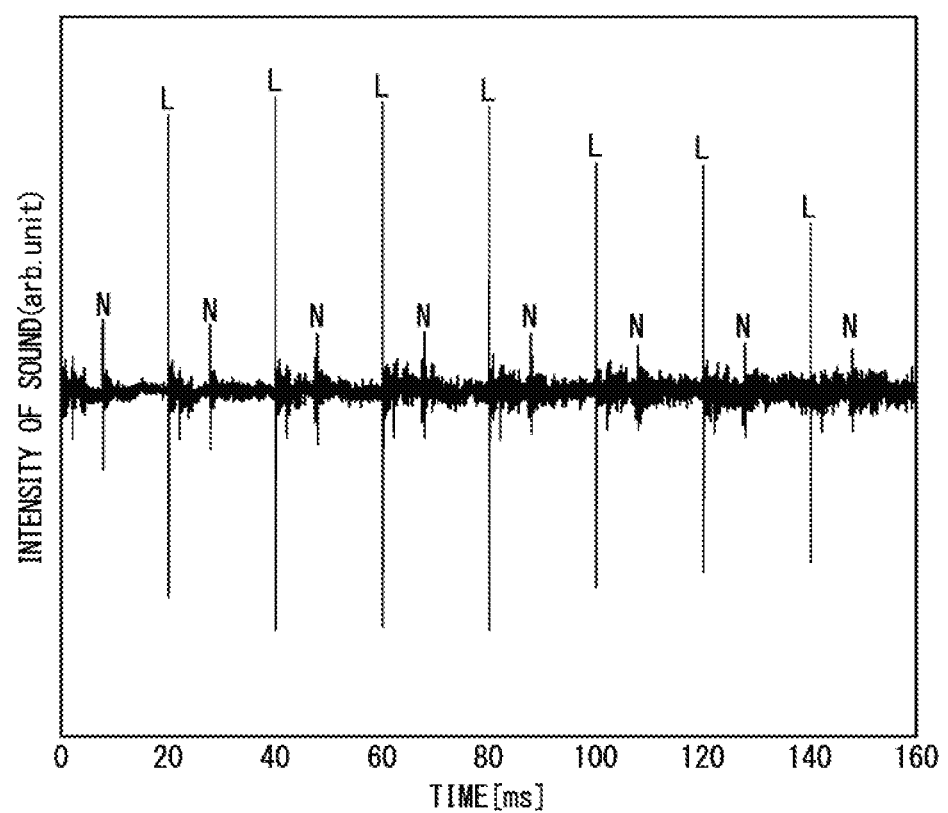
FIG. 6 is a diagram showing an example (part 1) of sound information.

FIG. 6 is a diagram showing an example (part 1) of sound information. In FIG. 6, the horizontal axis represents time [ms] and the vertical axis represents an intensity of a sound (arb. unit). This sound information is an inspection speed of 50 Hz, i.e., measurement is performed 50 times per second. In the example shown in FIG. 6, the inspection target M is irradiated with the excitation laser light every 20 ms. Thus, a sound is generated by irradiating the inspection target M with the excitation laser light every 20 ms and a plurality of peaks L of the sound are detected. Furthermore, after 8 ms of each of the plurality of peaks L, a peak N and an attenuation waveform due to a reverberation sound of the sound generated by irradiating the inspection target M with the excitation laser light are detected for several milliseconds. Because the plurality of peaks N and each of the attenuation waveforms are noise, the accuracy of measurement deteriorates if the time when each of the plurality of peaks N is detected is included in the measurement time. This will be specifically described.

Figure 7A:
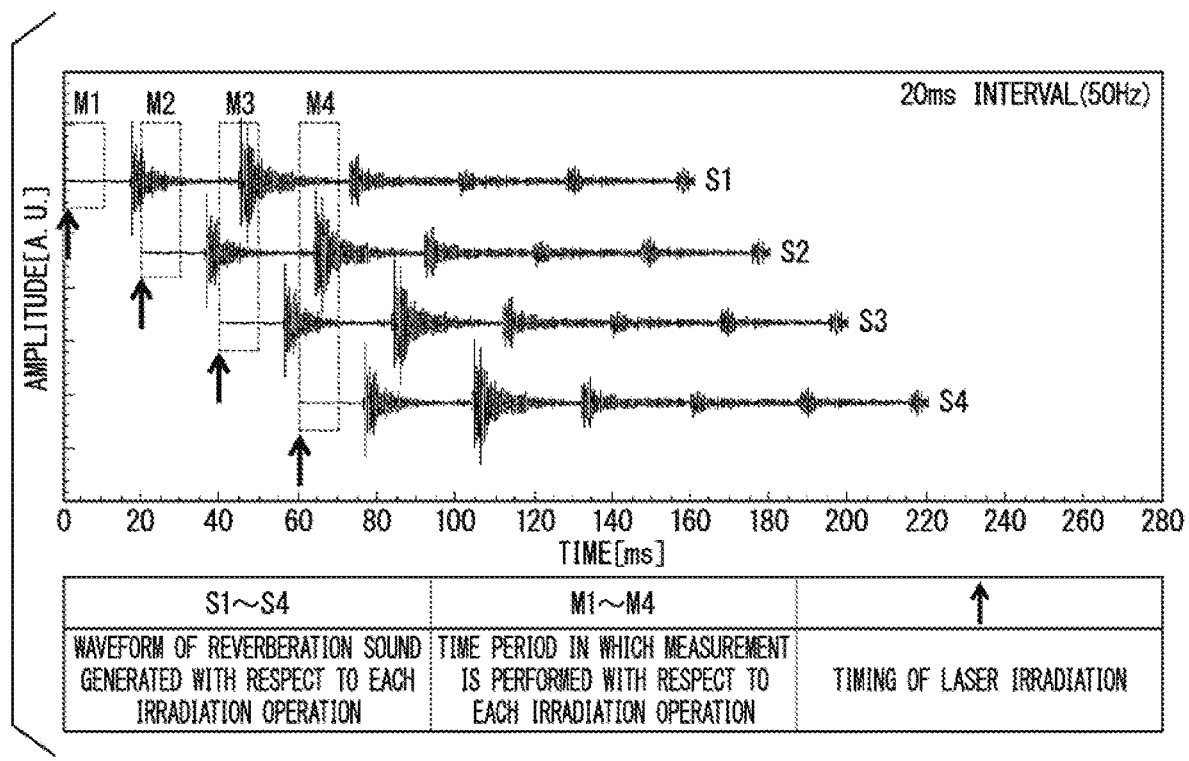
FIG. 7A is a diagram showing an example (part 2) of sound information.
Figure 7B:
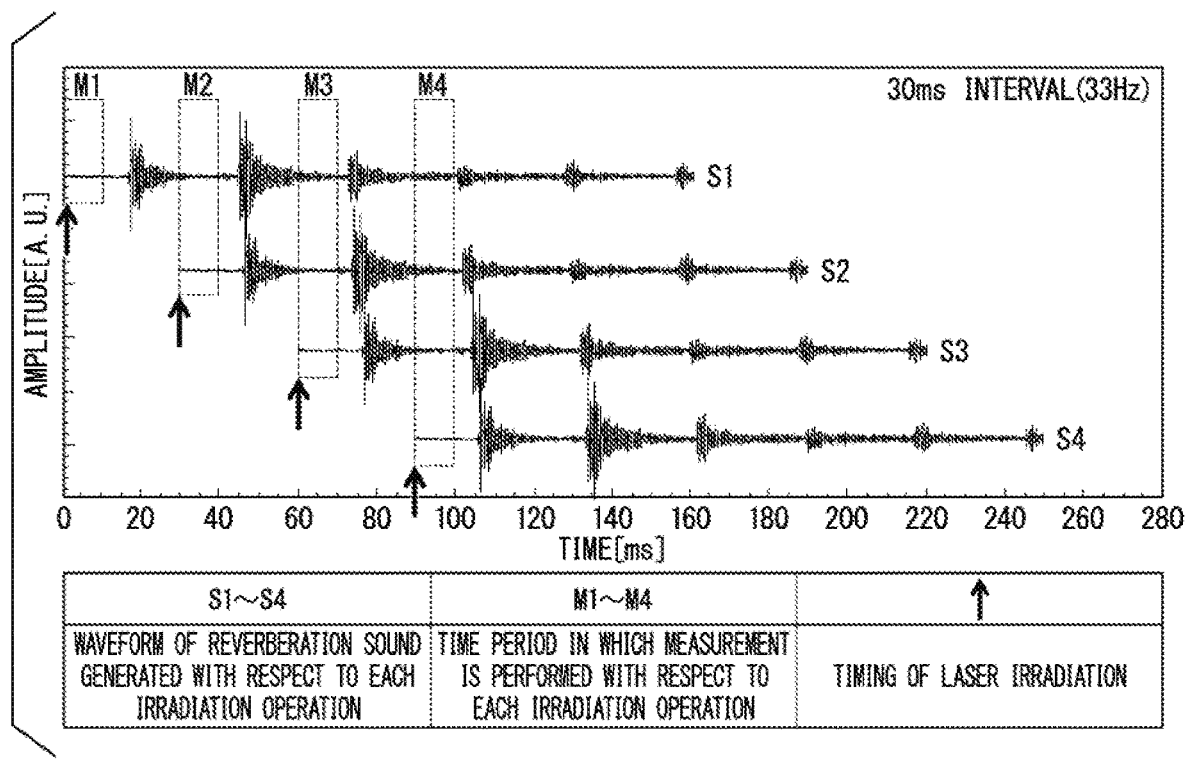
FIG. 7B is a diagram showing an example (part 2) of sound information.

FIGS. 7A and 7B are diagrams showing an example (part 2) of the sound information.

Figure 8A:
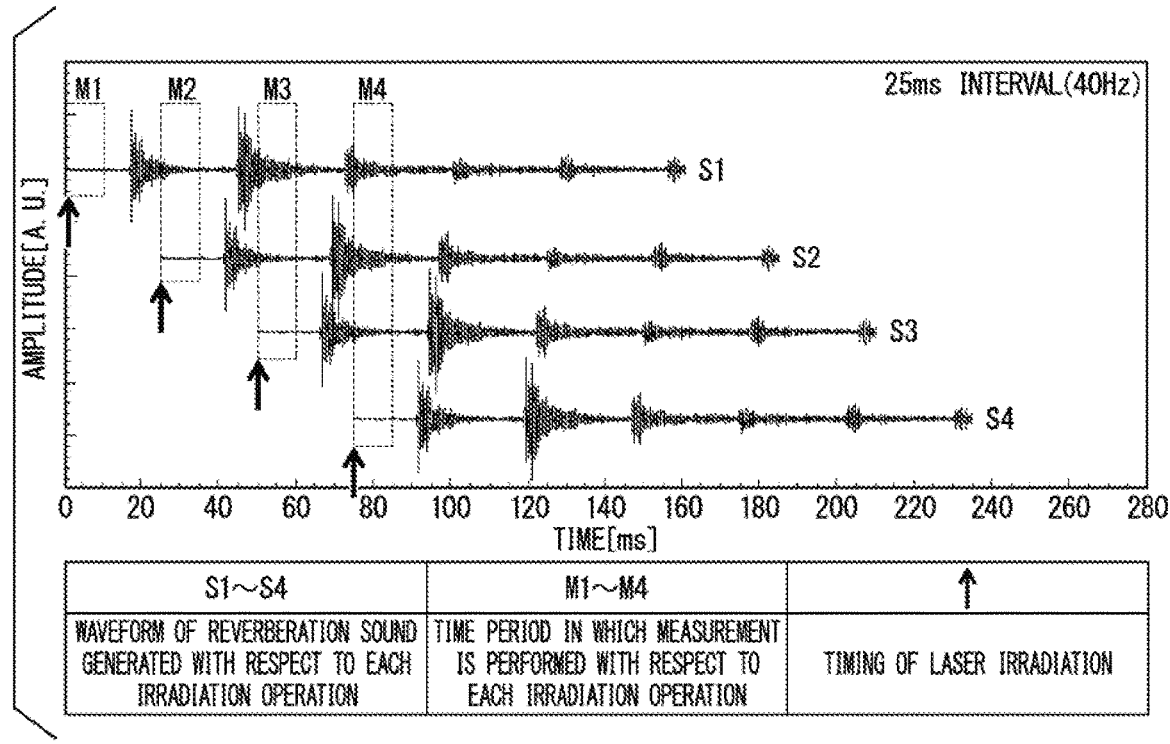
FIG. 8A is a diagram showing an example (part 3) of sound information.
Figure 8B:
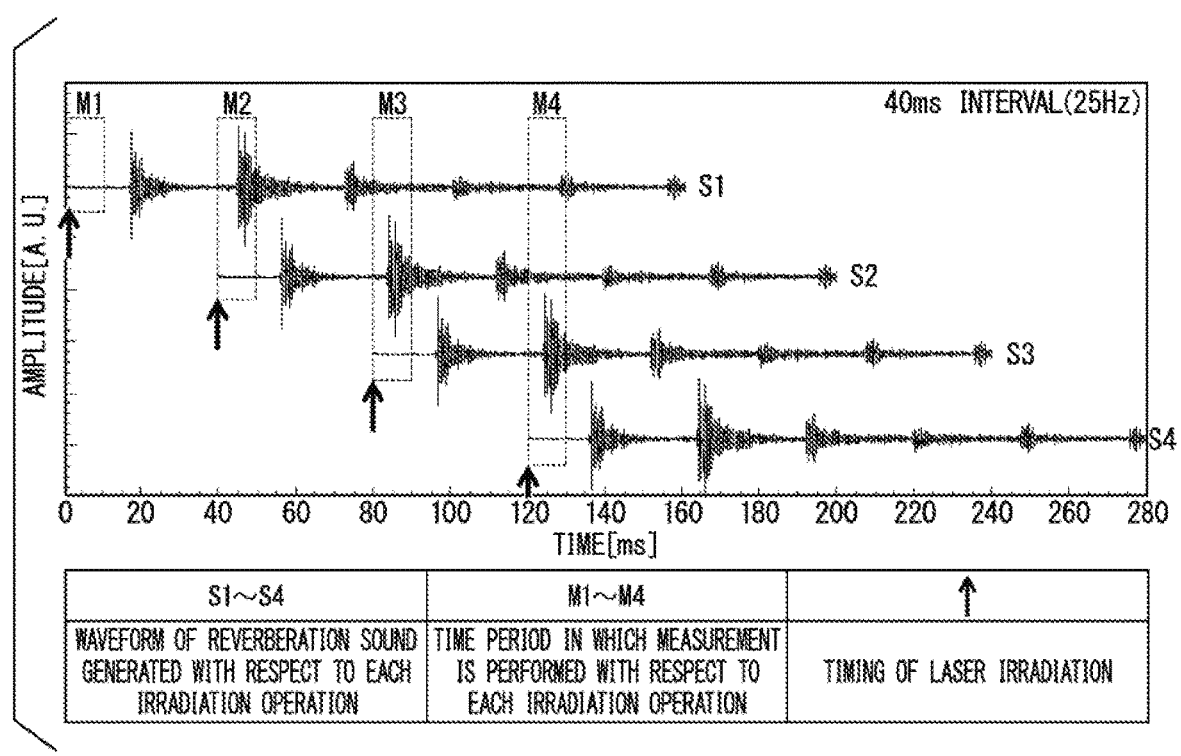
FIG. 8B is a diagram showing an example (part 3) of sound information.

FIGS. 8A and 8B are diagrams showing an example (part 3) of the sound information.

FIG. 7A shows a reverberation sound generated by the excitation laser light that has been sequentially radiated when the inspection target M is sequentially irradiated with the excitation laser light at 20 ms intervals (50 Hz). Because a measurement environment in FIG. 7A is different from that in FIG. 6, a timing at which noise due to the reverberation sound occurs is different in FIG. 7A. Also, the waveform of the reverberation sound is observed as a single peak in FIG. 6 and is observed as an attenuation waveform in FIG. 7A, which is a difference in irradiation energy. An afterimage sound is a periodic sound signal which is received outside the irradiation time of the excitation laser light.

FIG. 7B shows a reverberation sound generated by the excitation laser light that has been sequentially radiated when the inspection target M has been sequentially irradiated with the excitation laser light at 30 ms intervals (33 Hz).

In FIGS. 7A and 7B, waveforms S1 to S4 are waveforms representing reverberation sounds generated by sequentially irradiating the inspection target M with the excitation laser light. Time periods M1 to M4 are time periods in which vibrations generated in the inspection target M are measured with respect to the sequentially radiated laser light. An upward arrow indicates an irradiation timing of the excitation laser light.

FIG. 8A shows a reverberation sound generated by the excitation laser light that has been sequentially radiated when the inspection target M has been sequentially irradiated with the excitation laser light at 25 ms intervals (40 Hz).

FIG. 8B shows a reverberation sound generated by the excitation laser light that has been sequentially radiated when the inspection target M has been sequentially irradiated with the excitation laser light at 40 ms intervals (25 Hz).

In FIGS. 8A and 8B, waveforms S1 to S4 are waveforms representing reverberation sounds generated by sequentially irradiating the inspection target M with the excitation laser light. Time periods M1 to M4 are time periods in which vibrations generated in the inspection target M are measured with respect to the sequentially radiated laser light. An upward arrow indicates an irradiation timing of the excitation laser light.

According to FIGS. 7A, 7B, 8A, and 8B, the reverberation sound (noise) due to the previous irradiation is included in a measurement result in the time period when second and subsequent measurements (measurement) represented in the time periods M2 to M4 are (is) performed. That is, the vibration measured in a time period of Mn (n is an integer of n>1) includes a waveform obtained by summing all the waveforms S1 to Sn. Specifically, in the case of FIG. 7A, in the vibration measured in the time period M4, waveforms S1 to S4 are included in the measurement result. Among the waveforms S1 to S4, the waveforms S2 and S3 have a particularly large amplitude and an increased number of noise components. However, in the case of FIG. 7B, in the vibration measured in the time period M4, the waveforms S1 to S4 are included in the measurement result, but any of the waveforms S1 to S4 has a small amplitude and a decreased number of noise components.

In the case of FIG. 8A, in the vibration measured in the time period M4, waveforms S1 to S4 are included in the measurement result. Among the waveforms S1 to S4, the waveform S2 has a particularly large amplitude and an increased number of noise components. In the case of FIG. 8B, in the vibration measured in the time period M4, the waveforms S1 to S4 are included in the measurement result. Among the waveforms S1 to S4, the waveform S3 has a particularly large amplitude and an increased number of noise components.

A time waveform of the reverberation sound varies with an irradiation environment such as a size of a tunnel, a road (a road surface), a pier floor plate, a concrete wall, and a position of the reverberation sound monitor 7. The reverberation sound analyzing portion 124c derives a measurement condition such as the number of repetitions (a timing) for minimizing the noise component on the basis of the sound information acquired by the reverberation sound monitor 7 before the vibration is measured. For example, according to FIG. 6, the reverberation sound analyzing portion 124c derives a timing at which the sound becomes a silent sound having a signal amount which is less than or equal to about twice a signal amount of a non-irradiation time (a background) after irradiation with the excitation laser and a time period of the silent sound can be secured for about 10 ms. For example, when the laser-induced vibration wave measuring system 20 is mounted on a moving body or the like to be described below, the timing is derived in the stationary state.

When the reverberation sounds shown in FIGS. 7A, 7B, 8A, and 8B have been obtained, the reverberation sound analyzing portion 124c derives a 30 ms interval (33 Hz) as the measurement condition and outputs the derived measurement condition to the timing deriving portion 124d and the analyzing portion 126. In this manner, it is possible to perform measurement in which an influence of a noise component generated by the excitation laser light that has been sequentially radiated is reduced by optimizing the number of repetitions (the timing). Returning to FIG. 4, the description will be continued.

The timing deriving portion 124d acquires information representing an amount of adjustment of a distance between the lens 12a and the lens 12b output by the condensing position deriving portion 124a and time information required for adjusting an inter-lens distance and outputs control information including the acquired information representing the amount of adjustment of the distance between the lens 12a and the lens 12b to the communicating portion 110 at a predetermined timing on the basis of the acquired time information required for adjusting the inter-lens distance.

The timing deriving portion 124d acquires information representing an amount of adjustment of a distance between the lens 12c and the lens 12d output by the condensing position deriving portion 124a and time information required for adjusting an inter-lens distance and outputs control information including the acquired information representing the amount of adjustment of the distance between the lens 12c and the lens 12d to the communicating portion 110 at a predetermined timing on the basis of the acquired time information required for adjusting the inter-lens distance.

The timing deriving portion 124d acquires information representing a result of selecting an irradiation location output by the irradiation location analyzing portion 124b and outputs control information including the acquired information representing the result of selecting the irradiation location to the communicating portion 110 at a predetermined timing.

The timing deriving portion 124d acquires information representing a measurement condition output by the reverberation sound analyzing portion 124c and outputs control information including the acquired measurement condition to the communicating portion 110 at a predetermined timing.

(Analyzing Portion 126)

The analyzing portion 126 includes a data processing portion 126a and a determining portion 126b.

The data processing portion 126a acquires a measurement condition output by the timing deriving portion 124d and vibration data output by the vibration data acquiring portion 122d and processes the acquired vibration data on the basis of the acquired measurement condition. The data processing portion 126a acquires data of a set measurement time after removing data of a certain time. Specifically, for example, when the measurement time is set to 10 ms, the data processing portion 126a acquires data of irradiation during a period from 10 ms to 20 ms when data of 10 ms has been removed.

Here, when the same location of the inspection target M is measured, the vibration data may be vibration data obtained in a single operation of radiating excitation laser light or vibration data obtained in a plurality of operations of radiating excitation laser light. In this regard, when vibration data obtained in a plurality of operations of radiating excitation laser light is used, the data processing portion 126a may average or integrate the vibration data output by the vibration data acquiring portion 122d.

The data processing portion 126a extracts data of time periods M1, M2, and the like in which measurement is performed from the vibration data on the basis of the measurement condition output by the timing deriving portion 124d. Also, the data processing portion 126a removes a reduction amount arbitrarily determined from the maximum amount of displacement of vibration generated by the excitation laser from the extracted data of the time periods M1, M2, and the like. Here, the reduction amount is, for example, 1/10, 1/100, or the like, and is, for example, data for a predetermined time period such as a period of 0.5 ms to 10 ms after the irradiation with the excitation laser light. Because it is possible to reduce an influence of noise generated immediately after irradiation with the excitation laser light by removing a reduction amount arbitrarily determined from the maximum amount of displacement of vibration generated by the excitation laser after irradiation with the excitation laser light, the accuracy of measurement can be improved.

Figure 9A:
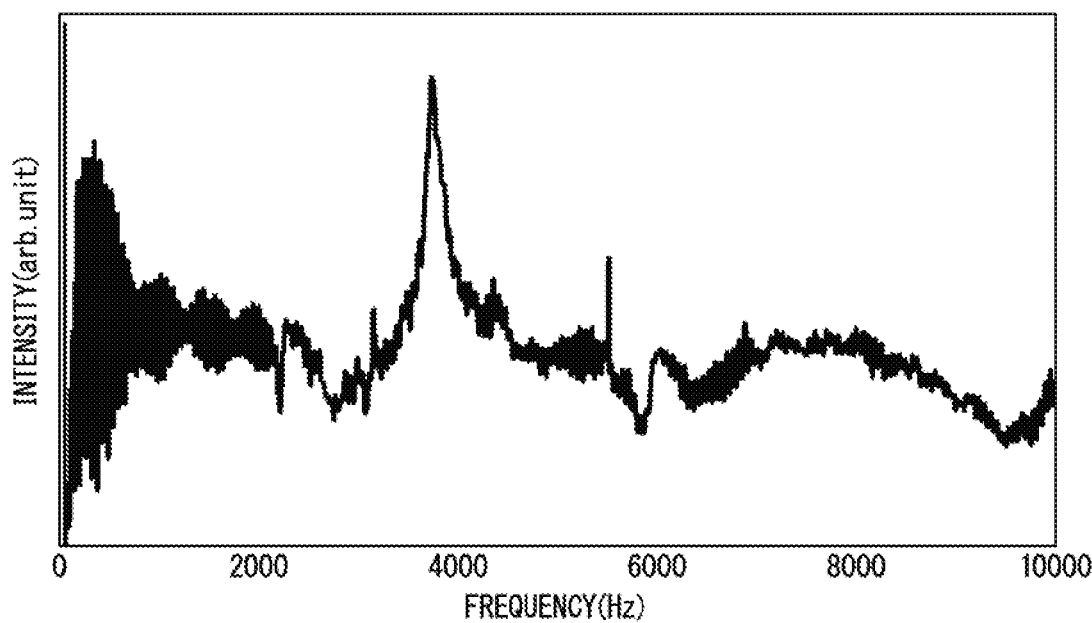
FIG. 9A is a diagram showing an effect of noise removal of the laser-induced vibration wave measuring system of the first embodiment.
Figure 9B:
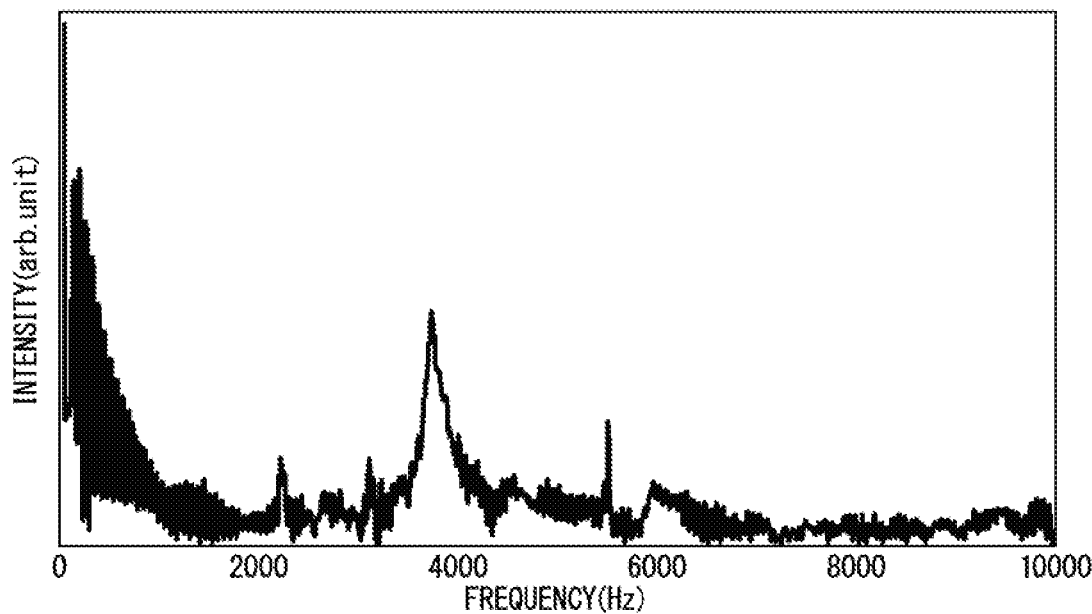
FIG. 9B is a diagram showing an effect of noise removal of the laser-induced vibration wave measuring system of the first embodiment.

FIGS. 9A and 9B are diagrams showing effects of noise removal of the laser-induced vibration wave measuring system of the first embodiment. FIGS. 9A and 9B show frequency spectra obtained by performing a fast Fourier transform on vibration data. FIG. 9A shows a case in which noise is not removed from the vibration data and FIG. 9B shows a case in which noise is removed from the vibration data.

According to FIG. 9A, noise due to a sound generated by the irradiation with the excitation laser light has a large influence and white noise which appears to be raised as a whole is generated. On the other hand, according to FIG. 9B, white noise is reduced and a fine peak is observed.

Also, the data processing portion 126a determines whether or not the acquired vibration data includes noise generated by an unexpected measurement failure. In the laser-induced vibration wave measurement, the vibration generated in the inspection target M is strongest immediately after the irradiation with the excitation laser light and then decreases exponentially with the passage of time. Using an exponential function as an evaluation function, the data processing portion 126a algorithmically determines that vibration data for which its trend and a correlation coefficient of a certain level or higher cannot be obtained includes noise caused by an unexpected measurement failure.

Figure 10:
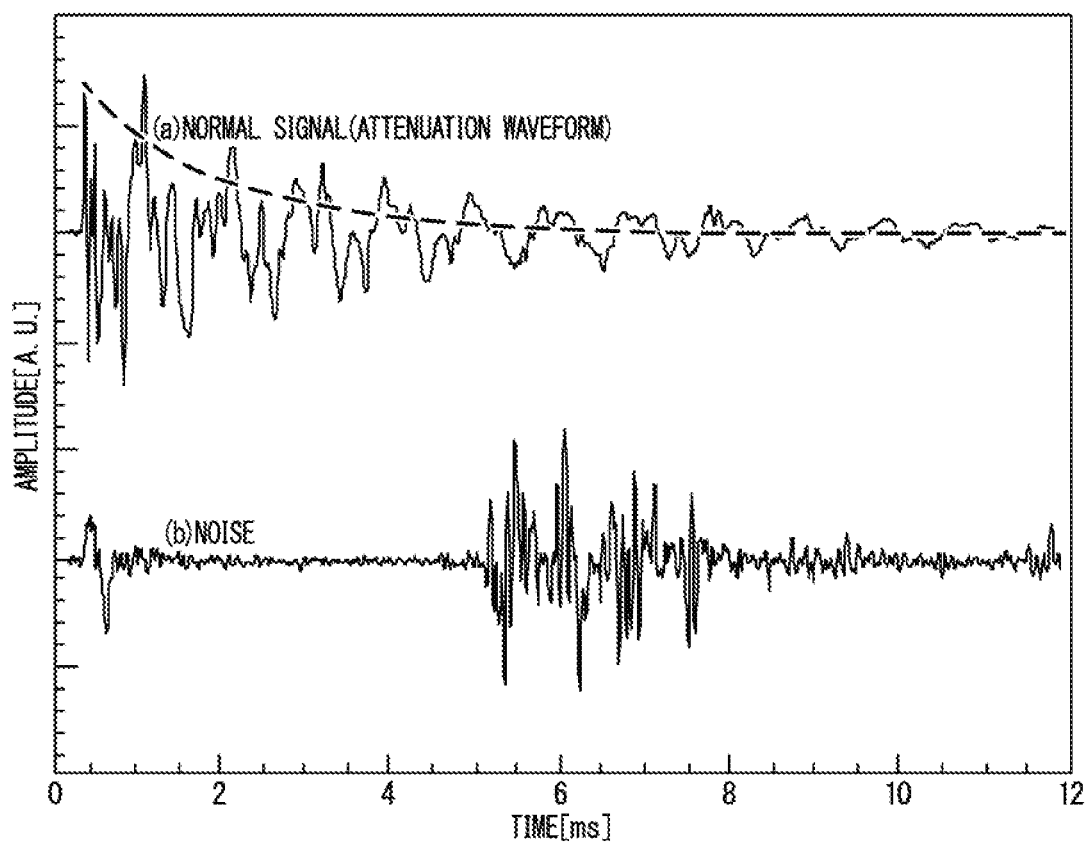
FIG. 10 is a diagram showing an example of noise removal of the laser-induced vibration wave measuring system of the first embodiment.

FIG. 10 is a diagram showing an example of noise removal of the laser-induced vibration wave measuring system of the first embodiment. In FIG. 10, (a) is a normal signal (an attenuation waveform) and (b) is noise caused by an unexpected measurement failure. The data processing portion 126a derives a coefficient of a correlation with the waveform shown in (b) using the attenuation waveform shown in (a) as an evaluation function. When the correlation coefficient is greater than or equal to a correlation coefficient threshold value, the data processing portion 126a determines that the waveform shown in (b) is a signal. Also, when the correlation coefficient is less than the correlation coefficient threshold value, the data processing portion 126a determines that the waveform shown in (b) is not a signal but is noise caused by an unexpected measurement failure. The data processing portion 126a determines that the data determined to include the noise caused by the unexpected measurement failure is invalid data and removes the invalid data. Returning to FIG. 4, the description will be continued.

The data processing portion 126a acquires valid data obtained by removing the invalid data.

Here, when the acquired valid data is data obtained by irradiating the same location of the inspection target M with excitation laser light a plurality of times, the data processing portion 126a removes noise unexpectedly generated by irradiating the same location of the inspection target M with excitation laser light a plurality of times from the valid data. Specifically, because the number of times that noise unexpectedly generated by irradiating the same location with excitation laser light a plurality of times is mixed in the vibration data is less than the total number of times of irradiation, the data processing portion 126a removes data including noise unexpectedly generated by irradiating the same location with excitation laser light a plurality of times by extracting a predetermined number of waveforms from the largest coefficient of a correlation with a waveform obtained by performing a time average operation on the vibration data.

The data processing portion 126a may remove either or both of noise caused by the unexpected measurement failure and the unexpectedly generated noise.

Figure 11:
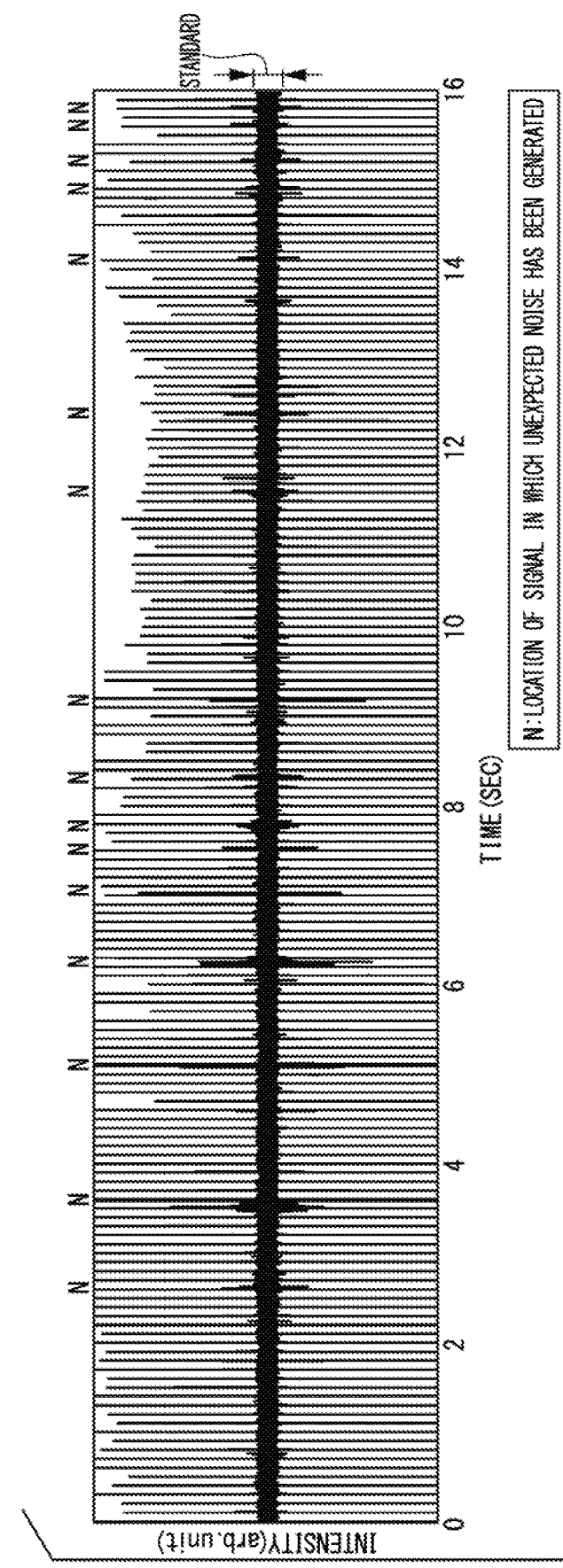
FIG. 11 is a diagram showing an example of vibration data acquired by the laser-induced vibration wave measuring system of the first embodiment.

FIG. 11 is a diagram showing an example of vibration data acquired by the laser-induced vibration wave measuring system of the first embodiment. FIG. 11 shows vibration data for 16 sec when the same location of the inspection target M is measured 160 times at an inspection speed of 10 Hz, the horizontal axis represents time (sec), and the vertical axis represents an intensity of vibration (arb. unit). When a fast Fourier transform (FFT) is performed on an average of 160 data items after measurement is divided into 160 measurement operations, a frequency spectrum similar to that of FIG. 9B is obtained.

According to FIG. 11, in a series of band-shaped signals with an intensity of vibration of −0.001 to 0.001, a peak due to unexpectedly generated noise appears in addition to a periodic peak that occurs when excitation laser light is radiated every 100 ms. Specifically, N in FIG. 11 is a location of a signal in which unexpected noise has been generated. When unexpected noise has been generated, a black band indicated by a standard swells. In FIG. 11, thin lines with equal intervals are white noise.

Figure 12:
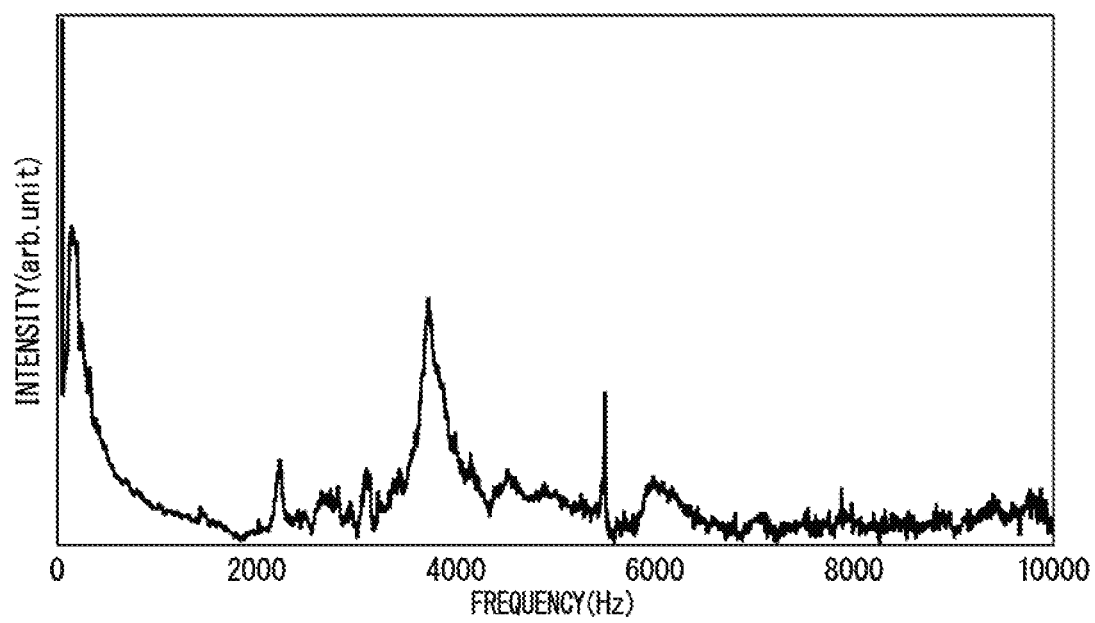
FIG. 12 is a diagram showing an effect of the laser-induced vibration wave measuring system of the first embodiment removing unexpectedly generated noise.

FIG. 12 is a diagram showing an effect of the laser-induced vibration wave measuring system of the first embodiment removing unexpectedly generated noise. FIG. 12 shows a frequency spectrum obtained by performing an FFT after unexpectedly generated noise is removed. A sharper frequency spectrum is obtained as compared with the frequency spectrum obtained by performing an FFT (the lower diagram of FIG. 9) without removing the unexpectedly generated noise. The data processing portion 126a outputs information representing the frequency spectrum to the determining portion 126b. The data processing portion 126a stores the acquired vibration data, the data obtained in the noise removal process, and the information representing the frequency spectrum in the surrounding measurement data DB 146 of the storing portion 140. Returning to FIG. 4, the description will be continued.

The determining portion 126b inspects the faultlessness of a portion of the inspection target M irradiated with the excitation laser light on the basis of the frequency spectrum output by the data processing portion 126a. Specifically, the determining portion 126b detects the presence or absence of an internal defect such as a cavity or a possibility that an internal defect will occur.

Also, the determining portion 126b inspects the faultlessness of a portion of the inspection target M irradiated with excitation laser light using a frequency spectrum obtained by irradiating the inspection target M with the excitation laser light and a frequency spectrum stored in the surrounding measurement data DB 146 of the storing portion 140. Specifically, the determining portion 126b detects the presence or absence of an internal defect such as a cavity or a possibility that an internal defect will occur. The determining portion 126b may apply machine learning to inspect the faultlessness of the portion of the inspection target M irradiated with the excitation laser light. The determining portion 126b may use the frequency spectrum obtained when the excitation laser light is not radiated in a case in which the faultlessness of the portion of the inspection target M irradiated with the excitation laser light is inspected.

Figure 13A:
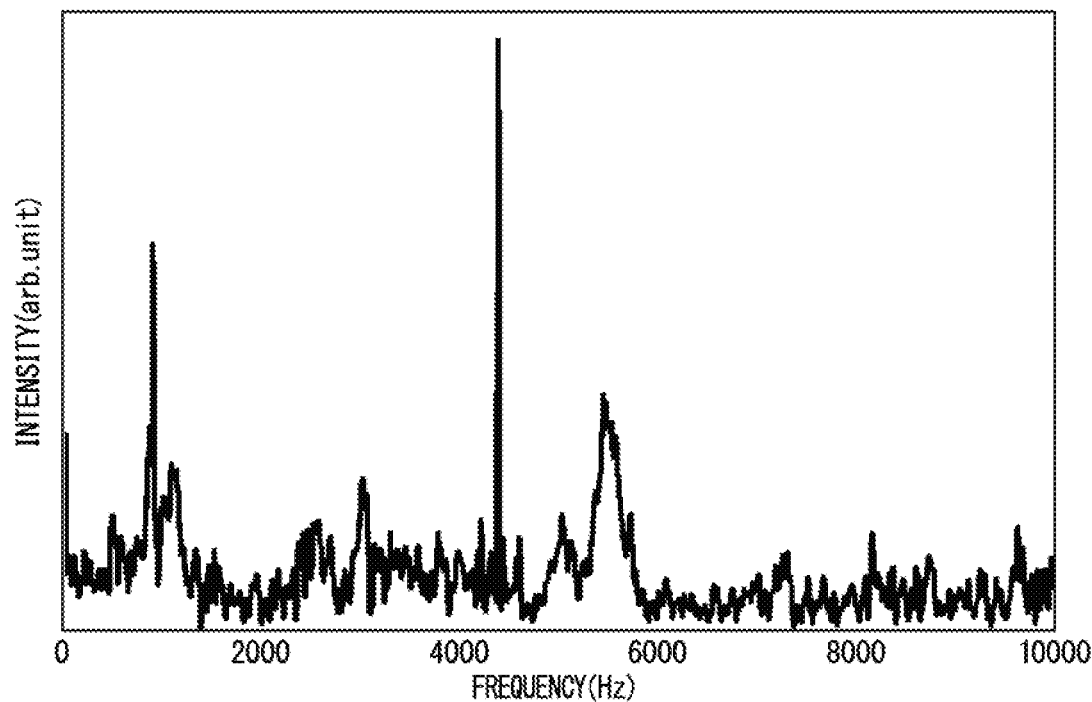
FIG. 13A is a diagram showing an example of a frequency spectrum determined by the laser-induced vibration wave measuring system of the first embodiment.
Figure 13B:
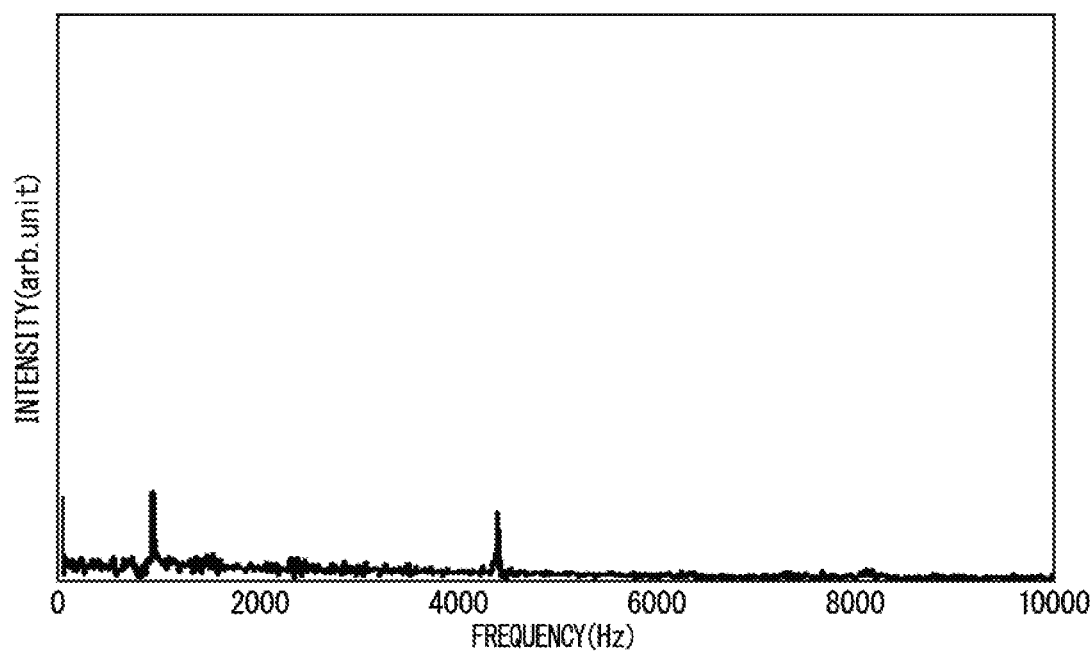
FIG. 13B is a diagram showing an example of a frequency spectrum determined by the laser-induced vibration wave measuring system of the first embodiment.

FIGS. 13A and 13B are diagrams showing an example of a frequency spectrum determined by the laser-induced vibration wave measuring system 20 of the first embodiment. FIG. 13A is a frequency spectrum obtained when the inspection target M is irradiated with the excitation laser light. FIG. 13B is a frequency spectrum obtained when the inspection target M is not irradiated with the excitation laser light. That is, FIG. 13B shows background data. According to FIG. 13B, even if the inspection target M is not irradiated with the excitation laser light, peaks of natural vibration are observed near 2.5 KHz and 5.5 KHz. According to FIG. 13A, it can be seen that the peak of the natural vibration increases when the inspection target M is irradiated with the excitation laser light. The determining portion 126b causes background data to be included in the frequency spectrum stored in the surrounding measurement data DB 146 of the storing portion 140. The determining portion 126b may automatically generate an accurate determination criterion by applying information that affects determination of natural vibration such as background data or the like. The determining portion 126b displays information representing a result of inspecting the faultlessness of the portion of the inspection target M irradiated with the excitation laser light on the display portion 130.

(Operation of Laser-Induced Vibration Wave Measuring System 20 (Part 1))

Figure 14:
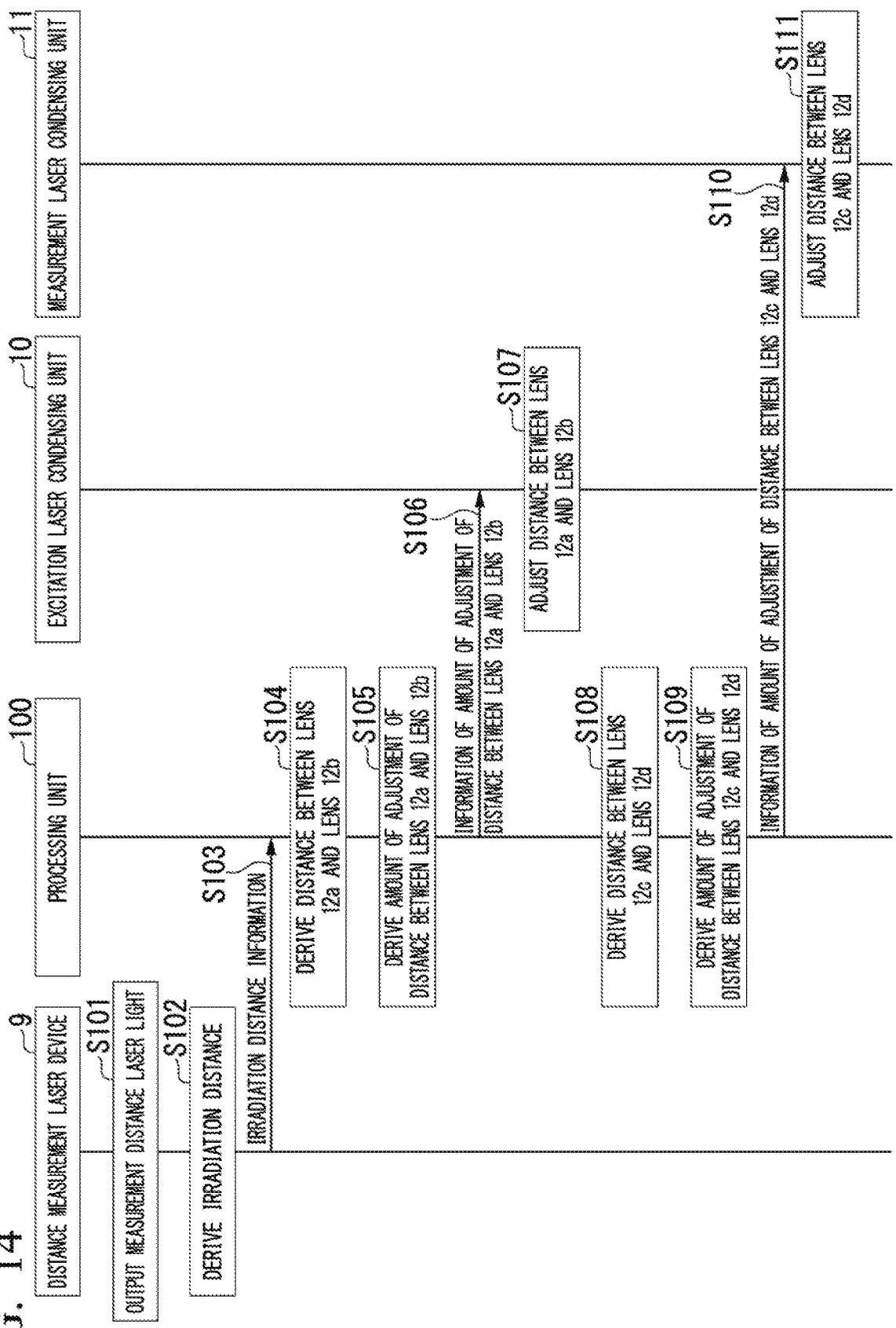
FIG. 14 is a sequence chart showing an example (part 1) of an operation of the laser-induced vibration wave measuring system of the first embodiment.

FIG. 14 is a sequence chart showing an example (part 1) of the operation of the laser-induced vibration wave measuring system of the first embodiment. FIG. 14 shows a process of adjusting a distance between the lens 12a and the lens 12b and a distance between the lens 12c and the lens 12d of the measurement laser condensing unit 11 as an example in which a condensing position of the excitation laser condensing unit 10 is adjusted.

(Step S101)

The distance measurement laser device 9 outputs distance measurement laser light.

(Step S102)

The distance measurement laser device 9 derives an irradiation distance between the distance measurement laser light and the inspection target M on the basis of reflected light obtained by reflecting the output distance measurement laser light on the inspection target M.
(Step S103)
The distance measurement laser device 9 transmits information representing the derived irradiation distance (irradiation distance information) to the processing unit 100.
(Step S104)
The communicating portion 110 of the processing unit 100 receives the irradiation distance information transmitted by the distance measurement laser device 9 and outputs the received irradiation distance information to the information acquiring portion 122. The irradiation distance data acquiring portion 122a of the information acquiring portion 122 acquires the irradiation distance information output by the communicating portion 110 and outputs the acquired irradiation distance information to the measuring portion 124. The condensing position deriving portion 124a of the measuring portion 124 acquires the irradiation distance information output by the irradiation distance data acquiring portion 122a and acquires an inter-lens distance between the lens 12a and the lens 12b associated with the acquired irradiation distance information from the inter-lens distance table 144 stored in the storing portion 140.
(Step S105)
The condensing position deriving portion 124a derives an amount of adjustment of the distance between the lens 12a and the lens 12b by deriving a difference between the acquired inter-lens distance between the lens 12a and the lens 12b and a current distance between the lens 12a and the lens 12b. The condensing position deriving portion 124a outputs information representing the derived amount of adjustment of the distance between the lens 12a and the lens 12b to the timing deriving portion 124d.

The timing deriving portion 124d acquires the information representing the amount of adjustment of the distance between the lens 12a and the lens 12b output by the condensing position deriving portion 124a, creates control information including the acquired information representing the amount of adjustment of the distance between the lens 12a and the lens 12b, and outputs the created control information to the communicating portion 110. The communicating portion 110 transmits the control information output by the timing deriving portion 124d to the excitation laser condensing unit 10.
(Step S107)
The excitation laser condensing unit 10 receives the control information transmitted by the processing unit 100. The excitation laser condensing unit 10 adjusts the distance between the lens 12a and the lens 12b on the basis of the information representing the amount of adjustment of the distance between the lens 12a and the lens 12b included in the received control information.
(Step S108)
The communicating portion 110 of the processing unit 100 receives the irradiation distance information transmitted by the distance measurement laser device 9, and outputs the received irradiation distance information to the information acquiring portion 122. The irradiation distance data acquiring portion 122a of the information acquiring portion 122 acquires the irradiation distance information output by the communicating portion 110 and outputs the acquired irradiation distance information to the measuring portion 124. The condensing position deriving portion 124a of the measuring portion 124 acquires the irradiation distance information output by the irradiation distance data acquiring portion 122a and acquires an inter-lens distance between the lens 12c and the lens 12d associated with the acquired irradiation distance information from the inter-lens distance table 144 stored in the storing portion 140.
(Step S109)
The condensing position deriving portion 124a derives an amount of adjustment of the distance between the lens 12c and the lens 12d by deriving a difference between the acquired inter-lens distance between the lens 12c and the lens 12d and a current distance between the lens 12c and the lens 12d. The condensing position deriving portion 124a outputs information representing the derived amount of adjustment of the distance between the lens 12c and the lens 12d to the timing deriving portion 124d.
(Step S110)
The timing deriving portion 124d acquires the information representing the amount of adjustment of the distance between the lens 12c and the lens 12d output by the condensing position deriving portion 124a, creates control information including the acquired information representing the amount of adjustment of the distance between the lens 12c and the lens 12d, and outputs the created control information to the communicating portion 110. The communicating portion 110 transmits the control information output by the timing deriving portion 124d to the measurement laser condensing unit 11.
(Step S111)
The measurement laser condensing unit 11 receives the control information transmitted by the processing unit 100. The measurement laser condensing unit 11 adjusts the distance between the lens 12c and the lens 12d on the basis of the information representing the amount of adjustment of the distance between the lens 12c and the lens 12d included in the received control information.

Figure 15:
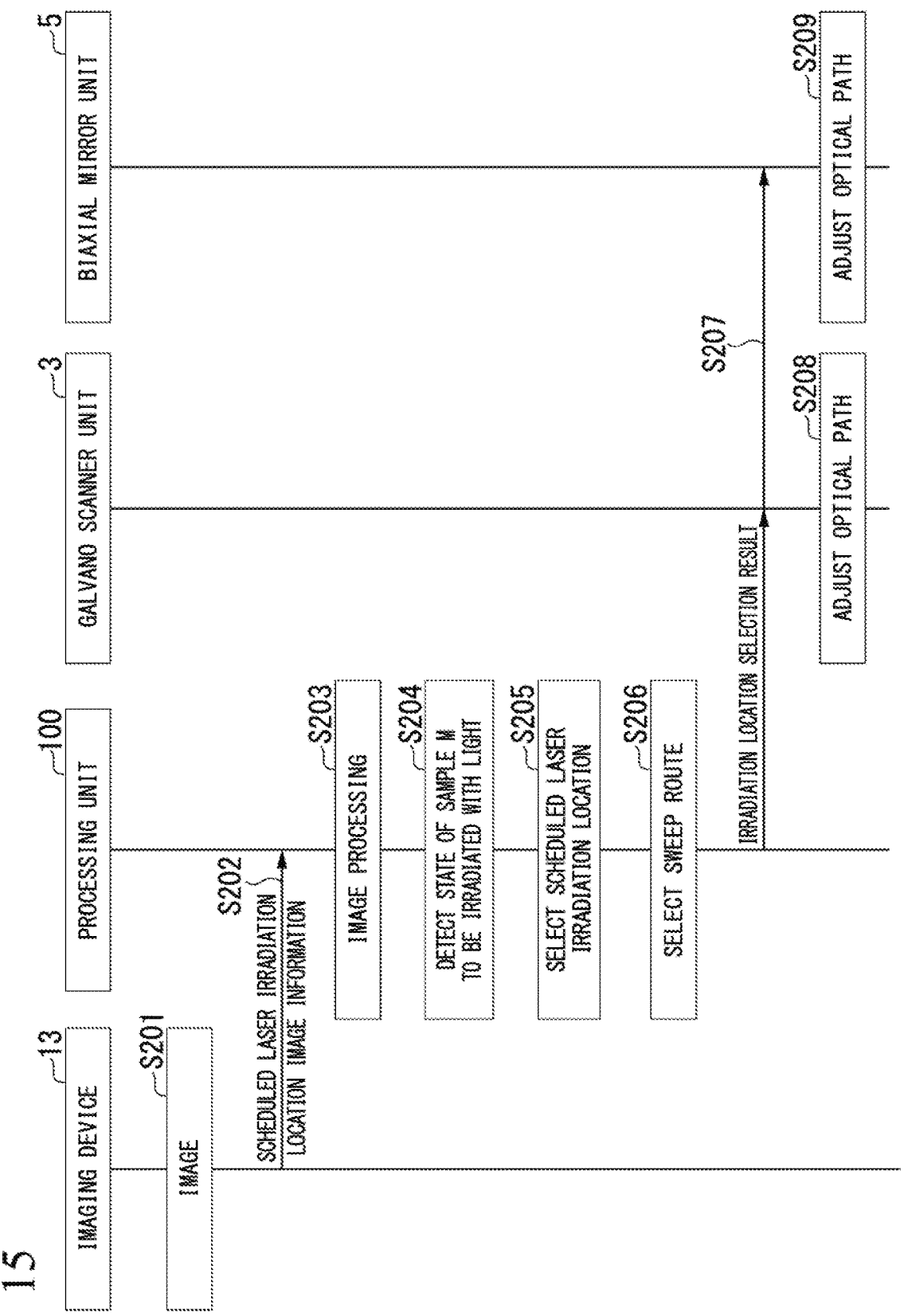
FIG. 15 is a sequence chart showing an example (part 2) of an operation of the laser-induced vibration wave measuring system of the first embodiment.

In the sequence chart shown in FIG. 14, a set of steps S104 to S107 and a set of steps S108 to S111 may interchange. Also, step S108 may be performed after step S104 or step S108 may be performed after step S105.
(Operation of Laser-Induced Vibration Wave Measuring System 20 (Part 2))
FIG. 15 is a sequence chart showing an example (part 2) of the operation of the laser-induced vibration wave measuring system of the first embodiment. FIG. 15 shows a process in which the galvano scanner unit 3 and the biaxial mirror unit 5 control an irradiation location of the inspection target M.
(Step S201)
The imaging device 13 images a location of the inspection target M scheduled to be irradiated with the laser light.
(Step S202)
The imaging device 13 transmits information representing a scheduled laser irradiation location image of the inspection target M obtained through the imaging to the processing unit 100.
(Step S203)
The communicating portion 110 of the processing unit 100 receives the information representing the scheduled laser irradiation location image of the inspection target M transmitted by the imaging device 13 and outputs the received information representing the scheduled laser irradiation location image of the inspection target M to the information acquiring portion 122. The irradiation location data acquiring portion 122b of the information acquiring portion 122 acquires the information representing the scheduled laser irradiation location image of the inspection target M output by the communicating portion 110 and outputs the acquired information representing the scheduled laser irradiation location image of the inspection target M to the measuring portion 124. The irradiation location analyzing portion 124b of the measuring portion 124 acquires the information representing the scheduled laser irradiation location image of the inspection target M output by the irradiation location data acquiring portion 122b and performs image processing on the acquired information representing the scheduled laser irradiation location image of the inspection target M.

(Step S204)

The irradiation location analyzing portion 124b of the processing unit 100 detects a state of the inspection target M such as wetness, a shape, and an appendage on the basis of the scheduled laser irradiation location image obtained through the image processing.

(Step S205)

The irradiation location analyzing portion 124b of the processing unit 100 selects a scheduled laser irradiation location to be irradiated with at least one of excitation laser light, measurement laser light, and distance measurement laser light from a plurality of scheduled laser irradiation locations on the basis of the state of the inspection target M.

(Step S206)

For example, when all selected scheduled laser irradiation locations are connected by a line on the basis of the selected scheduled laser irradiation locations, the irradiation location analyzing portion 124b of the processing unit 100 selects a route having the shortest length from among routes indicated by the connected line. Also, when there is a route that passes over the appendage, the irradiation location analyzing portion 124b may select the shortest route under the assumption that the laser light is blocked by the physical shutter so that the appendage is not irradiated with the laser light. The processing unit 100 sets the selected route as a sweep route and outputs a result of selecting an irradiation location including information representing the sweep route to the timing deriving portion 124d.

(Step S207)

The timing deriving portion 124d acquires the result of selecting the irradiation location output from the irradiation location analyzing portion 124b, creates control information including the acquired result of selecting the irradiation location, and outputs the created control information to the communicating portion 110. The communicating portion 110 transmits the control information output by the timing deriving portion 124d to the galvano scanner unit 3 and the biaxial mirror unit 5.

(Step S208)

The galvano scanner unit 3 acquires the control information transmitted by the processing unit 100 and adjusts an optical path of at least one of the excitation laser light, the measurement laser light, and the distance measurement laser light on the basis of the result of selecting the irradiation location included in the acquired control information.

(Step S209)

The biaxial mirror unit 5 acquires the control information transmitted by the processing unit 100 and adjusts an optical path of at least one of the excitation laser light, the measurement laser light, and the distance measurement laser light on the basis of the result of selecting the irradiation location included in the acquired control information.

(Operation of Laser-Induced Vibration Wave Measuring System 20 (Part 3))

Figure 16:
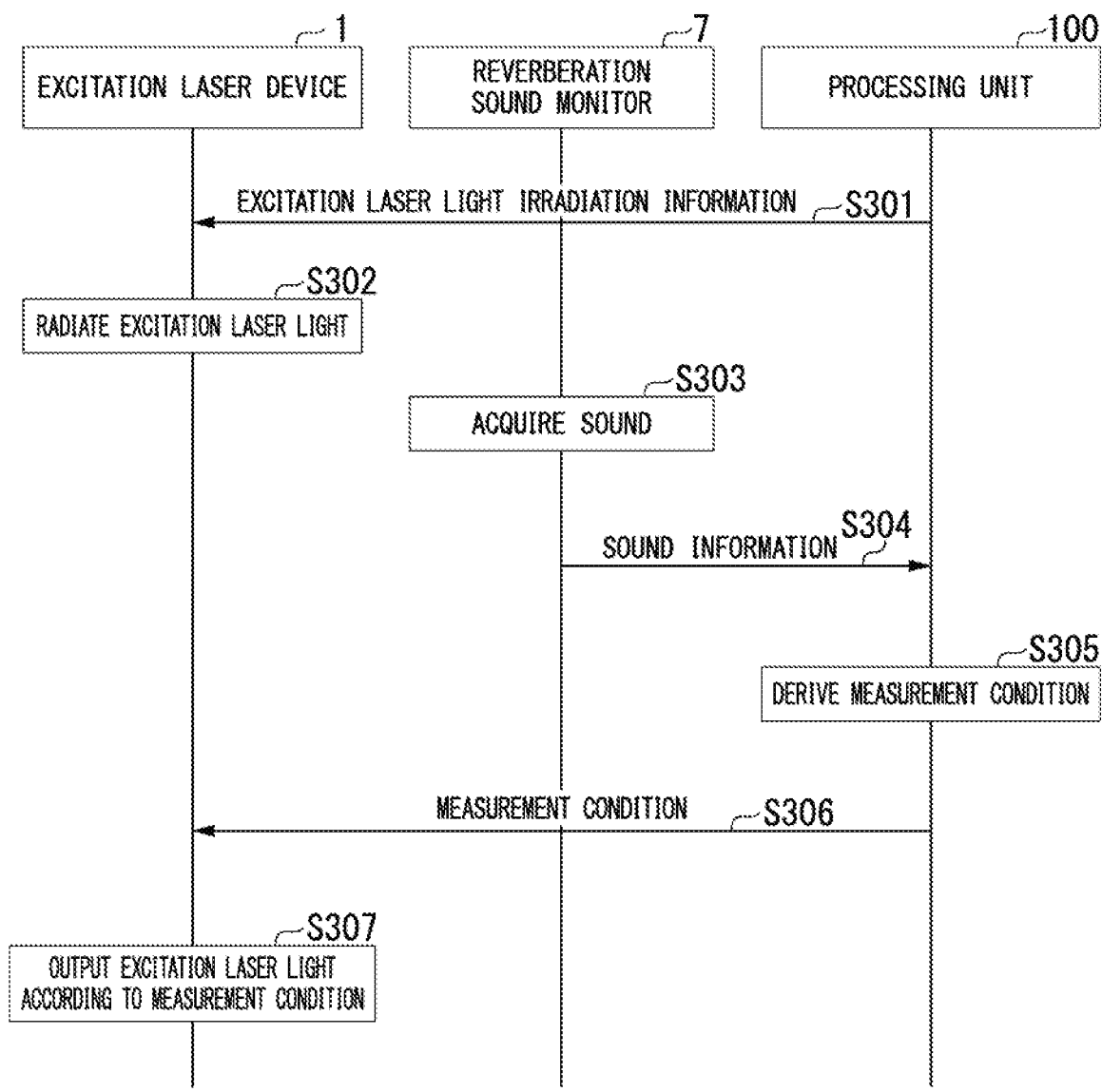
FIG. 16 is a sequence chart showing an example (part 3) of an operation of the laser-induced vibration wave measuring system of the first embodiment.

FIG. 16 is a sequence chart showing an example (part 3) of the operation of the laser-induced vibration wave measuring system of the first embodiment. FIG. 16 shows a process of controlling an output timing of excitation laser light. In FIG. 16, a case in which the timing at which the excitation laser light is output is derived on the basis of an intensity of a sound generated by irradiating the inspection target M with the excitation laser light will be described as an example.

(Step S301)

The reverberation sound analyzing portion 124c of the processing unit 100 creates excitation laser light irradiation information that is information for causing the excitation laser device 1 to radiate the excitation laser light and outputs the created excitation laser light irradiation information to the communicating portion 110. The communicating portion 110 acquires the excitation laser light irradiation information output by the reverberation sound analyzing portion 124c and transmits the acquired excitation laser light irradiation information to the excitation laser device 1. The excitation laser light irradiation information includes information representing a timing at which the excitation laser light is output. Specifically, the excitation laser light irradiation information includes a first timing, a second timing, ..., an $i^{th}$ timing as the timing at which the excitation laser light is output.

(Step S302)

The excitation laser device 1 outputs the excitation laser light according to the excitation laser light irradiation information transmitted by the processing unit 100. The inspection target M is irradiated with the excitation laser light output by the excitation laser device 1.

(Step S303)

The reverberation sound monitor 7 measures a sound generated when the inspection target M is irradiated with the excitation laser light at each of the first timing, the second timing, ..., the $i^{th}$ timing. The reverberation sound monitor 7 converts the measured sound into an electrical signal and acquires sound information obtained through the conversion into the electrical signal.

(Step S304)

The reverberation sound monitor 7 transmits the acquired sound information to the processing unit 100.

(Step S305)

The communicating portion 110 of the processing unit 100 receives the sound information transmitted by the reverberation sound monitor 7 and outputs the received sound information to the information acquiring portion 122. The reverberation sound data acquiring portion 122c of the information acquiring portion 122 acquires the sound information output by the communicating portion 110 and outputs the acquired sound information to the measuring portion 124. The reverberation sound analyzing portion 124c of the measuring portion 124 acquires the sound information output by the reverberation sound data acquiring portion 122c and derives a measurement condition on the basis of the acquired sound information. The reverberation sound analyzing portion 124c outputs information representing the derived measurement condition to the timing deriving portion 124d.

(Step S306)

The timing deriving portion 124d acquires the information representing the measurement condition output by the timing deriving portion 124d, creates control information including the acquired information representing the measurement condition, and outputs the created control information to the communicating portion 110. The communicating portion 110 transmits the control information output by the timing deriving portion 124d to the excitation laser device 1.

(Step S307)

The excitation laser device 1 acquires the control information transmitted by the processing unit 100 and outputs excitation laser light according to the measurement condition included in the acquired control information.

(Operation of Laser-Induced Vibration Wave Measuring System 20 (Part 4))

Figure 17:
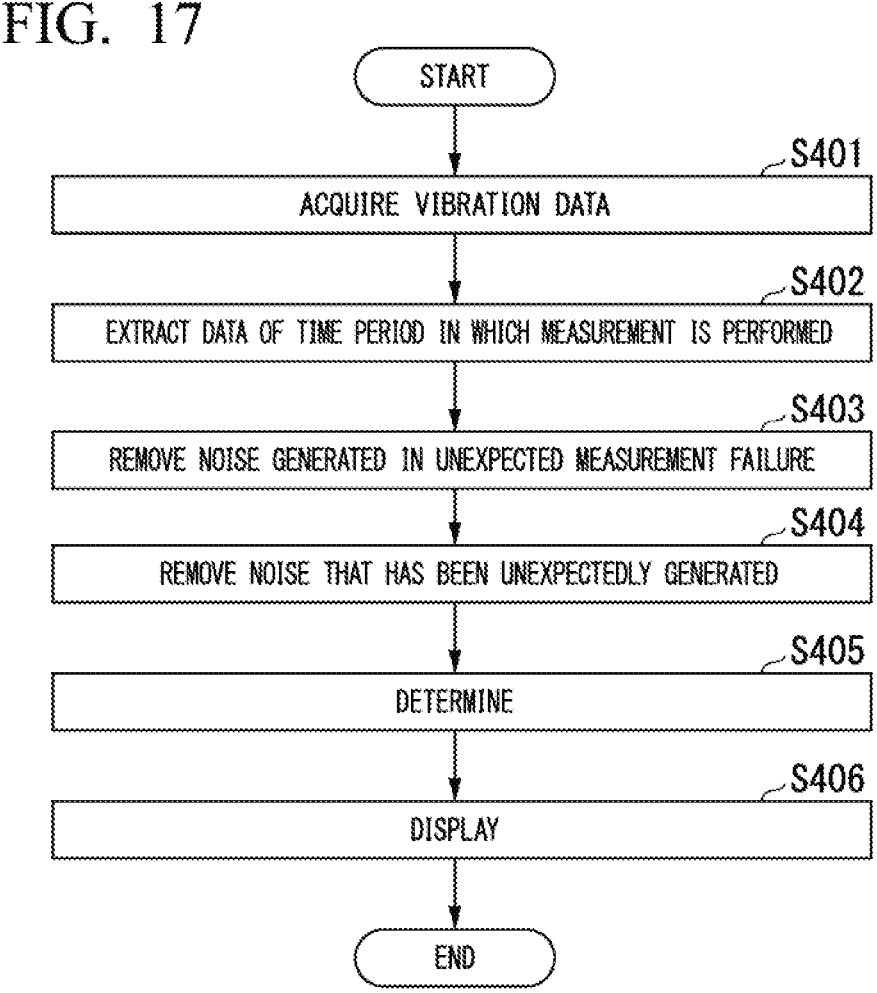
FIG. 17 is a flow chart showing an example (part 4) of an operation of the laser-induced vibration wave measuring system of the first embodiment.

FIG. 17 is a flowchart showing an example (part 4) of the operation of the laser-induced vibration wave measuring system of the first embodiment. FIG. 17 shows a process of determining whether or not a location of the inspection target M irradiated with the excitation laser light is faultless by processing vibration data.

(Step S401)

The communicating portion 110 of the processing unit 100 receives the vibration data (the number of vibrations) transmitted by the measurement laser device 2 and outputs the received vibration data to the information acquiring portion 122. The vibration data acquiring portion 122d of the information acquiring portion 122 acquires the vibration data output by the communicating portion 110.

(Step S402)

The vibration data acquiring portion 122d outputs the acquired vibration data to the analyzing portion 126. The data processing portion 126a of the analyzing portion 126 extracts data of a time period in which measurement is performed from the vibration data on the basis of the vibration data output by the vibration data acquiring portion 122d and the measurement condition output by the timing deriving portion 124d.

(Step S403)

The data processing portion 126a removes noise caused by an unexpected measurement failure from the extracted time period data by removing a reduction amount arbitrarily determined from the maximum amount of displacement of vibration generated by the excitation laser. Here, an example of the reduction amount is $1/10$, $1/100$, or the like.

(Step S404)

The data processing portion 126a determines whether or not the acquired vibration data includes unexpected noise. The data processing portion 126a determines that the data determined to include the unexpected noise is invalid data and removes the invalid data.

(Step S405)

The determining portion 126b inspects the faultlessness of the portion of the inspection target M irradiated with the excitation laser light on the basis of the frequency spectrum output by the data processing portion 126a.

(Step S406)

The display portion 130 displays a result of inspecting the faultlessness of the portion of the inspection target M irradiated with the excitation laser light.

After the processing of step S406 is completed, the timing deriving portion 124d derives a timing on the basis of information representing an amount of adjustment of a distance between the lens 12a and the lens 12b, information representing an amount of adjustment of a distance between the lens 12c and the lens 12d, and time information required for adjusting an inter-lens distance output by the condensing position deriving portion 124a, information representing a result of selecting an irradiation location output by the irradiation location analyzing portion 124b, and information representing a measurement condition output by the reverberation sound analyzing portion 124c and proceeds to the next process of radiating the excitation laser light on the basis of the derived timing. The timing deriving portion 124d transmits information representing the derived timing from the communicating portion 110 to the excitation laser device 1, the galvano scanner unit 3, the biaxial mirror unit 5, the excitation laser condensing unit 10, and the measurement laser condensing unit 11. A laser irradiation adjusting portion of the excitation laser device 1 acquires information representing a timing transmitted by the processing unit 100 and corrects a timing at which the excitation laser light is output by adjusting a master clock, the physical shutter, or the like on the basis of the acquired information representing the timing. A drive adjusting portion of each of the galvano scanner unit 3, the biaxial mirror unit 5, the excitation laser condensing unit 10, and the measurement laser condensing unit 11 acquires the information representing the timing transmitted by the processing unit 100 and performs a drive operation at an appropriate speed and at an appropriate time on the basis of the acquired information representing the timing.

In the flowchart shown in FIG. 17, step S403 and step S404 may interchange.

Although a case in which the reverberation sound monitor 7 measures a sound generated by irradiating the inspection target M with the excitation laser light has been described in the above-described embodiment, the present invention is not limited to this example. For example, the reverberation sound monitor 7 may be configured to measure a sound generated by irradiating the inspection target M with the measurement laser light.

Although a case in which the reverberation sound monitor 7 is attached to the biaxial mirror unit 5 has been described in the above-described embodiment, the present invention is not limited to this example. For example, the reverberation sound monitor 7 may be attached to the galvano scanner unit 3 or may be attached to the excitation laser device 1 or the measurement laser device 2.

Although a case in which a so-called acoustic measurement device such as a microphone is used has been described as an example of the reverberation sound monitor 7 in the above-described embodiment, the present invention is not limited to this example. For example, an acceleration sensor may be installed as the reverberation sound monitor 7 in the laser-induced vibration wave measuring system, so that a sound may be measured by measuring vibration of a housing or an optical element due to the reverberation sound.

Although a case in which the mirror 8a bends the optical path of the excitation laser light at a 90-degree angle, the mirror 8b bends the optical path of the distance measurement laser light at a 90-degree angle, and the mirror 8c bends the optical path of the excitation laser light at a 90-degree angle has been described in the above-described embodiment, the present invention is not limited to this example. For example, the optical system may be designed so that the mirror 8a bends the optical path of the excitation laser light at any angle such as 30 deg or 60 deg according to the design of an optical element. Also, the optical system may be designed so that the mirror 8b bends the optical path of the distance measurement laser light at any angle such as 30 deg or 60 deg according to the design of an optical element. Also, the optical system may be designed so that the mirror 8c bends the optical path of the excitation laser light at any angle such as 30 deg or 60 deg according to the design of an optical element.

Although a case in which the excitation laser condensing unit 10 includes the lens 12a and the lens 12b has been described in the above-described embodiment, the present invention is not limited to this example. For example, the excitation laser condensing unit 10 may include one single lens or three or more combined lenses. A condensing position or a condensing degree may be adjusted by adjusting an installation position of one single lens or three or more combined lenses. The lens may be a convex lens or a concave lens.

Although a case in which the measurement laser condensing unit 11 includes the lens 12c and the lens 12d has been described in the above-described embodiment, the present invention is not limited to this example. For example, the measurement laser condensing unit 11 may include one single lens or three or more combined lenses. A condensing position or a condensing degree may be adjusted by adjusting an installation position of one single lens or three or more combined lenses. The lens may be a convex lens or a concave lens.

Although a case in which the galvano scanner unit 3 includes the two mirrors of the galvano scanner mirror 4a and the galvano scanner mirror 4b has been described in the above-described embodiment, the present invention is not limited to this example. For example, the galvano scanner unit 3 may include one galvano scanner mirror or may include three or more galvano scanner mirrors.

Although a case in which the biaxial mirror unit 5 includes the biaxial mirror has been described in the above-described embodiment, the present invention is not limited to this example. For example, the biaxial mirror unit 5 may include two or more biaxial mirrors.

Although a case in which the laser-induced vibration wave measuring system 20 of the first embodiment causes the galvano scanner unit 3 and the biaxial mirror unit 5 to be combined and causes either or both of the excitation laser light and the measurement laser light to be swept has been described in the above-described embodiment, the present invention is not limited to this example. For example, one of the galvano scanner unit 3 and the biaxial mirror unit 5 may cause either or both of the excitation laser light and the measurement laser light to be swept.

Although a case in which the irradiation location analyzing portion 124b of the processing unit 100 acquires a result of selecting an irradiation location on the basis of a scheduled laser irradiation location image captured by the imaging device 13 has been described in the above-described embodiment, the present invention is not limited to the example. For example, the result of selecting the irradiation location may be acquired on the basis of information acquired by a device that can acquire information of the surface of the inspection target M such as a 3D scanner or thermography.

Although a case in which the irradiation location analyzing portion 124b of the processing unit 100 selects a scheduled laser irradiation location that has no uneven shadow, is flat, has the same wetness as other scheduled laser irradiation locations, and has no appendage on the basis of the scheduled laser irradiation location image has been described in the above-described embodiment, this is an example and selection items, selection criteria, and the number of scheduled laser irradiation locations to be selected can be arbitrarily determined by the user.

Although a case in which the data processing portion 126a sets an exponential function as an evaluation function and determines that data for which its trend and a correlation coefficient of a certain level or higher cannot be obtained include unexpected noise has been described in the above-described embodiment, the present invention is not limited to this example. For example, the reverberation sound monitor 7 is allowed to measure an environmental sound. The data processing portion 126a of the processing unit 100 may be configured to remove the noise component included in the vibration data on the basis of the environmental sound measured by the reverberation sound monitor 7. Also, a vibration measuring device for measuring the vibration of the laser-induced vibration wave measuring system 20 itself may be provided. The data processing portion 126a of the processing unit 100 may be configured to remove the noise component included in the vibration data on the basis of the vibration measured by the vibration measuring device.

Although a case in which the determining portion 126b determines the faultlessness of the location irradiated with the excitation laser light using a result of performing an FFT on the vibration data in the data processing portion 126a has been described in the above-described embodiment, the present invention is not limited to this example. For example, the determining portion 126b may be configured to determine faultlessness of the location irradiated with the excitation laser light using a result of wavelet analysis performed by the data processing portion 126a.

In the above-described embodiment, machine learning may be applied to a process of the information processing portion 120.

The laser-induced vibration wave measuring system 20 according to the first embodiment measures the inspection target M on the basis of vibration generated when the inspection target M has been irradiated with excitation laser light. The laser-induced vibration wave measuring system 20 includes a condensing position deriving portion configured to derive an amount of adjustment of a condensing position of an excitation laser condensing unit configured to condense the excitation laser light on the basis of a distance between a laser device configured to radiate the excitation laser light and an irradiation location of the excitation laser light and a communicating portion configured to transmit control information including information representing the amount of adjustment to the excitation laser condensing unit. According to this configuration, because a condensing diameter of the excitation laser light output from the excitation laser condensing unit can be reduced, an irradiation intensity of the excitation laser light per unit area can be improved. Because the intensity of a signal in the frequency spectrum can be improved, the accuracy of measurement of the inspection target M can be improved.

Also, the laser-induced vibration wave measuring system 20 further includes an irradiation location analyzing portion configured to select a location to be irradiated with the excitation laser light on the basis of information representing an image of a location of the inspection target M scheduled to be irradiated with the excitation laser light. The communicating portion transmits control information including information representing the location to be irradiated with the excitation laser light selected by the irradiation location analyzing portion to a sweep device configured to sweep the excitation laser light.

According to this configuration, because it is possible to reduce noise when a location which should not be irradiated with the excitation laser light is irradiated with the excitation laser light, the accuracy of measurement of the inspection target M can be improved.

Also, the laser-induced vibration wave measuring system 20 further includes the reverberation sound data acquiring portion 122c configured to acquire time-series data of a reverberation sound generated when the inspection target M has been irradiated with the excitation laser light; and the reverberation sound analyzing portion 124c configured to acquire a timing at which the inspection target M is irradiated with the excitation laser light on the basis of an intensity of the reverberation sound of the time-series data of the reverberation sound acquired by the reverberation sound data acquiring portion 122c. The communicating portion transmits control information including the information representing the timing acquired by the reverberation sound analyzing portion 124c to the excitation laser device 1 configured to radiate the excitation laser light.

According to this configuration, the reverberation sound analyzing portion can acquire a timing at which a time range in which an intensity of the reverberation sound is less than or equal to a reverberation sound threshold value is widened on the basis of the intensity of the reverberation sound of the time-series data of the reverberation sound and can transmit control information including information representing the acquired timing to the excitation laser device 1. The excitation laser device 1 receives the control information and radiates the excitation laser light at the timing included in the received control information. Because the excitation laser device 1 can cause the excitation laser light to be radiated at a timing when the time range in which the influence of the reverberation sound is small is widened, it is possible to reduce the influence of the reverberation sound generated when a cycle at which the excitation laser light is radiated is short. Because it is possible to reduce a noise component of an amplitude waveform with respect to a time period of vibration that occurs when the inspection target M is irradiated with the excitation laser light, the accuracy of measurement of the inspection target M can be improved.

Also, the laser-induced vibration wave measuring system 20 further includes a data removing portion configured to remove data during a predetermined time period from a time at which the inspection target M has been irradiated with the excitation laser light from measurement data of vibration generated in the inspection target M. According to this configuration, because it is possible to reduce the influence of noise generated immediately after the irradiation with the excitation laser light, the accuracy of measurement of the inspection target M can be improved.

Also, the laser-induced vibration wave measuring system 20 further includes a noise removing portion configured to remove noise from measurement data of vibration on the basis of a correlation coefficient between the measurement data of vibration generated in the inspection target M and an evaluation function of the measurement data. According to this configuration, because it is possible to reduce the influence of noise that has been unexpectedly generated, the accuracy of measurement of the inspection target M can be improved.

Also, the laser-induced vibration wave measuring system 20 further includes a determining portion configured to determine faultlessness of a location of the inspection target M irradiated with the excitation laser light on the basis of measurement data acquired when vibration has been induced in the inspection target M by irradiating the inspection target M with the excitation laser light and measurement data acquired when the inspection target M has not been irradiated with the excitation laser light that induces the vibration. According to this configuration, because the number of noise components of the measurement data acquired when the inspection target M has been irradiated with the excitation laser light can be reduced on the basis of the measurement data acquired when the inspection target M is not irradiated with the excitation laser light, the accuracy of measurement of the inspection target M can be improved.

Second Embodiment (Laser-Induced Vibration Wave Measuring System)

FIG. 1 is applicable to an example of a laser-induced vibration wave measuring system 20a of a second embodiment. However, a processing unit 100a is provided instead of the processing unit 100.

(Processing Unit 100a)

Figure 18:
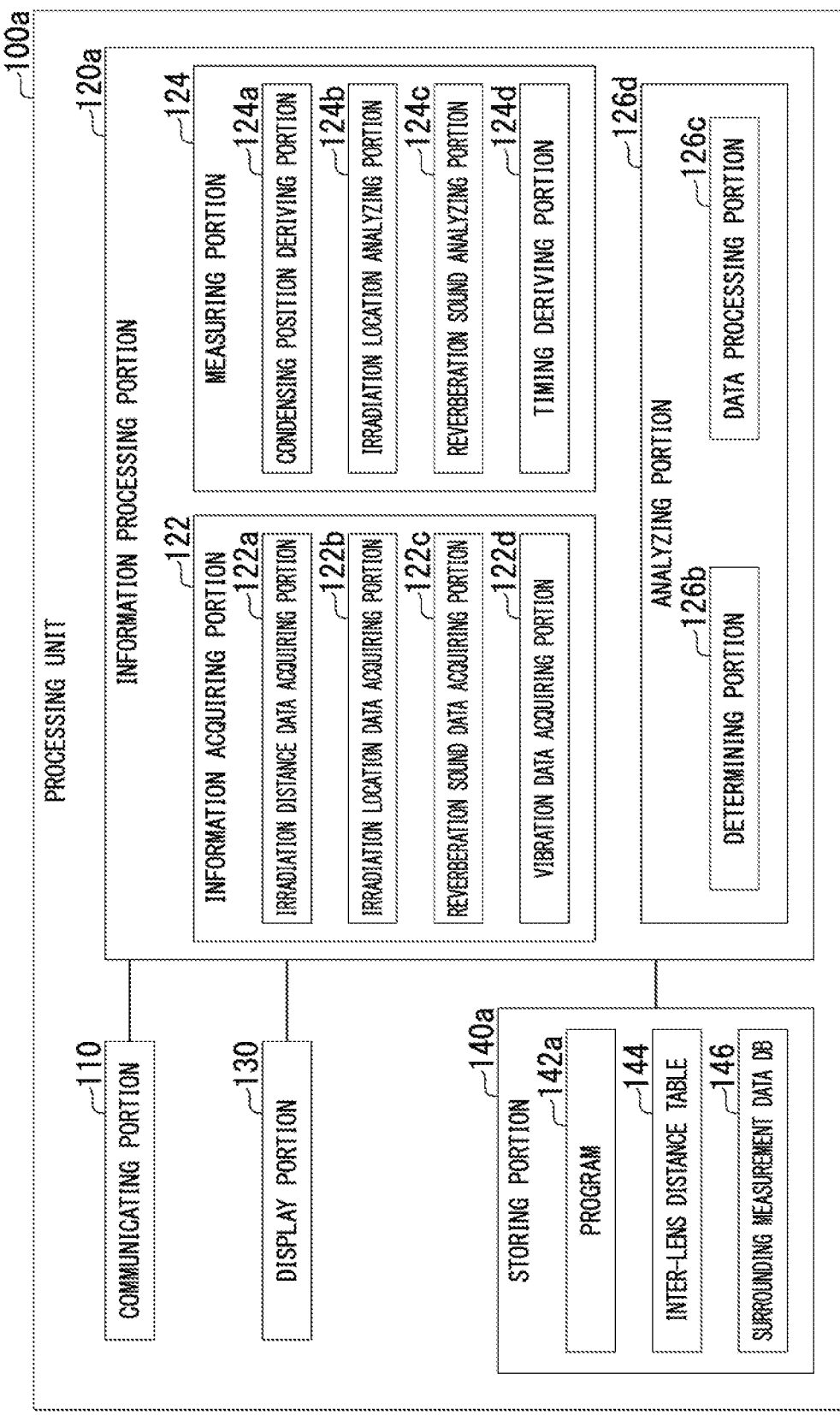
FIG. 18 is a block diagram showing an example of a processing unit of a laser-induced vibration wave measuring system of a second embodiment.

FIG. 18 is a block diagram showing an example of the processing unit of the laser-induced vibration wave measuring system of the second embodiment.

The processing unit 100a is implemented by a device such as a personal computer, a server, a smartphone, a tablet computer, or an industrial computer.

The processing unit 100a includes, for example, a communicating portion 110, an information processing portion 120a, a display portion 130, and a storing portion 140a.

The information processing portion 120a is, for example, a software function portion implemented by a processor such as a CPU executing a program 142a stored in a storing portion 140a. Also, all or a part of the information processing portion 120a may be implemented by hardware such as an LSI circuit, an ASIC, or an FPGA or may be implemented by a combination of the software function portion and the hardware.

The information processing portion 120a includes, for example, an information acquiring portion 122, a measuring portion 124, and an analyzing portion 126d.

(Analyzing Portion 126d)

The analyzing portion 126d includes a data processing portion 126c and a determining portion 126b.

The data processing portion 126c acquires a measurement condition output by the timing deriving portion 124d and vibration data output by the vibration data acquiring portion 122d and processes the acquired vibration data on the basis of the acquired measurement condition.

Here, when the same location of the inspection target M is measured, the vibration data may be vibration data obtained in a single operation of radiating excitation laser light or vibration data obtained in a plurality of operations of radiating excitation laser light. In this regard, when vibration data obtained in a plurality of operations of radiating excitation laser light is used, the data processing portion 126c may average or integrate the vibration data output by the vibration data acquiring portion 122d.

The data processing portion 126c extracts data of time periods M1, M2, and the like in which measurement is performed from the vibration data on the basis of the measurement condition output by the timing deriving portion 124d. Also, the data processing portion 126c removes a reduction amount arbitrarily determined from the maximum amount of displacement of vibration generated by the excitation laser after irradiation with the excitation laser light from the extracted data of the time periods M1, M2, and the like. Here, the reduction amount is, for example, $1/10$, $1/100$, or the like, and is, for example, data for a predetermined time period such as a period of 0.5 ms to 10 ms. Because it is possible to reduce an influence of noise generated immediately after irradiation with the excitation laser light by removing a reduction amount arbitrarily determined from the maximum amount of displacement of vibration generated by the excitation laser after irradiation with the excitation laser light, the accuracy of measurement can be improved.

Also, the data processing portion 126c reduces unexpected noise from the acquired vibration data. Specifically, the data processing portion 126c reduces a noise component of the acquired vibration data by summing the acquired vibration data and data obtained by shifting a phase of the vibration data. Here, the amount of phase shift is preset.

Figure 19:
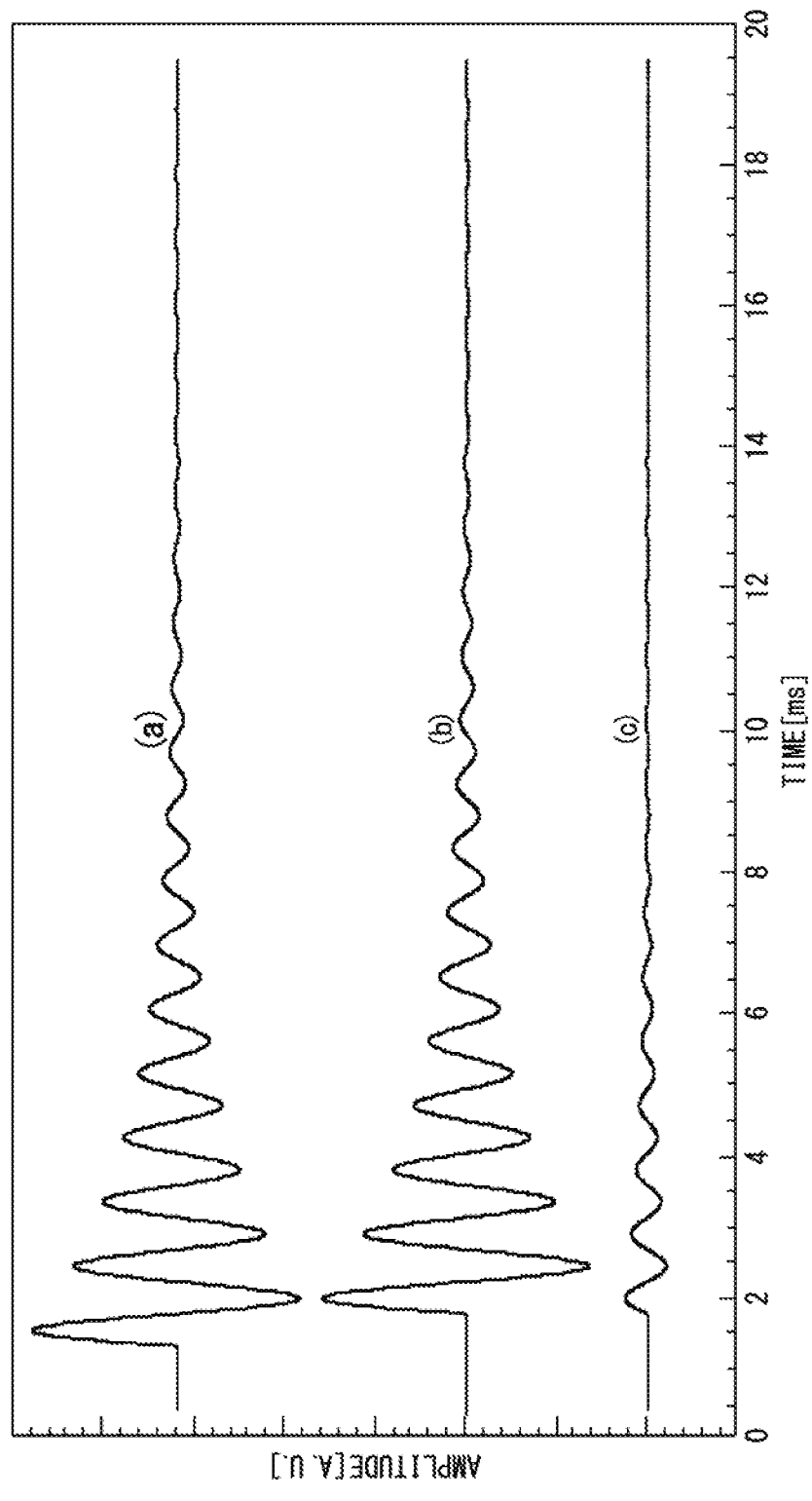
FIG. 19 is a diagram showing an example of noise removal of the laser-induced vibration wave measuring system of the first embodiment.

FIG. 19 is a diagram showing an example of noise removal of the laser-induced vibration wave measuring system 20a of the second embodiment. In FIG. 19, (a) is acoustic noise, (b) is a signal obtained by shifting a phase of the acoustic noise of (a) by π, and (c) is a signal obtained by summing (a) and (b). Returning to FIG. 18, the description will be continued.

The data processing portion 126c acquires valid data obtained by reducing the noise component of the vibration data.

Here, when the acquired valid data is data obtained by irradiating the same location of the inspection target M with excitation laser light a plurality of times, the data processing portion 126c removes noise unexpectedly generated by irradiating the same location of the inspection target M with excitation laser light a plurality of times from the valid data. Specifically, because the number of times that noise unexpectedly generated by irradiating the same location with excitation laser light a plurality of times is mixed in the vibration data is less than the total number of times of irradiation, the data processing portion 126c removes data including noise unexpectedly generated by irradiating the same location with excitation laser light a plurality of times by extracting waveforms of a threshold value or more from the largest coefficient of a correlation with a waveform obtained by performing a time average operation on the vibration data. The data processing portion 126c outputs information representing a frequency spectrum to the determining portion 126b.

FIG. 14 is applicable to a process of adjusting a distance between a lens 12a and a lens 12b of the excitation laser condensing unit 10 and a distance between a lens 12c and a lens 12d of the measurement laser condensing unit 11.

FIG. 15 is applicable to a process in which a galvano scanner unit 3 and a biaxial mirror unit 5 controls an irradiation location of the inspection target M.

FIG. 16 is applicable to a process of controlling an output timing of excitation laser light.

It is possible to apply FIG. 17 as an example of an operation of the laser induced vibration wave measuring system 20a. In this regard, in step S404, noise is removed from vibration measurement data on the basis of measurement data of vibration generated in the inspection target M and data obtained by shifting a phase of time-series data of the measurement data.

In the above-described embodiment, machine learning may be applied to a process of the information processing portion 120a.

The laser-induced vibration wave measuring system 20a according to the second embodiment measures the inspection target M on the basis of vibration generated when the inspection target M has been irradiated with excitation laser light. The laser-induced vibration wave measuring system 20a includes a condensing position deriving portion configured to derive an amount of adjustment of a condensing position of an excitation laser condensing unit configured to condense the excitation laser light on the basis of a distance between a laser device configured to radiate the excitation laser light and an irradiation location of the excitation laser light and a communicating portion configured to transmit control information including information representing the amount of adjustment to the excitation laser condensing unit. According to this configuration, because a condensing diameter of the excitation laser light output from the excitation laser condensing unit can be reduced, an irradiation intensity of the excitation laser light per unit area can be improved. Because the intensity of a signal in the frequency spectrum can be improved, the accuracy of measurement of the inspection target M can be improved.

Also, the laser-induced vibration wave measuring system 20a further includes a noise removing portion configured to remove noise from measurement data of vibration on the basis of the measurement data of the vibration generated in the inspection target M and data obtained by shifting a phase of time-series data of the measurement data. Because at least a part of the noise component is canceled out and the influence of noise can be reduced by causing the measurement data of the vibration generated in the inspection target M and the data obtained by shifting the phase of the time-series data of the measurement data to be superimposed, the accuracy of measurement of the inspection target M can be improved.

Modified Example 1

(Laser-Induced Vibration Wave Measuring System)

Modified examples of the first and second embodiments will be described. Modified Example 1 of the first embodiment includes one or more housings, each of which stores elements constituting the laser-induced vibration wave measuring system 20 of the first embodiment. Modified Example 1 of the second embodiment includes one or more housings, each of which stores elements constituting the laser-induced vibration wave measuring system 20a of the second embodiment. Here, Modified Example 1 of the first embodiment will be continuously described as an example.

Figure 20:
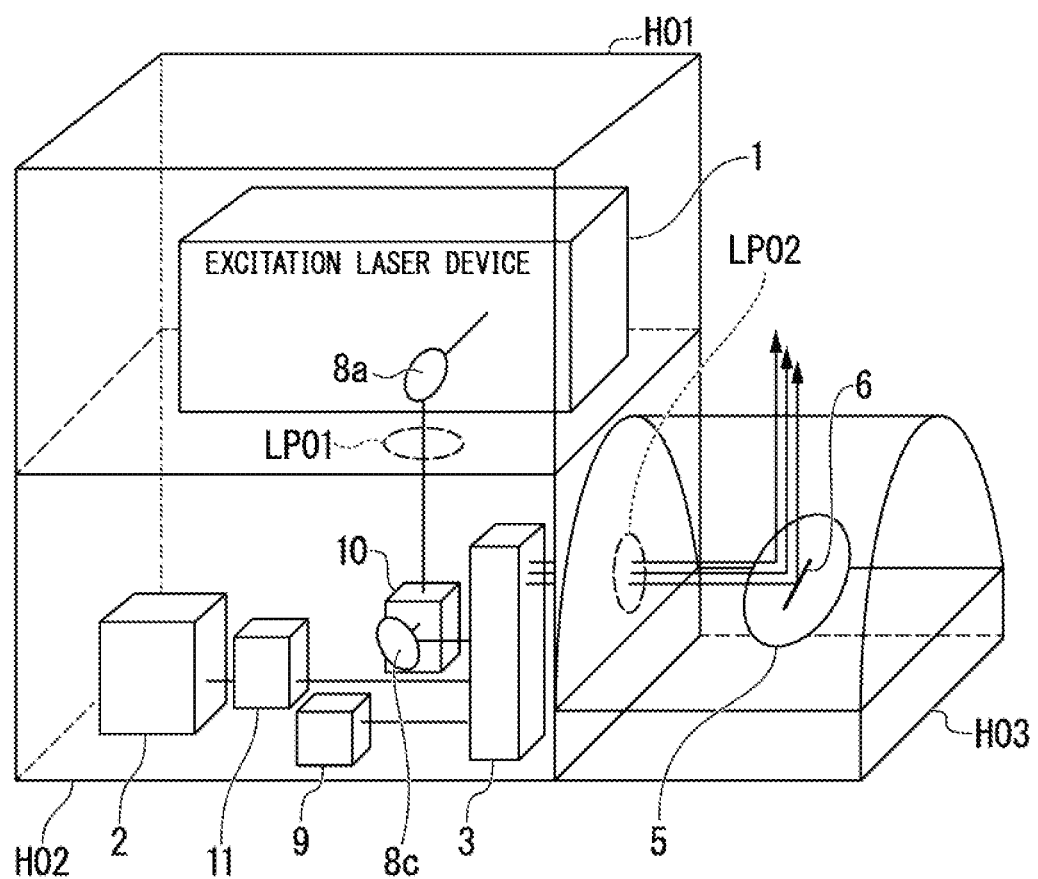
FIG. 20 is a diagram showing Example 1 of a laser-induced vibration wave measuring system of Modified Example 1 of the first embodiment.

FIG. 20 is a diagram showing Example 1 of the laser-induced vibration wave measuring system of Modified Example 1 of the first embodiment. As shown in FIG. 20, the laser-induced vibration wave measuring system of Modified Example 1 of the first embodiment includes three housings. The three housings are referred to as a first housing H01, a second housing H02, and a third housing H03. Preferably, the first housing H01, the second housing H02, and the third housing H03 are covered with a soundproof wall to be described below.

The excitation laser device 1 and the mirror 8a are stored in the first housing H01. Because an influence on the measuring system stored in the second housing H02 to be described below is small and an influence on a measurement result is small even if the excitation laser device 1 and the mirror 8a stored in the first housing H01 are affected by noise outside the laser-induced vibration wave measuring system 20 (here, the first housing H01), the surroundings thereof do not need to be covered with the soundproof wall. The excitation laser device 1 outputs excitation laser light. The optical path of the excitation laser light output by the excitation laser device 1 is bent by the mirror 8a (bent at a 90-degree angle in FIG. 20) and moves from a laser light port LP01 formed at the boundary between the first housing H01 and the second housing H02 to the second housing. The laser light port LP01 will be described below.

The second housing H02 includes the measurement laser device 2, the galvano scanner unit 3, the mirror 8c, the distance measurement laser device 9, the excitation laser condensing unit 10, and the measurement laser condensing unit 11. Although not shown in FIG. 20, the reverberation sound monitor 7, the mirror 8b, the imaging device 13, and the processing unit 100 may be provided in the second housing H02. A device that performs a measurement process is stored in the second housing H02 and an influence of noise outside the laser-induced vibration wave measuring system 20 (here, the second housing H02) tends to affect a measurement result. Thus, it is preferable that the surroundings of the second housing H02 be covered with a soundproof wall SW.

The excitation laser light from the first housing H01 passes through the laser light port LP01 and enters the excitation laser condensing unit 10. The excitation laser condensing unit 10 condenses the excitation laser light output by the excitation laser device 1. An optical path of the excitation laser light condensed by the excitation laser condensing unit 10 is bent by the mirror 8c (bent at a 90-degree angle in FIG. 20) and moves to the galvano scanner unit 3.

On the other hand, the measurement laser device 2 outputs the measurement laser light so that vibration induced in the inspection target M is detected. The measurement laser condensing unit 11 condenses the measurement laser light output by the measurement laser device 2. The measurement laser light condensed by the measurement laser condensing unit 11 moves to the galvano scanner unit 3. The galvano scanner unit 3 adjusts an optical path of either or both of the excitation laser light and the measurement laser light in any direction and angle. Either or both of the excitation laser light and the measurement laser light output by the galvano scanner unit 3 move from a laser light port LP02 formed at the boundary between the second housing H02 and the third housing H03 to the third housing. The laser light port LP02 will be described below.

The third housing H03 includes the biaxial mirror unit 5. The biaxial mirror unit 5 includes the biaxial mirror 6 and adjusts the biaxial mirror 6. A laser light port for emission configured to guide a laser to the inspection target M is provided in the third housing H03. Because the biaxial mirror unit 5 is stored in the third housing H03, it is preferable that the third housing 03 be covered with the soundproof wall SW. Also, the biaxial mirror unit 5 stored in the third housing H03 is stored within the third housing H03 in a configuration in which vibration is difficult due to an influence of noise outside the laser-induced vibration wave measuring system 20 (here, the third housing H03), the surroundings of the third housing H03 do not need to be covered with a soundproof wall. For example, when the biaxial mirror unit 5 is a heavy object and a vibration suppressing mechanism is provided, the soundproof wall SW is not essential because an influence of external noise is reduced.

FIG. 20 shows an example in which the surroundings of the third housing H03 are not covered with the soundproof wall SW and a dome-shaped (kamaboko-shaped) laser light port is provided. The dome-shaped laser light port is preferably made of a material similar to that of a laser window LW to be described below or is preferably coated with similar antireflection coating. The laser light (at least one or all of excitation laser light, measurement laser light, and distance measurement laser light) output to the biaxial mirror unit 5 is radiated toward an irradiation position of the inspection target M set by the biaxial mirror unit 5 from the laser light port formed in the third housing H03 to the outside of the third housing H03.

Figure 21:
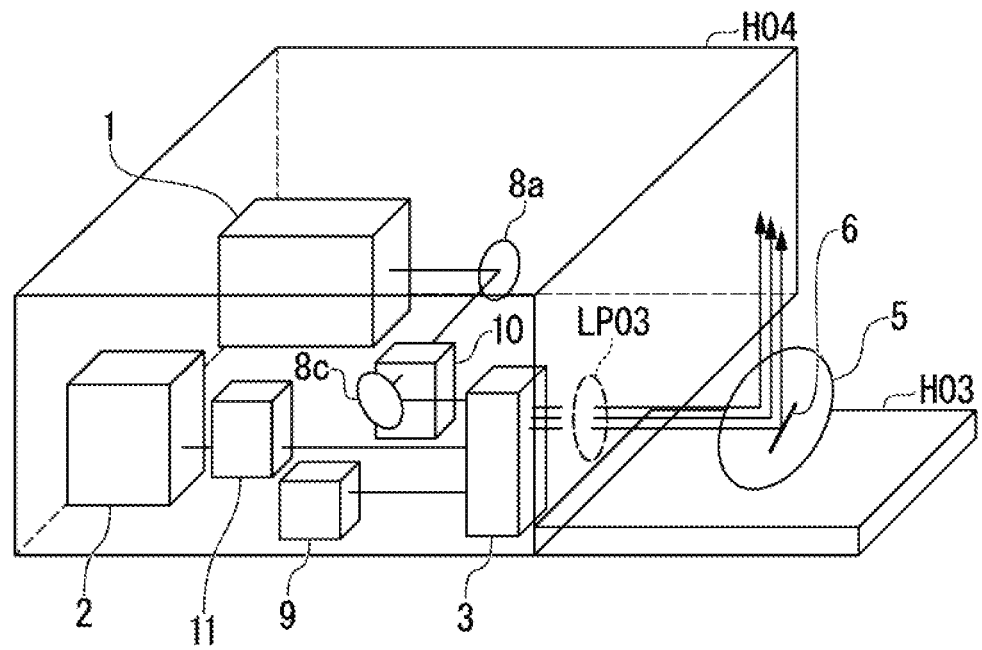
FIG. 21 is a diagram showing Example 2 of the laser-induced vibration wave measuring system of Modified Example 1 of the first embodiment.

FIG. 21 is a diagram showing Example 2 of the laser-induced vibration wave measuring system of Modified Example 1 of the first embodiment. Example 2 of the laser-induced vibration wave measuring system of Modified Example 1 of the first embodiment includes two housings. The two housings are referred to as a third housing H03 and a fourth housing H04. Also, FIG. 21 shows an example in which the third housing 03 does not include a dome-shaped (kamaboko-shaped) laser light port.

Example 2 of the laser-induced vibration wave measuring system of Modified Example 1 of the first embodiment is a configuration in which the first housing H01 and the second housing H02 of Example 1 shown in FIG. 20 are integrated. That is, the fourth housing H04 is a configuration in which the first housing H01 and the second housing H02 of Example 1 shown in FIG. 20 are integrated.

The fourth housing H04 includes the excitation laser device 1, the mirror 8a, the measurement laser device 2, the galvano scanner unit 3, the mirror 8c, the distance measurement laser device 9, the excitation laser condensing unit 10, and the measurement laser condensing unit 11. Although not shown in FIG. 21, the reverberation sound monitor 7, the mirror 8b, the imaging device 13, and the processing unit 100 may be provided in the fourth housing H04. Because a device for performing a measurement process is stored in the fourth housing H04, it is preferable that the surroundings of the device be covered with the soundproof wall SW.

At least one or all of the excitation laser light, the measurement laser light, and the distance measurement laser light output by the galvano scanner unit 3 move from a laser light port LP03 formed at the boundary between the fourth housing H04 and the third housing H03 to the third housing H03. The laser light port LP03 will be described below.

In Example 2 of the laser-induced vibration wave measuring system of Modified Example 1 of the first embodiment, vibration originating from the excitation laser may affect a device for performing a measurement process because the excitation laser device 1 is accommodated within the fourth housing H04. Thus, in Example 2 of the laser-induced vibration wave measuring system of Modified Example 1 of the first embodiment, it is preferable to use a high-power laser of a silent type semiconductor laser (laser diode (LD)) excitation scheme as the excitation laser device 1 as compared with a case in which a flash lamp excitation scheme is used.

Figure 22:
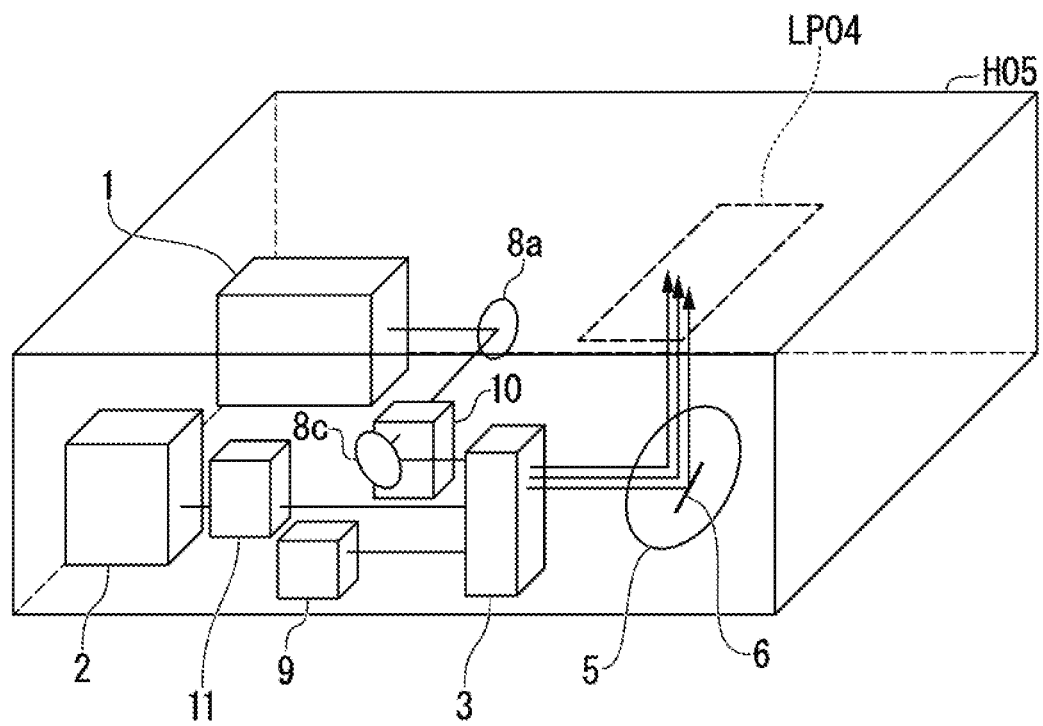
FIG. 22 is a diagram showing Example 3 of the laser-induced vibration wave measuring system of Modified Example 1 of the first embodiment.

FIG. 22 is a diagram showing Example 3 of the laser-induced vibration wave measuring system of Modified Example 1 of the first embodiment. Example 3 of the laser-induced vibration wave measuring system of Modified Example 1 of the first embodiment is a configuration in which the first housing H01, the second housing H02, and the third housing H03 are integrated in Example 1 of the laser-induced vibration wave measuring system of Modified Example 1 of the first embodiment or a configuration in which the fourth housing H04 and the third housing H03 are integrated in Example 2 of the laser-induced vibration wave measuring system of Modified Example 1 of the first embodiment. A housing in which the first housing H01, the second housing H02, and the third housing H03 are integrated or a housing in which the fourth housing H04 and the third housing H03 are integrated is referred to as a fifth housing H05.

The fifth housing H05 includes the excitation laser device 1, the mirror 8a, the measurement laser device 2, the galvano scanner unit 3, the mirror 8c, the distance measurement laser device 9, the excitation laser condensing unit 10, the measurement laser condensing unit 11, and the biaxial mirror unit 5. Although not shown in FIG. 22, the reverberation sound monitor 7, the mirror 8b, the imaging device 13, and the processing unit 100 may be provided in the fifth housing H05. Because a device for performing a measurement process is stored in the fifth housing H05, it is preferable that the surroundings thereof be covered with the soundproof wall SW.

The biaxial mirror unit 5 includes the biaxial mirror 6 and adjusts the biaxial mirror 6. The laser light (at least one or all of excitation laser light, measurement laser light, and distance measurement laser light) output to the biaxial mirror unit 5 is radiated toward an irradiation position of the inspection target M set by the biaxial mirror unit 5 from the laser light port LP04 formed in the fifth housing H05 to the outside of the fifth housing H05.

(Laser Light Port)

The laser light ports shown in Examples 1 to 3 of the laser-induced vibration wave measuring system of Modified Example 1 of the first embodiment will be described. Here, any housing among the first housing H01, the second housing H02, the third housing H03, the fourth housing H04, and the fifth housing H05 is referred to as a housing H. Also, the laser light port LP01, the laser light port LP02, the laser light port LP03, and the laser light port LP04 have similar configurations. Any laser light port among the laser light port LP01, the laser light port LP02, the laser light port LP03, and the laser light port LP04 is referred to as a laser light port LP.

Figure 23A:
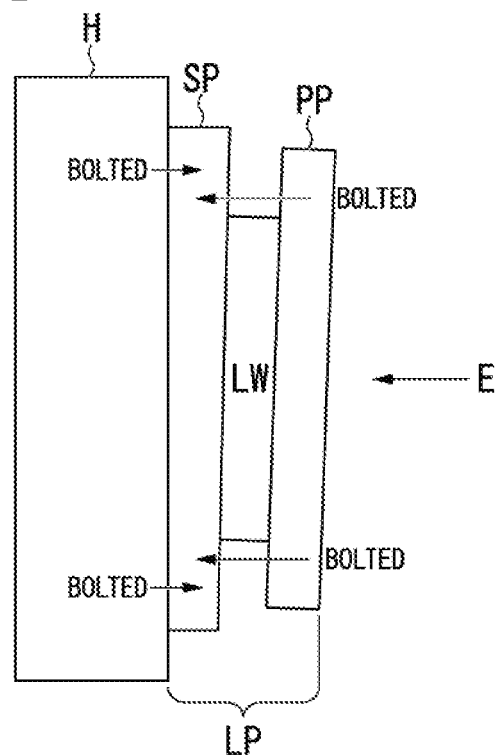
FIG. 23A is a diagram showing a side view of a laser light port LP of the laser-induced vibration wave measuring system of Modified Example 1 of the first embodiment.
Figure 23B:
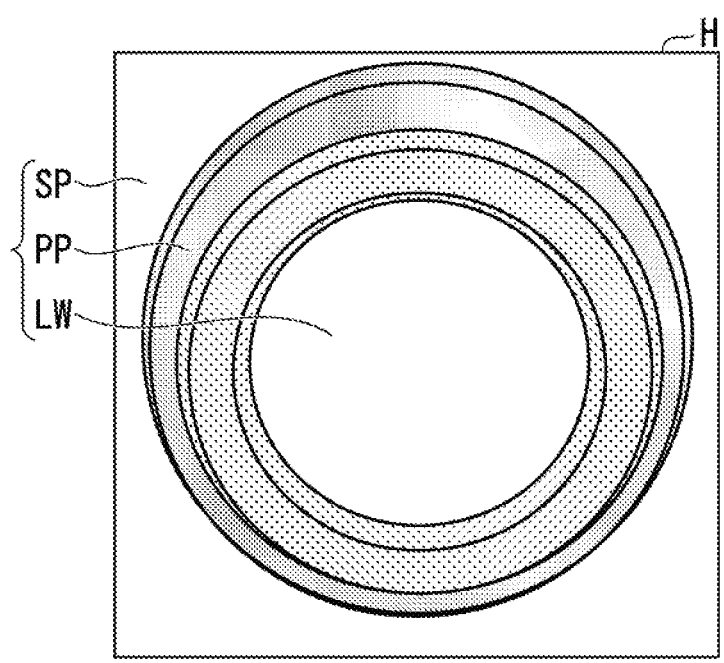
FIG. 23B is a diagram showing a front view of the laser light port LP of the laser-induced vibration wave measuring system of Modified Example 1 of the first embodiment.

FIGS. 23A and 23B are diagrams showing examples of the laser light ports LP shown in Examples 1 to 3 of the laser-induced vibration wave measuring system of Modified Example 1 of the first embodiment.

FIG. 23A is a diagram showing a side view of the laser light port LP of the laser-induced vibration wave measuring system of Modified Example 1 of the first embodiment.

The laser light port LP includes a spacer SP, a laser window LW, and a pressing plate PP. The spacer SP is bolted to the housing H. Here, it is preferable that the spacer SP be bolted to the housing H or welded to the housing H instead of being bolted to the housing H.

It is preferable that the laser window LW be made of a material having high laser light transmittance, withstand high-intensity laser light, and have weather resistance, mechanical rigidity, and chemical stability. An example of the laser window LW is quartz glass. It is desirable that the laser window LW be coated with an antireflection film so that reflection on a refractive index interface is curbed. To prevent the laser window LW from affecting measurement by the reflection of the measurement laser light on the refractive index interface, it is desirable that the laser window LW have an angle of a few degrees (hereinafter referred to as an "installation angle") with respect to a direction perpendicular to a movement direction of the laser window LW. In this regard, the laser window LW may be parallel to the direction orthogonal to the direction in which the laser window LW moves, i.e., the installation angle may be 0 degree. The installation angle is preferably 5 to 12 degrees and more preferably 8 to 10 degrees. For example, the installation angle is 10 degrees.

The pressing plate PP is a member for fixing the laser window LW to the spacer SP.

FIG. 23B is a diagram showing a front view of the laser light port LP of the laser-induced vibration wave measuring system of Modified Example 1 of the first embodiment. FIG. 23B is a diagram viewed from the direction of an arrow E in FIG. 23A. According to FIG. 23B, the laser window LW is fixed by the spacer SP in which an opening is formed and the pressing plate PP in which an opening is formed so that an opening is formed in the housing H and the laser window LW is exposed from the formed opening. Although a case in which a portion where the laser window LW is exposed is circular is shown in FIGS. 23A and 23B, the present invention is not limited to this example. For example, the exposed portion of the laser window LW may be an ellipse, a rectangle such as a quadrangle, or a polygon.

(Range of Installation Angle)

Here, a range of a desired installation angle of the laser window LW will be described.

Figure 24:
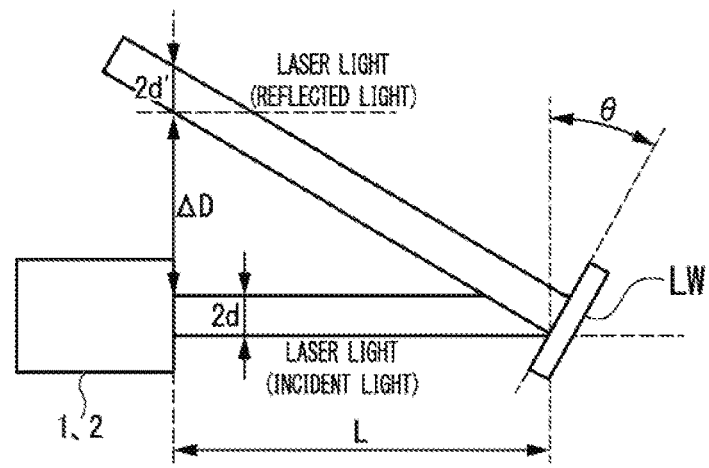
FIG. 24 is a diagram showing a minimum angle of installation angles of a laser window LW.
Figure 25:
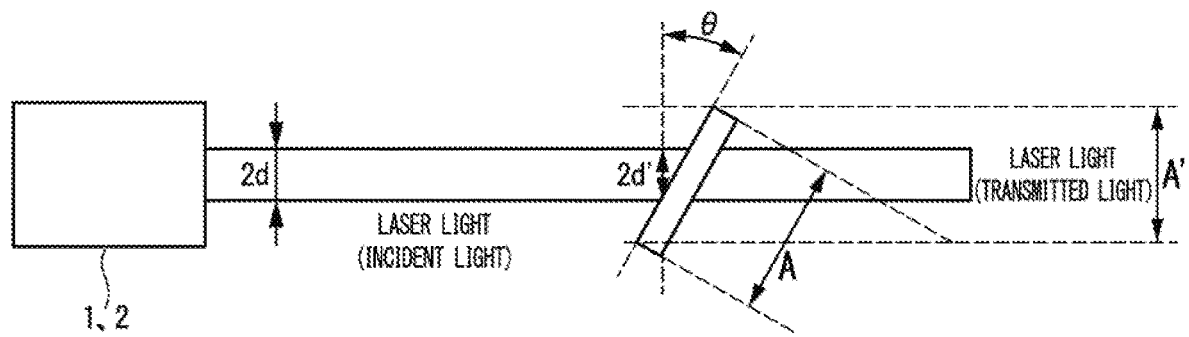
FIG. 25 is a diagram showing a maximum angle of the installation angles of the laser window LW.

FIG. 24 is a diagram showing the minimum installation angle of the laser window LW and FIG. 25 is a diagram showing the maximum installation angle of the laser window LW.

It is preferable that the range of the installation angle be a range which is greater than or equal to an angle of (ΔD>d+d') at which "laser light emitted from the laser device" does not overlap "laser light reflected on the laser window LW" at a position where the laser device emits the laser light as shown in FIG. 24 and which is less than or equal to an angle at which a diameter of an opening through which "laser light emitted from the laser device" can be transmitted is secured (2d'<A') as shown in FIG. 25. That is, when the installation angle is θ, Eq. (1) is satisfied.

[Math. 1]

$$\frac{1}{2}\tan^{-1}\left[\frac{d+\cos2\theta(d+L_{dis}\tan\theta_{Laser})}{L}\right] \leq \qquad (1)$$
$$\theta \leq \frac{\pi}{2} - \sin^{-1}\left[\frac{2(d+L_{dis}\tan\theta_{Laser})}{A}\right]$$

In Eq. (1), the angle is expressed in rad. By rewriting $\pi/2$ in Eq. (1) as 90 deg, it is possible to make a change to deg notation. d is a beam radius of the laser light, L is a distance from the laser device to the laser window LW, $L_{dis}$ is a distance until the laser light returns from the laser device to a laser light emission position after being reflected on the laser window LW, and $\theta_{Laser}$ is a laser divergence angle. Here, $\theta_{Laser}$ can be ignored as long as the laser light is parallel light that moves straight without being expanded or narrowed. Also, θ is the installation angle of the laser window LW and the angle directly facing the laser light is defined as 0 deg. A is the diameter of the laser window LW.

Eq. (1) can be simplified as shown in Eq. (2) in the case of parallel light (when $\theta_{Laser}$ can be ignored).

[Math. 2]

$$\frac{1}{2}\tan^{-1}\left(\frac{2d}{L}\right) \leq \theta \leq \frac{\pi}{2} - \sin^{-1}\left(\frac{2d}{A}\right) \qquad (2)$$

In Modified Example 1 of the first embodiment, the shape of the housing H is not limited to a rectangular parallelepiped and any shape can be applied. Also, the device stored in the housing H can be arbitrarily changed.

Here, although a case in which the laser-induced vibration wave measuring system 20 of the first embodiment is stored in one or more housings has been described as an example, the present invention is not limited thereto. For example, a similar effect can be obtained even if the laser-induced vibration wave measuring system 20a of the second embodiment is stored in one or more housings.

According to Modified Example 1 of the first embodiment, the device constituting the laser-induced vibration wave measuring system 20 is stored in one or more housings H, so that the accuracy of measurement of the inspection target M can be improved because soundproofing performance can be improved.

Modified Example 2

(Laser-Induced Vibration Wave Measuring System)

In a laser-induced vibration wave measuring system of Modified Example 2 of the first embodiment, the laser-induced vibration wave measuring system 20 of the first embodiment is mounted on a moving body.

Figure 26:
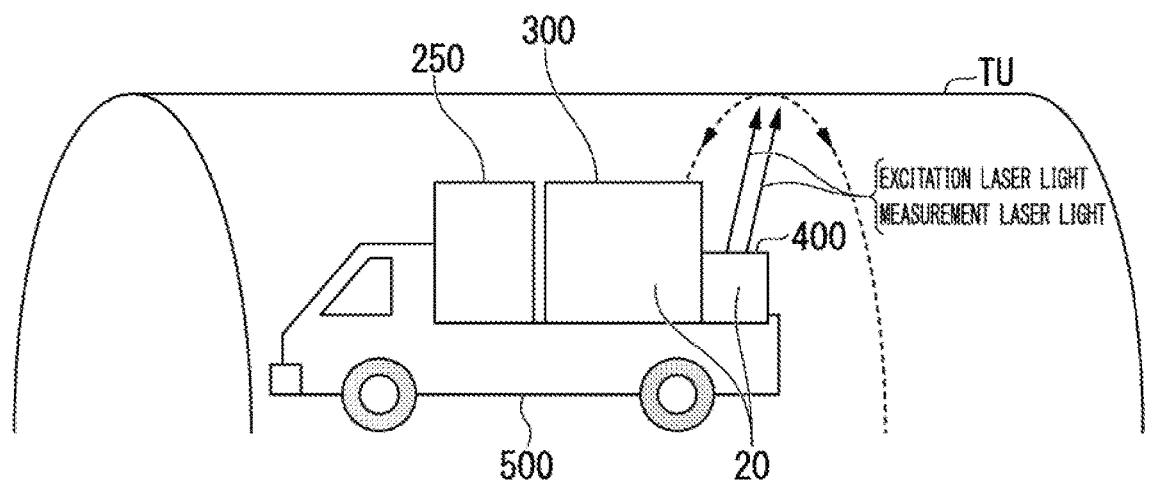
FIG. 26 is a diagram showing an example of a laser-induced vibration wave measuring system of Modified Example 2 of the first embodiment.

FIG. 26 is a diagram showing an example of the laser-induced vibration wave measuring system of Modified Example 2 of the first embodiment. As shown in FIG. 26, in the laser-induced vibration wave measuring system of Modified example 2 of the first embodiment, the laser-induced vibration wave measuring system 20 of the first embodiment is mounted on a moving body such as a truck 500. In addition to the moving body, a tunnel TU is also shown in FIG. 26. The moving body is located inside the tunnel TU. In the example shown in FIG. 26, the laser-induced vibration wave measuring system 20 of the first embodiment is mounted on the truck 500. Specifically, an equipment storage 250, a device housing 300, and a biaxial mirror housing 400 are mounted on the truck 500.

The equipment storage 250 stores a power supply for devices included in the laser-induced vibration wave measuring system 20, i.e., the excitation laser device 1, the measurement laser device 2, the galvano scanner unit 3, the biaxial mirror unit 5, the reverberation sound monitor 7, and the distance measurement laser device 9, the excitation laser condensing unit 10, the measurement laser condensing unit 11, the imaging device 13, and the processing unit 100, a cooling water chiller, and the processing unit 100 are stored. Because the device stored in the equipment storage 250 may become a noise source or a heat source, it is desirable to store the device in an external housing different from the device housing 300. The device stored in the equipment storage 250 does not need to be managed in a warehouse, but it is desirable that the device be protected from rain and wind, i.e., the device not be exposed to rain and wind. Because the device stored in the equipment storage 250 may serve as a heat source, it is preferable that the equipment storage 250 be provided with either or both of a ventilation function and an air conditioning function.

The excitation laser device 1, the measurement laser device 2, the galvano scanner unit 3, the reverberation sound monitor 7, the mirror 8*a*, the mirror 8*b*, the mirror 8*c*, the distance measurement laser device 9, the excitation laser condensing unit 10, the measurement laser condensing unit 11, and the imaging device 13 are stored in the device housing 300.

It is preferable that the surroundings of the device housing 300 be covered with a soundproof wall SW. Furthermore, it is desirable that the device housing 300 have dustproof and moistureproof functions.

However, because an operation sound becomes a noise source, it is preferable to separate the excitation laser device 1 from the device housing 300 and store the excitation laser device 1 in a housing different from the device housing 300. When the excitation laser device 1 is separated from the device housing 300 and is stored in a housing different from the device housing 300, the excitation laser light output by the excitation laser device 1 may be sent to the device housing 300 in which the measurement laser device 2 and the like are stored using the mirror 8*a*. For example, as in Example 1 (FIG. 20) of Modified Example 1 described above, a configuration in which the excitation laser device 1 is stored in a housing different from the device that performs the measurement process is an exemplary example.

The biaxial mirror unit 5 is stored in the biaxial mirror housing 400. It is preferable that the surroundings of the biaxial mirror housing 400 be covered with a soundproof wall SW. Further, it is desirable that the biaxial mirror housing 400 have dustproof and moistureproof functions. Although a case in which the biaxial mirror unit 5 is stored in the biaxial mirror housing 400 different from the device housing 300 has been described as an example in FIG. 26, the present invention is not limited thereto. As in Example 3 of Modified Example 1 (FIG. 22), the biaxial mirror unit 5 may be stored within the device housing 300.

Typically, in the laser-induced vibration wave measuring system of Modified Example 2 of the first embodiment, the laser-induced vibration wave measuring system of Modified Example 1 (Example 1, Example 2, and Example 3) of the first embodiment, i.e., the laser-induced vibration wave measuring system 20 stored in the housing H (H01, H02, H03, H04, and H05), and the equipment storage 250 are mounted on the truck 500.

In the laser-induced vibration wave measuring system according to Modified Example 2 of the first embodiment, the biaxial mirror unit 5 stored in the biaxial mirror housing 400 radiate excitation laser light and measurement laser light to an inner wall of the tunnel TU. The biaxial mirror unit 5 sweeps the excitation laser light and the measurement laser light according to a preset sweep order.

Although a case in which the laser-induced vibration wave measuring system 20 is mounted on the truck 500 has been described in Modified Example 2 of the first embodiment, the present invention is not limited to this example. The laser-induced vibration wave measuring system 20 may be configured to be movable in a conventionally well-known technique. The moving means is not limited to the presence or absence of wheels. For example, the laser-induced vibration wave measuring system 20 may be mounted on a moving body such as a wheelbarrow, an automobile, or a railway vehicle. Alternatively, the laser-induced vibration wave measuring system 20 may be configured to be movable by attaching the moving means (for example, wheels) thereto.

A case in which a power supply of the laser-induced vibration wave measuring system 20 is mounted on the same moving body as the device housing 300 and the biaxial mirror housing 400 has been described in Modified Example 2 of the first embodiment, the present invention is not limited to this example. For example, the power supply of the laser-induced vibration wave measuring system 20 may be mounted on a moving body different from the moving body on which the device housing 300 and the biaxial mirror housing 400 are mounted. When the power supply of the laser-induced vibration wave measuring system 20 is mounted on a moving body different from the moving body on which the device housing 300 and the biaxial mirror housing 400 are mounted, the moving body on which the power supply is mounted is preferably provided with anti-vibration measures.

Here, although a case in which the laser-induced vibration wave measuring system 20 of the first embodiment is mounted on a moving body has been described as an example, the present invention is not limited thereto. For example, a similar effect can be obtained when the laser-induced vibration wave measuring system 20*a* of the second embodiment is mounted on a moving body.

According to Modified Example 2 of the first embodiment, the laser-induced vibration wave measuring system 20 is mounted on the moving body, so that the movement can be facilitated and the inspection target M can be easily measured.

Modified Example 3

(Laser-Induced Vibration Wave Measuring System)

Modified Example 3 of the first and second embodiments will be described. In Modified Example 3 of the first embodiment, a soundproof wall is provided around some or all of the components constituting the laser-induced vibration wave measuring system 20 of the first embodiment. In Modified Example 1 of the second embodiment, a soundproof wall is provided around some or all of the components constituting the laser-induced vibration wave measuring system 20a of the second embodiment. In other words, the components constituting the laser-induced vibration wave measuring system 20 are stored in the laser-induced vibration wave measuring system of Modified Example 1 (Example 1, Example 2, or Example 3) described above, i.e., in each of one or more housings H, and a soundproof wall is provided around a part or all of the housing H (H01, H02, H03, H04, or H05). Here, the description of Modified Example 3 of the first embodiment will be continued as an example.

Figure 27A:
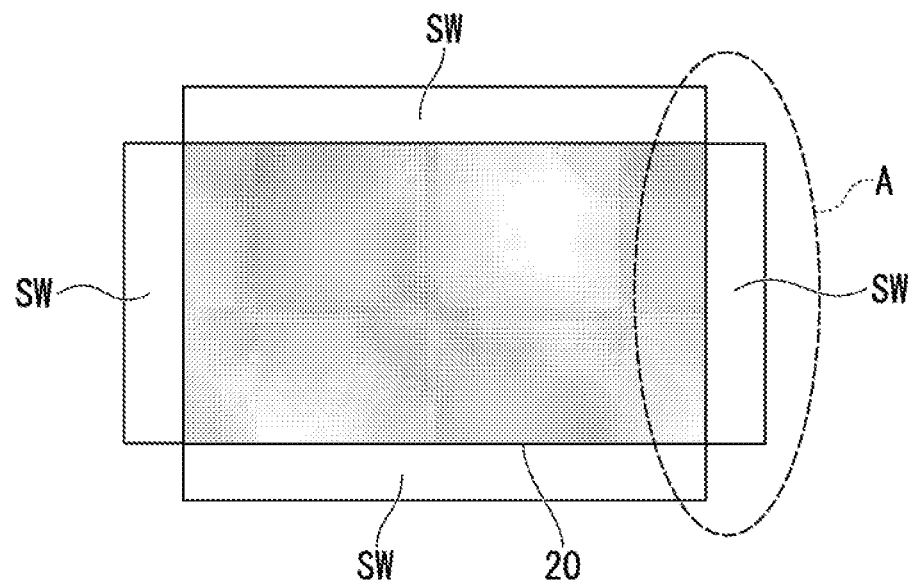
FIG. 27A is a diagram showing an example of a laser-induced vibration wave measuring system of Modified Example 3 of the first embodiment.

FIG. 27A is a diagram showing an example of a laser-induced vibration wave measuring system of Modified Example 3 of the first embodiment. A top view of the laser-induced vibration wave measuring system of Modified Example 3 of the first embodiment is shown in FIG. 27A. As shown in FIG. 27A, the four sides of the laser-induced vibration wave measuring system 20 are covered with soundproof walls SW. It is also preferable to provide soundproof walls SW on the upper and lower sides of the laser-induced vibration wave measuring system 20 in addition to the four sides thereof so that the soundproofing performance is improved. That is, it is preferable that the laser-induced vibration wave measuring system 20 be covered with the soundproof wall SW.

Figure 27B:
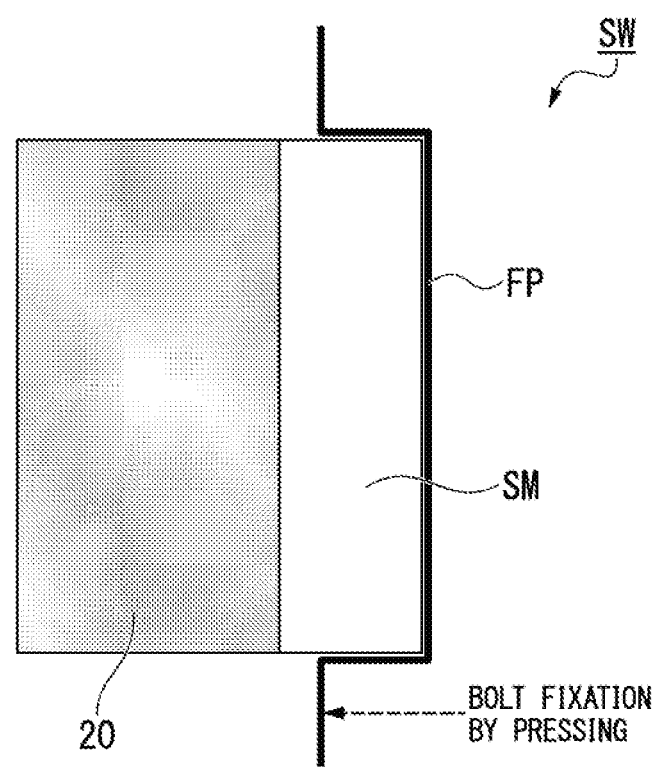
FIG. 27B is a partially enlarged view of the laser-induced vibration wave measuring system of Modified Example 3 of the first embodiment.

FIG. 27B is a partially enlarged view of the laser-induced vibration wave measuring system of Modified Example 3 of the first embodiment. FIG. 27B shows a partially enlarged view of A of FIG. 27A. The soundproof wall SW is configured to include a sound absorbing material SM.

The sound absorbing material SM is a member that absorbs a sound. An example of the sound absorbing material SM is a porous material such as a sponge. The sound absorbing material SM covers the surroundings of the laser-induced vibration wave measuring system 20 in close contact with each other without any gap. It is desirable that the sound absorbing material SM can just cover the surroundings of the laser-induced vibration wave measuring system 20 or be slightly protruding.

The soundproof wall SW may be configured to include a frame plate FP in addition to the sound absorbing material SM. The frame plate FP is a plate-shaped member with which the sound absorbing material SM is covered. The frame plate FP is pressed against the sound absorbing material SM and its end is fixed. For example, it is only necessary to fix the frame plate FP with bolts or fasteners. According to this configuration, the sound absorbing material SM is fixed between the laser-induced vibration wave measuring system 20 and the frame plate FP. It is desirable that the frame plate FP have a high (heavy) density and rigidity so that an external sound is reflected. An example of the frame plate FP is an iron plate.

Figure 28A:
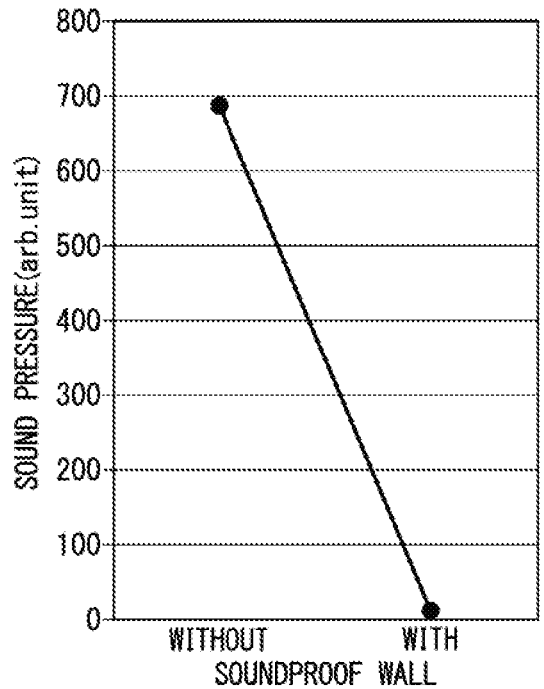
FIG. 28A is a diagram showing Example 1 of the effect of a soundproof wall of the laser-induced vibration wave measuring system of Modified Example 3 of the first embodiment.

FIG. 28A is a diagram showing Example 1 of the effect of a soundproof wall of the laser-induced vibration wave measuring system of Modified Example 3 of the first embodiment. In the example shown in FIG. 28A, sound pressure measurement results when the soundproof wall SW is provided around the laser-induced vibration wave measuring system 20 of the first embodiment and when no soundproof wall SW is provided therearound are shown.

In the evaluation shown in FIG. 28A, the measurement laser device 2, the galvano scanner unit 3, the mirror 8c, the distance measurement laser device 9, the excitation laser condensing unit 10, and the measurement laser condensing unit 11 are stored within an appropriate housing (the second housing H02 described above) were stored and a soundproof wall SW was attached to cover the surroundings (side walls) of the housing. The lower surface of the housing is in close contact with the installation floor and the upper surface of the housing is loaded with the first housing H01 as shown in FIG. 20 described above. The soundproof wall SW is not arranged around the excitation laser device 1 and the biaxial mirror unit 5. Sound insulation targets are an irradiation sound of laser light (typically an excitation laser) and noise generated in an external environment (a passing sound of a car and an operation sound of equipment such as a laser device power supply and a chiller for generating cooling water). A microphone was installed within the housing of the laser-induced vibration wave measuring system 20 (the second housing H02) and a sound range in the range of 0.01 kHz to 20 kHz was set as a measurement target. According to FIG. 28A, it can be seen that the improvement of the sound insulation performance of about 35 dB is achieved by mounting the soundproof wall SW around the laser-induced vibration wave measuring system 20.

Figure 28B:
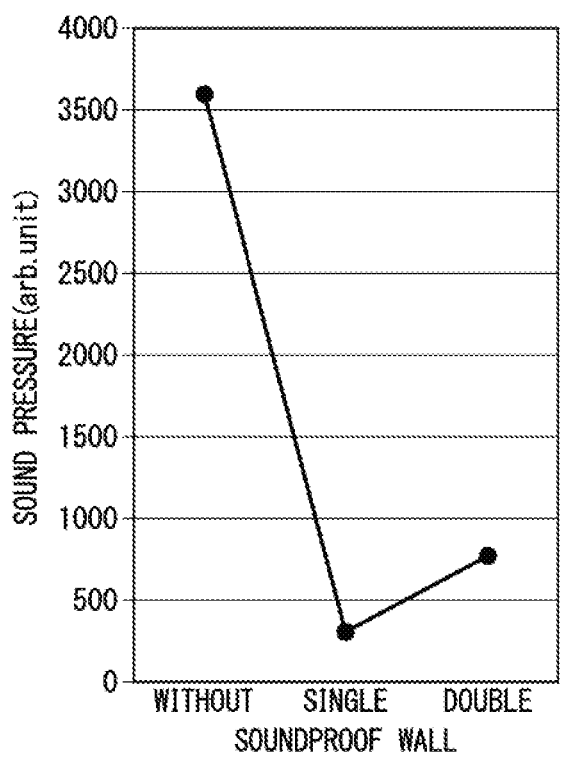
FIG. 28B is a diagram showing Example 2 of the effect of a soundproof wall of the laser-induced vibration wave measuring system of Modified Example 3 of the first embodiment.

FIG. 28B is a diagram showing Example 2 of the effect of a soundproof wall of the laser-induced vibration wave measuring system of Modified Example 3 of the first embodiment. In the example shown in FIG. 28B, sound pressure measurement results when a single soundproof wall SW is mounted around the laser-induced vibration wave measuring system 20 of the first embodiment, when double soundproof walls SW are mounted therearound, and when no soundproof wall SW is mounted therearound are shown.

In the evaluation shown in FIG. 28B, the measurement laser device 2, the galvano scanner unit 3, the mirror 8c, the distance measurement laser device 9, the excitation laser condensing unit 10, and the measurement laser condensing unit 11 were stored within an appropriate housing (the second housing H02 described above) and a soundproof wall SW was attached to cover the surroundings (side walls) of the housing. The lower surface of the housing is in close contact with the installation floor and the upper surface of the housing is loaded with the first housing H01 as shown in FIG. 20 described above. The soundproof wall SW is not arranged around the excitation laser device 1 and the biaxial mirror unit 5. A sound insulation target is a source of a single sound of 0.1 kHz. A microphone was installed within the housing of the laser-induced vibration wave measuring system 20 and a measurement target was 0.1 kHz. According to FIG. 28B, it can be seen that the improvement of the sound insulation performance of about 21.6 dB is achieved by mounting a single soundproof wall SW around the laser-induced vibration wave measuring system 20 (the second housing H02). Further, it can be seen that the improvement of the sound insulation performance of about 13.3 dB is achieved by mounting double soundproof walls SW. Here, the soundproofing performance was improved when the single soundproof wall SW was installed as compared with when the double soundproof walls SW were installed around the laser-induced vibration wave measuring system 20. It is assumed that this is because an added soundproof wall SW resonates and vibrates when the double soundproof walls SW are mounted. Thus, the soundproofing performance can be improved by mounting the single soundproof wall having high sound insulation performance or by taking into account resonance vibration of the soundproof wall SW.

Figure 29:
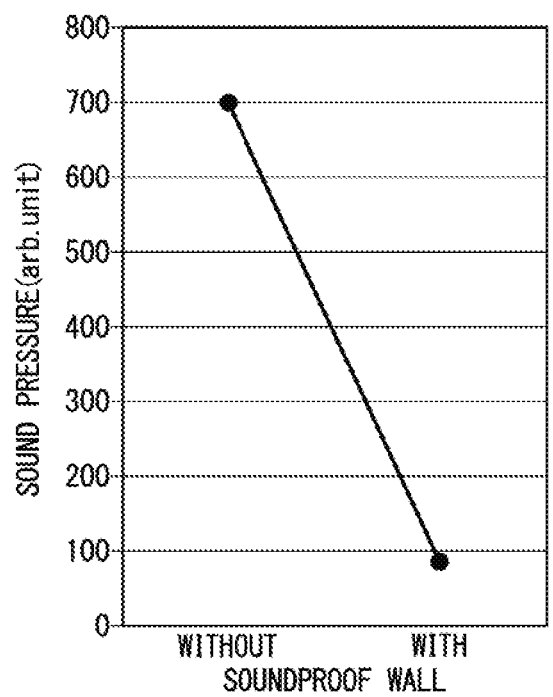
FIG. 29 is a diagram showing Example 3 of the effect of a soundproof wall of the laser-induced vibration wave measuring system of Modified Example 3 of the first embodiment.

FIG. 29 is a diagram showing Example 3 of the effect of a soundproof wall of the laser-induced vibration wave measuring system of Modified Example 3 of the first embodiment. In the example shown in FIG. 29, sound pressure measurement results when the soundproof wall SW is mounted around the laser-induced vibration wave measuring system 20 of the first embodiment and when no soundproof wall SW is mounted therearound are shown.

In the evaluation shown in FIG. 29, the biaxial mirror unit 5 was stored in an appropriate housing (the third housing H03 described above) and the soundproof wall SW was attached to cover the surroundings (side walls) and the upper surface of the housing. Also, the lower surface is installed on the floor. Also, the measurement laser device 2, the galvano scanner unit 3, the mirror 8*c*, the distance measurement laser device 9, the excitation laser condensing unit 10, the measurement laser condensing unit 11, and the excitation laser device 1 are stored in an appropriate housing (the first housing H01 or the second housing H02 to be described below) and a soundproof wall is arranged therearound. A sound insulation target is an irradiation sound of a laser. A microphone was installed inside the third housing H03 and a sound range in the range of 0 kHz to 20 kHz was a measurement target. According to FIG. 29, it can be seen that the improvement of the sound insulation performance of about 18 dB is achieved by mounting the soundproof wall SW around the third housing H03.

According to Modified Example 3 of the first embodiment, the soundproofing performance can be improved by mounting the soundproof wall SW around the laser-induced vibration wave measuring system 20, so that the accuracy of measurement of the inspection target M can be improved.

Here, although a case in which the soundproof wall SW is provided around the laser-induced vibration wave measuring system 20 of the first embodiment has been described as an example, the present invention is not limited thereto. For example, a similar effect can be obtained even if the soundproof wall SW is provided around the laser-induced vibration wave measuring system 20*a* of the second embodiment.

(Operation of Laser-Induced Vibration Wave Measuring System 20)

Figure 30:
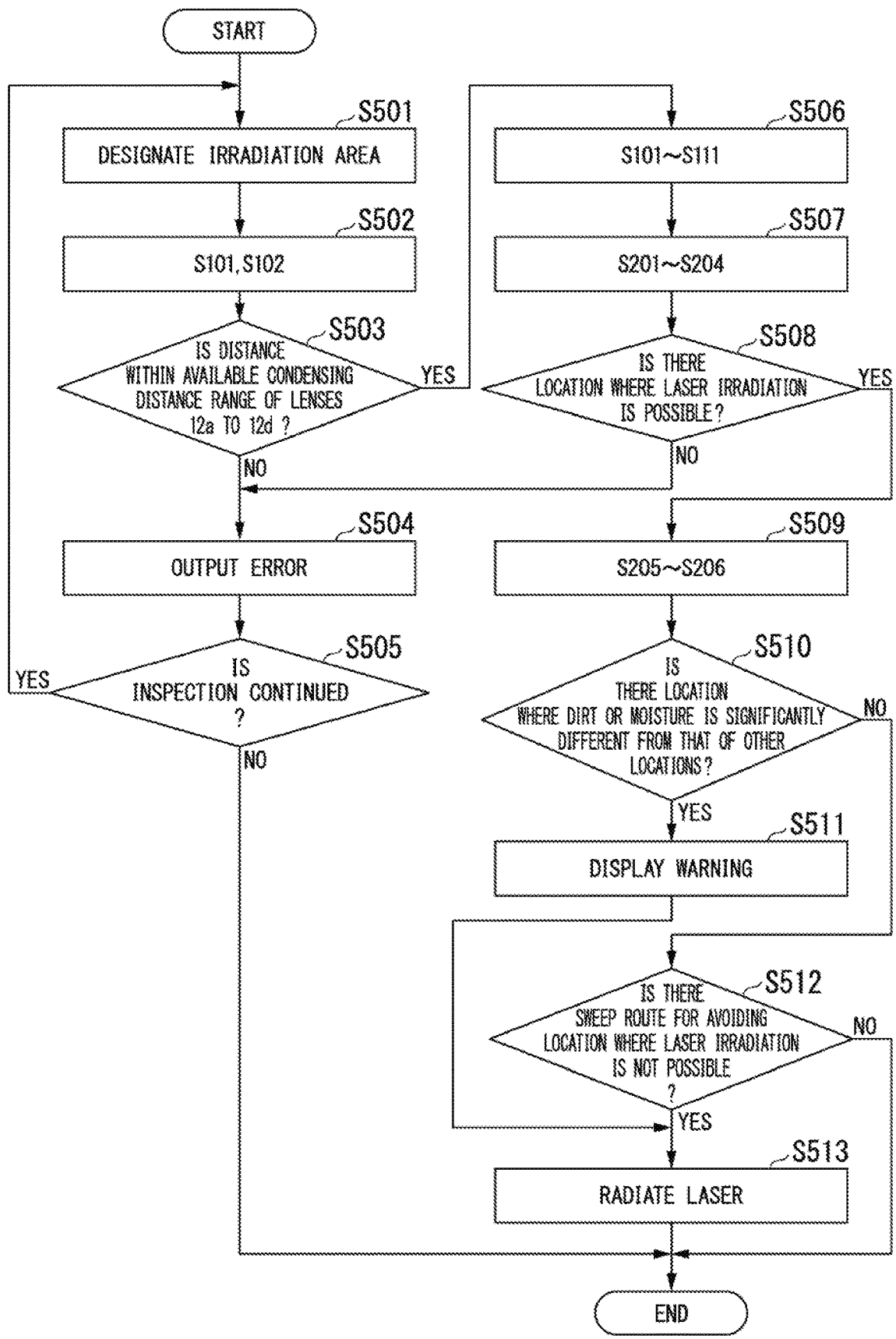
FIG. 30 is a sequence chart showing an example of an operation of the laser-induced vibration wave measuring system of the first embodiment.

FIG. 30 is a sequence chart showing an example of an operation of the laser induced vibration wave measuring system of the first embodiment. FIG. 30 shows a process of adjusting a condensing position of the excitation laser condensing unit 10, controlling a laser irradiation location on the inspection target M using the galvano scanner unit 3 and the biaxial mirror unit 5, and radiating a laser. That is, a process in which FIGS. 14 and 15 of the first embodiment are linked will be described. Here, FIGS. 14 and 15 are appropriately referred to.

(Step S501)
An irradiation area is designated.
(Step S502)
Steps S101 and S102 of FIG. 14 are executed.

(Step S503)
The communicating portion 110 of the processing unit 100 receives irradiation distance information transmitted by the distance measurement laser device 9 and outputs the received irradiation distance information to the information acquiring portion 122. The irradiation distance data acquiring portion 122*a* of the information acquiring portion 122 acquires the irradiation distance information output by the communicating portion 110 and outputs the acquired irradiation distance information to the measuring portion 124. The condensing position deriving portion 124*a* of the measuring portion 124 acquires the irradiation distance information output by the irradiation distance data acquiring portion 122*a* and acquires an inter-lens distance between the lens 12*a* and the lens 12*b* associated with the acquired irradiation distance information from the inter-lens distance table 144 stored in the storing portion 140.

The communicating portion 110 of the processing unit 100 receives the irradiation distance information transmitted by the distance measurement laser device 9 and outputs the received irradiation distance information to the information acquiring portion 122. The irradiation distance data acquiring portion 122*a* of the information acquiring portion 122 acquires the irradiation distance information output by the communicating portion 110 and outputs the acquired irradiation distance information to the measuring portion 124. The condensing position deriving portion 124*a* of the measuring portion 124 acquires the irradiation distance information output by the irradiation distance data acquiring portion 122*a* and acquires an inter-lens distance between the lens 12*c* and the lens 12*d* associated with the acquired irradiation distance information from the inter-lens distance table 144 stored in the storing portion 140.

The condensing position deriving portion 124*a* determines whether or not the acquired distance is within an available condensing distance range of the lenses 12*a*, 12*b*, 12*c*, and 12*d*.

(Step S504)
The condensing position deriving portion 124*a* outputs an error when it is determined that the acquired distance is not within the available condensing distance range. The condensing position deriving portion 124*a* may display that there is an error on the display portion 130.

(Step S505)
The condensing position deriving portion 124*a* determines whether or not to continue the inspection. When the inspection is continued, the process proceeds to step S501. When the inspection is not continued, the process ends.

(Step S506)
When it is determined that the acquired distance is within the available condensing distance range in step S503, steps S101 to S111 of FIG. 14 are executed.

(Step S507)
Steps S201 to S204 of FIG. 15 are executed.

(Step S508)
The irradiation location analyzing portion 124*b* of the processing unit 100 determines whether or not there is a location where laser irradiation is possible. When there is no location where laser irradiation is possible, the process proceeds to step S504.

(Step S509)
When it is determined that there is no location where laser irradiation is possible in step S508, steps S205 to S206 of FIG. 15 are executed.

(Step S510)

The irradiation location analyzing portion 124b of the processing unit 100 determines whether or not there is a location where dirt or moisture is significantly different from that of other locations.

(Step S511) When it is determined that there is a location where dirt or moisture is significantly different from that of other locations in step S510, the irradiation location analyzing portion 124b displays a warning on the display portion 130.

(Step S512)

When it is determined that there is no location where dirt or moisture is significantly different from that of other locations in step S510, the irradiation location analyzing portion 124b determines whether or not there is a sweep route for avoiding a location where laser irradiation is not possible. When there is no sweep route for avoiding a location where laser irradiation is not possible, the process ends.

(Step S513)

After the warning is displayed on the display portion 130 in step S511 or when there is a sweep route for avoiding a location where laser irradiation is not possible in step S512, the excitation laser device 1 radiates excitation laser light and the measurement laser device 2 radiates measurement laser light.

A process may be executed in a state in which any one of steps S501 to S513 is omitted or the order of steps S501 to S513 may be changed.

(Operation of Laser-Induced Vibration Wave Measuring System 20)

Figure 31:
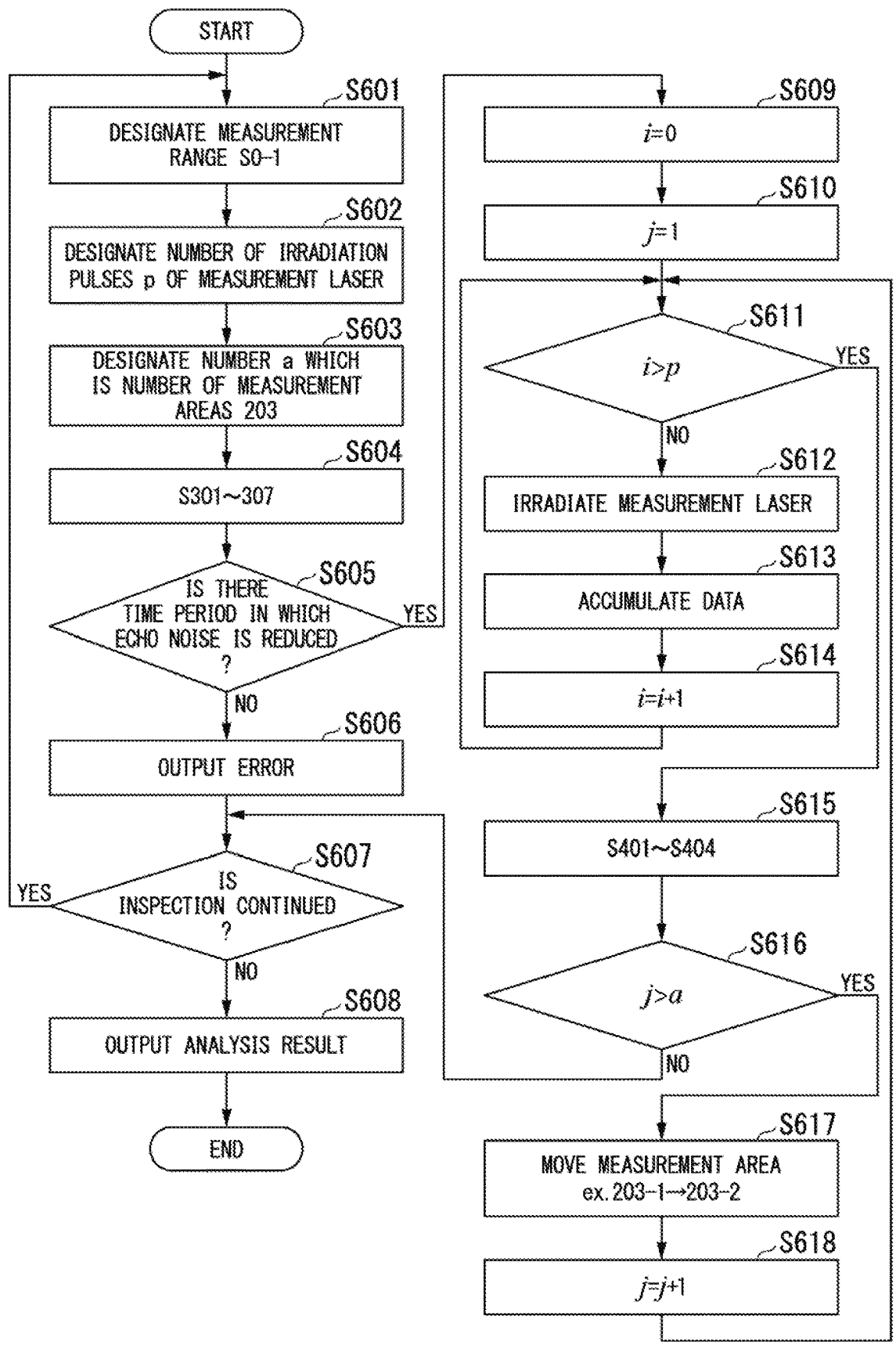
FIG. 31 is a sequence chart showing an example of an operation of the laser-induced vibration wave measuring system of the first embodiment.

FIG. 31 is a sequence chart showing an example of an operation of the laser-induced vibration wave measuring system of the first embodiment. FIG. 31 shows a process of determining whether or not a location of the inspection target M irradiated with excitation laser light is faultless by controlling an output timing of the excitation laser light, radiating the excitation laser light and measurement laser light, and processing vibration data. That is, a process in which FIGS. 16 and 17 of the first embodiment are linked will be described. Here, FIGS. 2, 16, and 17 are appropriately referred to.

(Step S601)

The reverberation sound analyzing portion 124c of the processing unit 100 designates a measurement range SO-1.

(Step S602)

The reverberation sound analyzing portion 124c of the processing unit 100 designates the number of irradiation pulses p of the measurement laser light.

(Step S603)

The reverberation sound analyzing portion 124c of the processing unit 100 designates a number a which is the number of measurement areas 203.

(Step S604)

Steps S301 to S307 of FIG. 16 are executed.

(Step S605)

The reverberation sound analyzing portion 124c of the processing unit 100 determines whether or not there is a time period in which echo noise is reduced.

(Step S606)

The reverberation sound analyzing portion 124c outputs an error when it is determined that there is no time period in which echo noise is reduced. The reverberation sound analyzing portion 124c may display an error on the display portion 130.

(Step S607)

The reverberation sound analyzing portion 124c determines whether or not to continue the inspection. When the inspection is continued, the process proceeds to step S601.

(Step S608)

When the inspection is not continued, the display portion 130 displays a result of inspecting the faultlessness of a portion of the inspection target M irradiated with the excitation laser light.

(Step S609)

When it is determined that there is a time period in which echo noise is reduced in step S605, the timing deriving portion 124d sets i=0.

(Step S610)

The timing deriving portion 124d sets j=1.

(Step S611)

The timing deriving portion 124d determines whether or not i>p.

(Step S612)

When i>p, the excitation laser device 1 radiates the excitation laser light and the measurement laser device 2 radiates the measurement laser light.

(Step S613)

The communicating portion 110 of the processing unit 100 receives vibration data (the number of vibrations) transmitted by the measurement laser device 2 and outputs the received vibration data to the information acquiring portion 122. The vibration data acquiring portion 122d of the information acquiring portion 122 acquires the vibration data output by the communicating portion 110.

The vibration data acquiring portion 122d outputs the acquired vibration data to the analyzing portion 126.

(Step S614)

The timing deriving portion 124d sets i=i+1 and returns to step S611.

(Step S615) Steps S401 to S404 of FIG. 17 are executed.

(Step S616)

The data processing portion 126a determines whether or not j>a. When j>a, the process proceeds to step S607.

(Step S617)

The timing deriving portion 124d causes the measurement area to be moved. For example, the timing deriving portion 124d causes the measurement area to be moved from the biaxial mirror irradiation area 203-1 to the biaxial mirror irradiation area 203-2.

(Step S618)

The timing deriving portion 124d sets j=j+1 and proceeds to step S611.

A process may be executed in a state in which any one of steps S601 to S609 is omitted or the order of steps S601 to S609 may be changed.

Although the operation of the laser-induced vibration wave measuring system 20 according to the first embodiment has been described here as an example, the present invention is not limited thereto. For example, likewise, the present invention is not limited to the operation of the laser-induced vibration wave measuring system 20a of the second embodiment or the modified example of the laser-induced vibration wave measuring system 20 of the first embodiment or the laser-induced vibration wave measuring system 20a of the second embodiment.

While several embodiments of the present invention have been described, these embodiments have been presented by way of example only, and are not intended to limit the scope of the inventions. These embodiments may be embodied in a variety of other forms. Various omissions, substitutions, changes, and combinations may be made without departing from the spirit of the inventions. The inventions described in the accompanying claims and their equivalents are intended to cover such embodiments or modifications as would fall within the scope and spirit of the inventions.

Also, the above-described processing units 100 and 100a internally have a computer. The process of processing of each device described above is stored in a computer-readable recording medium in the form of a program and the above-described processing is performed by the computer reading and executing the program. Here, the computer-readable recording medium refers to a magnetic disc, a magneto-optical disc, a CD-ROM, a DVD-ROM, a semiconductor memory, or the like. Also, the computer program may be distributed to the computer via a communication circuit and the computer receiving the distributed computer program may execute the program.

Also, the above-described program may be a program for implementing some of the above-described functions.

Further, the above-described program may be a program capable of implementing the above-described function in combination with a program already recorded on the computer system, i.e., a so-called differential file (differential program).

In the above-described embodiment, the processing unit 100 and the processing unit 100a are examples of a measuring device, the inspection target M is an example of an inspection target, the excitation laser light is an example of a laser, the data processing portion 126a and the data processing portion 126c are examples of a data removing portion and a noise removing portion, the galvano scanner unit 3 and the biaxial mirror unit 5 are examples of a sweep device, the excitation laser device is an example of a laser device, and the galvano scanner unit 3 and the biaxial mirror unit 5 are an example of a sweep portion.

REFERENCE SIGNS LIST

20, 20a Laser-induced vibration wave measuring system
1 Excitation laser device
2 Measurement laser device
3 Galvano scanner unit
4a, 4b Galvano scanner mirror
5 Biaxial mirror unit
6 Biaxial mirror
7 Reverberation sound monitor
8a, 8b, 8c Mirror
9 Distance measurement laser device
10 Excitation laser condensing unit
11 Measurement laser condensing unit
12a, 12b, 12c, 12d Lens
13 Imaging device
100, 100a Processing unit
110 Communicating portion
120, 120a Information processing portion
122 Information acquiring portion
122a Irradiation distance data acquiring portion
122b Irradiation location data acquiring portion
122c Reverberation sound data acquiring portion
122d Vibration data acquiring portion
124 Measuring portion
124a Condensing position deriving portion
124b Irradiation location analyzing portion
124c Reverberation sound analyzing portion
124d Timing deriving portion
126, 126d Analyzing portion
126a, 126c Data processing portion
126b Determining portion
140, 140a Storing portion
142, 142a Program
144 Inter-lens distance table
146 Surrounding measurement data DB
250 Equipment storage
300 Device housing
400 Biaxial mirror housing
500 Truck

What is claimed is:

1. A measuring device for measuring an inspection target on the basis of vibration generated when the inspection target has been irradiated with laser light, the measuring device comprising:
a condensing position deriving portion configured to derive an amount of adjustment of a condensing position of an excitation laser condensing unit configured to condense the laser light on the basis of a distance between a laser device configured to radiate the laser light and an irradiation location of the laser light;
a communicating portion configured to transmit control information including information representing the amount of adjustment to the excitation laser condensing unit;
a reverberation sound data acquiring portion configured to acquire time-series data of a reverberation sound generated when the inspection target has been irradiated with the laser light;
a reverberation sound analyzing portion configured to acquire a timing at which the inspection target is irradiated with the laser light on the basis of an intensity of the reverberation sound of the time-series data of the reverberation sound acquired by the reverberation sound data acquiring portion; and
a data removing portion configured to remove data during a predetermined time period from a time at which the inspection target has been irradiated with the laser light from measurement data of vibration generated in the inspection target,
wherein the laser device is configured to radiate excitation laser light, which is the laser light that causes the inspection target to vibrate in the sound wave region of 20 kHz or less,
wherein the excitation laser condensing unit includes a first lens and a second lens for condensing the excitation laser light and adjusts the focusing position of the vibrating laser light by adjusting the distance between the first lens and the second lens on the basis of the information representing the amount of adjustment of the distance between the first lens and the second lens included in the received control information transmitted by the communicating portion,
wherein the data removing portion extracts data for a predetermined time to be removed from the measurement data based on the measurement data of the vibration generated in the inspection target and the measurement conditions derived by the reverberation sound analysis portion.

2. The measuring device according to claim 1, further comprising an irradiation location analyzing portion configured to select a location to be irradiated with the laser light on the basis of information representing an image of a location of the inspection target scheduled to be irradiated with the laser light,
wherein the communicating portion is configured to transmit control information including information representing the location to be irradiated with the laser light selected by the irradiation location analyzing portion to a sweep device configured to sweep the laser light.

3. The measuring device according to claim 1, wherein the communicating portion is configured to transmit control information including the information representing the timing acquired by the reverberation sound analyzing portion to the laser device configured to radiate the laser light.

4. The measuring device according to claim 1, further comprising a noise removing portion configured to remove noise from measurement data on the basis of a correlation coefficient between the measurement data of vibration generated in the inspection target and an evaluation function of the measurement data.

5. The measuring device according to claim 1, further comprising a noise removing portion configured to remove noise from measurement data of vibration on the basis of the measurement data of the vibration generated in the inspection target and data obtained by shifting a phase of time-series data of the measurement data.

6. The measuring device according to claim 1, further comprising a determining portion configured to determine faultlessness of a location of the inspection target irradiated with the laser light on the basis of measurement data acquired when vibration has been induced in the inspection target by irradiating the inspection target with the laser light and measurement data acquired when the inspection target has not been irradiated with the laser light that induces the vibration.

7. The measuring device according to claim 1, wherein at least the excitation laser condensing unit is stored in a housing having soundproofing performance.

8. A measuring system for measuring an inspection target on the basis of vibration generated when the inspection target has been irradiated with laser light, the measuring system comprising:
an excitation laser device configured to radiate excitation laser light, which is the laser light that causes the inspection target to vibrate in the sound wave region of 20 kHz or less;
an excitation laser condensing unit configured to condense the excitation laser light radiated by the excitation laser device;
a measuring device including a condensing position deriving portion configured to derive a first amount of adjustment of a condensing position of the excitation laser condensing unit on the basis of a distance between the excitation laser device and an irradiation location of the excitation laser light radiated by the excitation laser device; and a communicating portion configured to transmit control information including information representing the first amount of adjustment to the excitation laser condensing unit;
a reverberation sound data acquiring portion configured to acquire time-series data of a reverberation sound generated when the inspection target has been irradiated with the laser light;
a reverberation sound analyzing portion configured to acquire a timing at which the inspection target is irradiated with the laser light on the basis of an intensity of the reverberation sound of the time-series data of the reverberation sound acquired by the reverberation sound data acquiring portion; and
a data removing portion configured to remove data during a predetermined time period from a time at which the inspection target has been irradiated with the laser light from measurement data of vibration generated in the inspection target,
wherein the excitation laser condensing unit includes a first lens and a second lens for condensing the excitation laser light and adjusts the focusing position of the vibrating laser light by adjusting the distance between the first lens and the second lens on the basis of the information representing the amount of adjustment of the distance between the first lens and the second lens included in the received control information transmitted by the communicating portion,
wherein the data removing portion extracts data for a predetermined time to be removed from the measurement data based on the measurement data of the vibration generated in the inspection target and the measurement conditions derived by the reverberation sound analysis portion.

9. The measuring system according to claim 8, comprising:
a measurement laser device configured to irradiate the inspection target with measurement laser light that is laser light for detecting vibration induced in the inspection target; and
an excitation laser condensing unit configured to condense the measurement laser light radiated by the measurement laser device,
wherein the condensing position deriving portion derives a second amount of adjustment of a condensing position of the excitation laser condensing unit on the basis of a distance between the measurement laser device and an irradiation location of the measurement laser light radiated by the measurement laser device and
wherein the communicating portion is configured to transmit control information including information representing the second amount of adjustment to the excitation laser condensing unit.

10. The measuring system according to claim 9, comprising a sweep device configured to sweep the excitation laser light output by the excitation laser device and the measurement laser light output by the measurement laser light device.

11. The measuring system according to claim 8, wherein at least the excitation laser condensing unit is stored in a housing having soundproofing performance.

12. A moving body equipped with the measuring system according to claim 8.

13. A measuring method to be executed by a measuring device for measuring an inspection target on the basis of vibration generated when the inspection target has been irradiated with laser light, the measuring method comprising steps of:
deriving an amount of adjustment of a condensing position of an excitation laser condensing unit configured to condense the laser light on the basis of a distance between a laser device configured to radiate the laser light and an irradiation location of the laser light;
transmitting control information including information representing the amount of adjustment to the excitation laser condensing unit;
acquiring time-series data of a reverberation sound generated when the inspection target has been irradiated with the laser light;
acquiring a timing at which the inspection target is irradiated with the laser light on the basis of an intensity of the reverberation sound of the time-series data of the reverberation sound acquired;

extracting data for a predetermined time to be removed from the measurement data based on the measurement data of the vibration generated in the inspection target and the measurement conditions derived by acquiring the timing; and removing data during a predetermined time period from a time at which the inspection target has been irradiated with the laser light from measurement data of vibration generated in the inspection target, wherein the laser device is configured to radiate excitation laser light, which is the laser light that causes the inspection target to vibrate in the sound wave region of 20 kHz or less, wherein the excitation laser condensing unit includes a first lens and a second lens for condensing the excitation laser light and adjusting the focusing position of the vibrating laser light by adjusting the distance between the first lens and the second lens on the basis of the information representing the amount of adjustment of the distance between the first lens and the second lens included in the received control information transmitted by the communicating portion.

14. The measuring method according to claim 13, further comprising steps of:

selecting a location to be irradiated with the laser light on the basis of information representing an image of a location of the inspection target scheduled to be irradiated with the laser light; and transmitting control information including information representing the location to be irradiated with the laser light to a sweep device configured to sweep the laser light.

15. The measuring method according to claim 13, further comprising:

transmitting control information including the information representing the timing to the laser device configured to radiate the laser light.

16. The measuring method according to claim 13, further comprising a step of removing noise from measurement data on the basis of a correlation coefficient between the measurement data of vibration generated in the inspection target and an evaluation function of the measurement data.

17. The measuring method according to claim 13, further comprising a step of removing noise from measurement data of vibration on the basis of the measurement data of the vibration generated in the inspection target and data obtained by shifting a phase of time-series data of the measurement data.

18. The measuring method according to claim 13, further comprising a step of determining faultlessness of a location of the inspection target irradiated with the laser light on the basis of measurement data acquired when vibration has been induced in the inspection target by irradiating the inspection target with the laser light and measurement data acquired when the inspection target has not been irradiated with the laser light that induces the vibration.

* * * * *